US012568000B2

(12) United States Patent
Kim et al.

(10) Patent No.: US 12,568,000 B2
(45) Date of Patent: Mar. 3, 2026

(54) METHOD AND DEVICE FOR PERFORMING FEDERATED LEARNING IN WIRELESS COMMUNICATION SYSTEM

(71) Applicant: LG Electronics Inc., Seoul (KR)

(72) Inventors: Yeongjun Kim, Seoul (KR); Sangrim Lee, Seoul (KR); Kijun Jeon, Seoul (KR); Taehyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 314 days.

(21) Appl. No.: 18/563,196

(22) PCT Filed: May 21, 2021

(86) PCT No.: PCT/KR2021/006359
§ 371 (c)(1),
(2) Date: Nov. 21, 2023

(87) PCT Pub. No.: WO2022/244903
PCT Pub. Date: Nov. 24, 2022

(65) Prior Publication Data
US 2024/0223407 A1      Jul. 4, 2024

(51) Int. Cl.
*H04L 25/02*          (2006.01)
*G06N 3/08*           (2023.01)
(Continued)

(52) U.S. Cl.
CPC ........... *H04L 25/024* (2013.01); *G06N 3/098* (2023.01); *H04L 25/0204* (2013.01); *H04W 72/23* (2023.01)

(58) Field of Classification Search
CPC ... H04L 25/024; H04L 25/0204; H04L 25/02; H04L 25/0224; G06N 3/098; G06N 3/04;
(Continued)

(56) References Cited

U.S. PATENT DOCUMENTS 7,626,921 B2 * 12/2009 Egashira ............... H04L 5/0048
370/282
2009/0274233 A1 * 11/2009 Niu ..................... H04L 27/2676
375/267
(Continued)

FOREIGN PATENT DOCUMENTS

KR     10-2011-0093795      8/2011
KR     10-2017-0085378      7/2017
(Continued)

OTHER PUBLICATIONS

Chen et al., "Communication-efficient federated learning," https://doi.org/10.1073/pnas.2024789118, PNAS 2021 vol. 118 No. 17 e2024789118. (Year: 2021).*
(Continued)

*Primary Examiner* — Alina A Boutah
(74) *Attorney, Agent, or Firm* — Fish & Richardson P.C.

(57)          ABSTRACT

A method of performing, by a plurality of user equipments (UEs), a federated learning in a wireless communication system comprises receiving, from a base station (BS), control information related to a scheduling of a resource on which the one UE repeatedly transmits a local parameter of the one UE, wherein a global parameter for the federated learning is updated based on respective local parameters of the plurality of UEs; transmitting, to the BS, a first signal including the local parameter on a first resource scheduled based on the control information; and transmitting, to the BS, a second signal including the local parameter on a second resource that is scheduled based on the control information and is different from the first resource, wherein the first signal and the second signal are transmitted based on the first signal and the second signal being in a complex conjugate relationship.

17 Claims, 34 Drawing Sheets

(51) Int. Cl.
  *G06N 3/098*  (2023.01)
  *H04W 72/12*  (2023.01)
  *H04W 72/23*  (2023.01)

(58) Field of Classification Search
  CPC .......... G06N 3/0464; G06N 3/08; G06N 3/09;
       G06N 20/20; H04W 72/23; H04W 72/12
  See application file for complete search history.

(56) References Cited

U.S. PATENT DOCUMENTS

| | | |
|---|---|---|
| 2013/0109421 A1 | 5/2013 | Guey et al. |
| 2022/0182802 A1* | 6/2022 | Pezeshki ............... H04W 72/21 |
| 2022/0245527 A1* | 8/2022 | Choi ....................... G06N 20/20 |
| 2023/0244952 A1* | 8/2023 | Li ........................... G06N 3/098 |
| | | 706/25 |
| 2024/0023091 A1* | 1/2024 | Li ..................... H04W 72/1268 |

FOREIGN PATENT DOCUMENTS

| | | | |
|---|---|---|---|
| WO | WO 2018/057302 | 3/2018 | |
| WO | WO-2018062850 A1 * | 4/2018 | ............ H04W 72/23 |

OTHER PUBLICATIONS

Yang et al., "Scheduling Policies for Federated Learning in Wireless Networks," IEEE Transactions on Communications, vol. 68, No. 1, Jan. 2020. (Year: 2020).*

Anavangot et al, "Algorithms for Overpredictive Signal Analytics in Federated Learning," 978-9-0827-9705-3, EUSIPCO 2020. (Year: 2020).*

Jere et al., "Federated Learning in Mobile Edge Computing: An Edge-Learning Perspective for Beyond 5G," CoRR, submitted on Jul. 15, 2020, arXiv:2007.08030v1, 9 pages.

* cited by examiner

[FIG. 1]
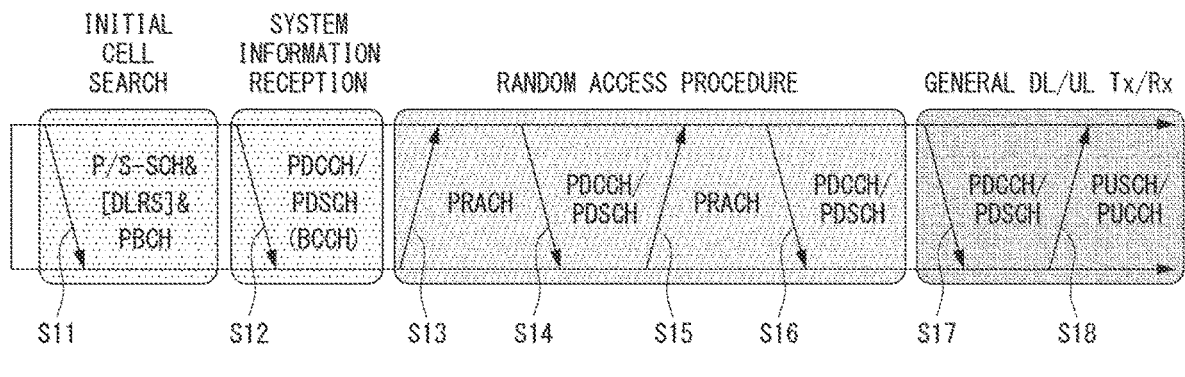
- DL/UL ACK/NACK
- UE CQI/PMI/RI REPORT
  USING PUSCH AND PUCCH

[FIG. 2]

【FIG. 3】
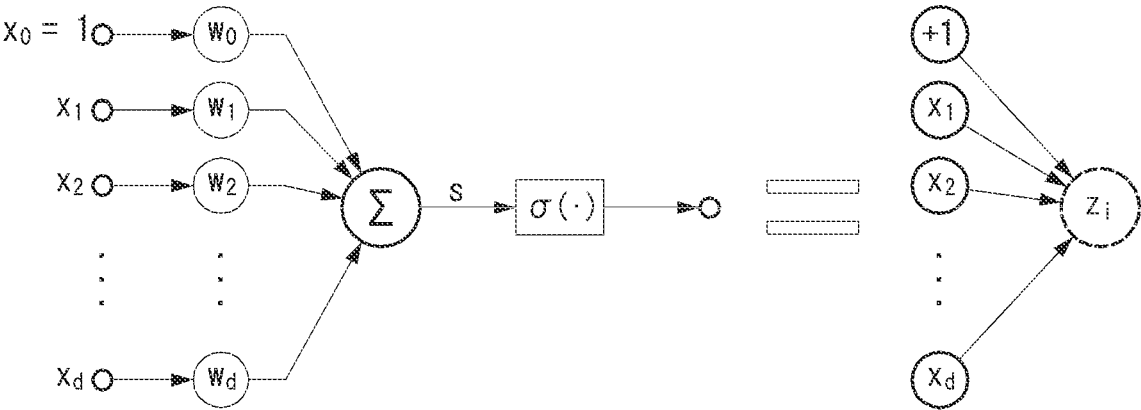
【FIG. 4】
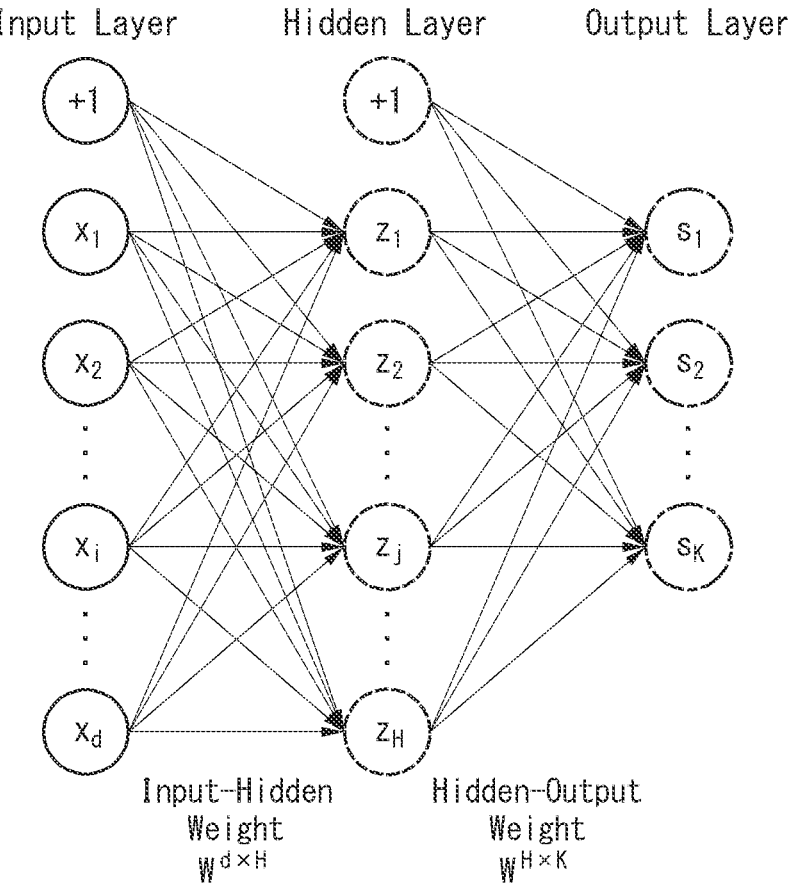
Input Layer    Hidden Layer    Output Layer
Input-Hidden
Weight
$W^{d \times H}$
Hidden-Output
Weight
$W^{H \times K}$ 【FIG. 5】
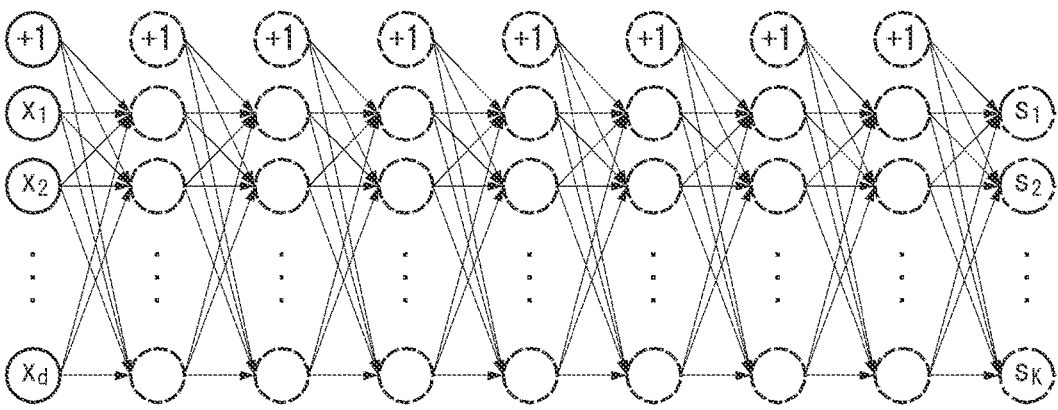
【FIG. 6】
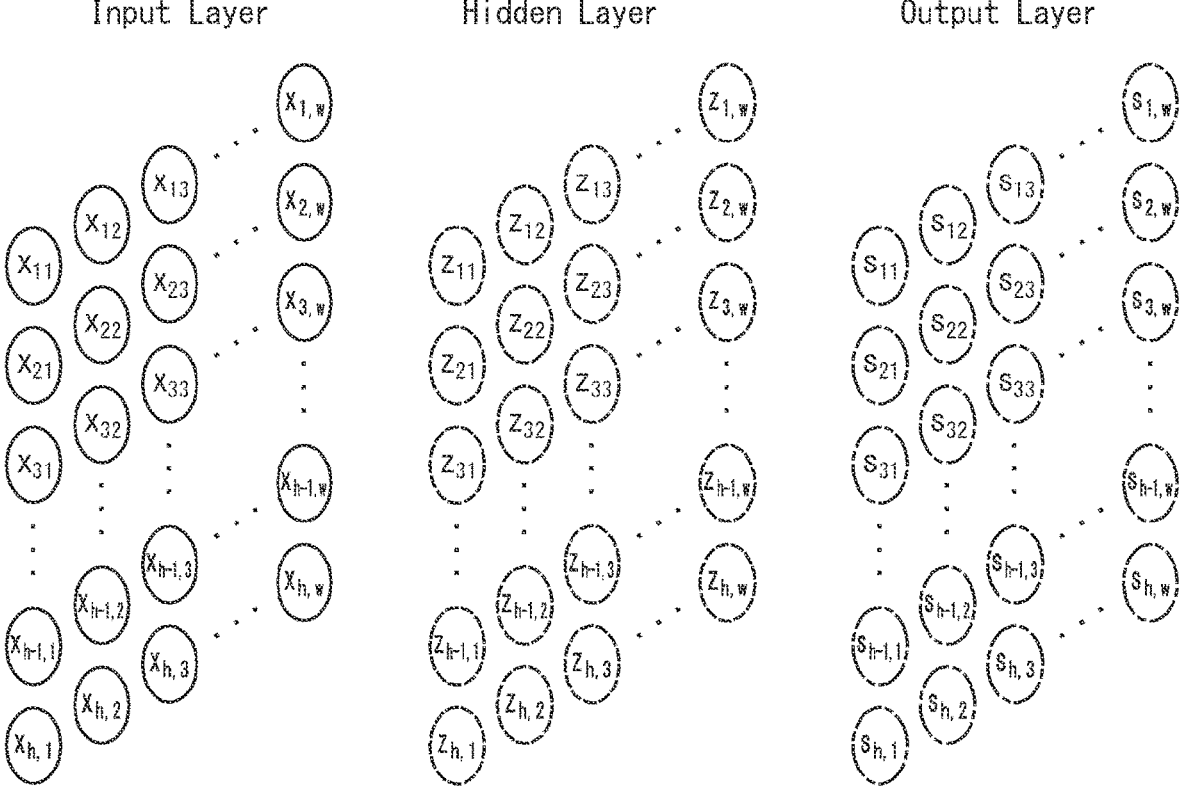

【FIG. 7】
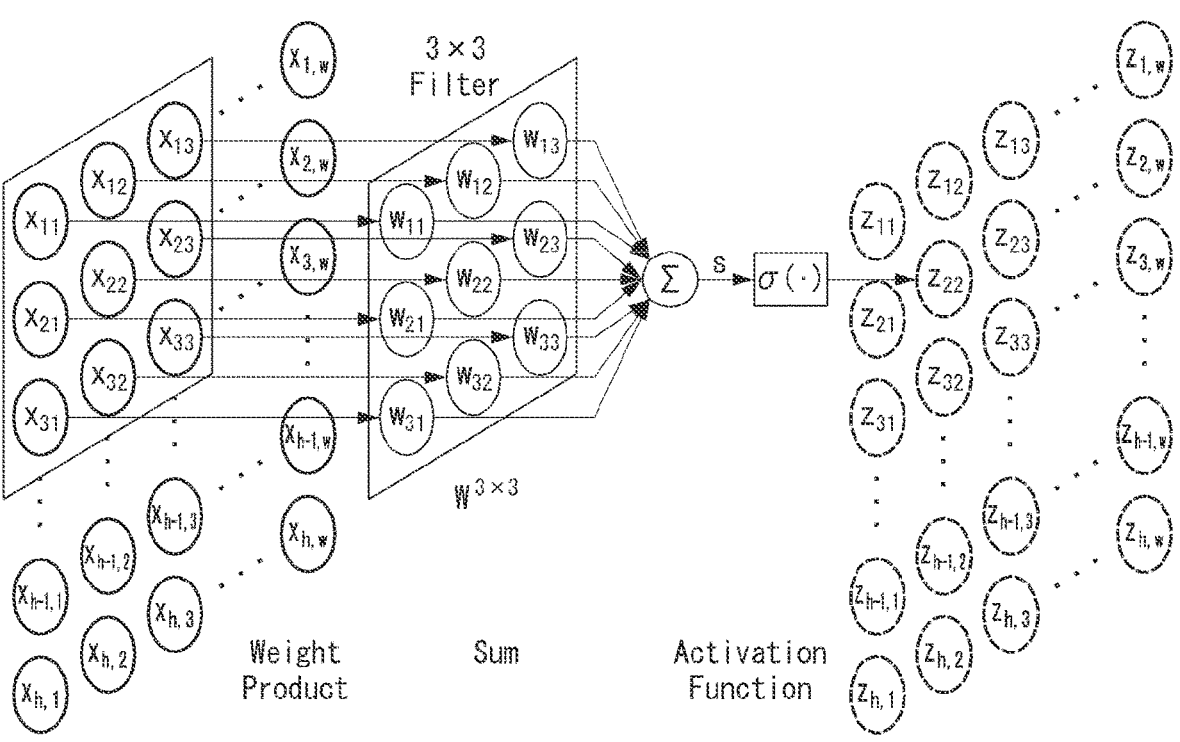
【FIG. 8】
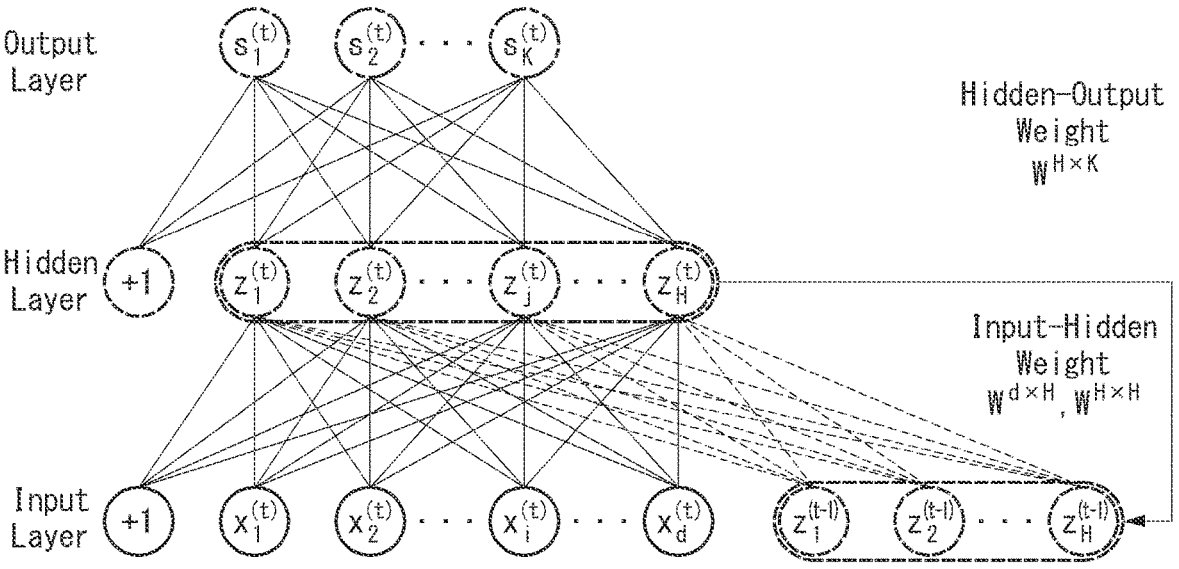

[FIG. 9]
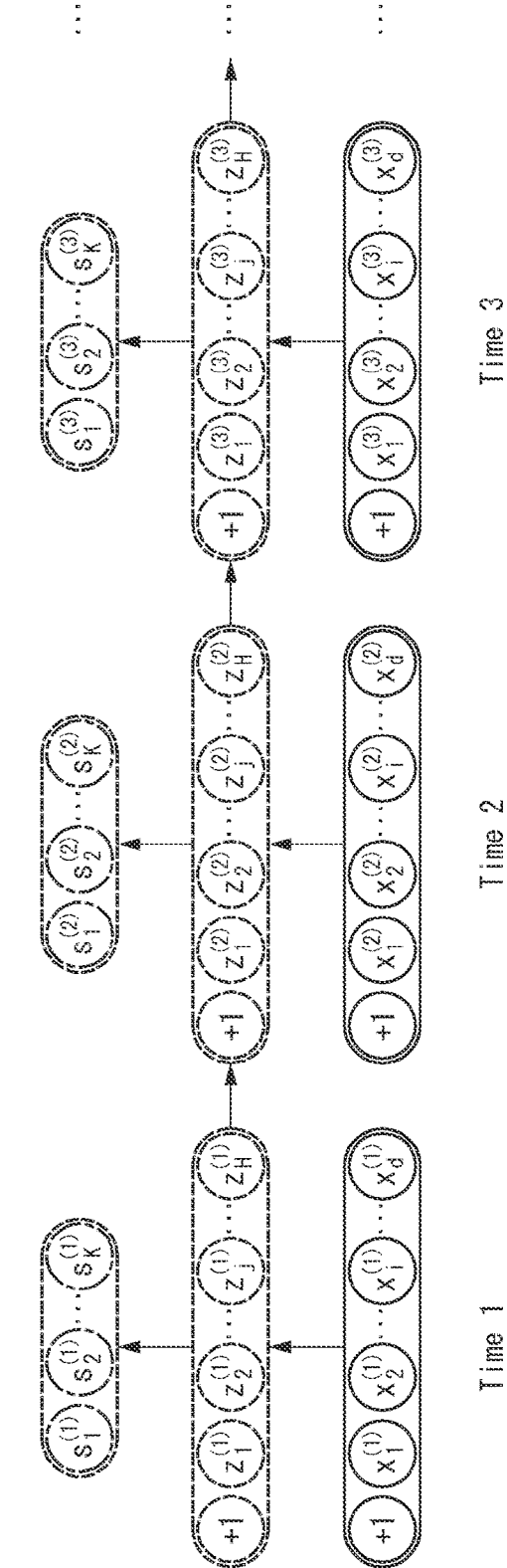

[FIG. 10]
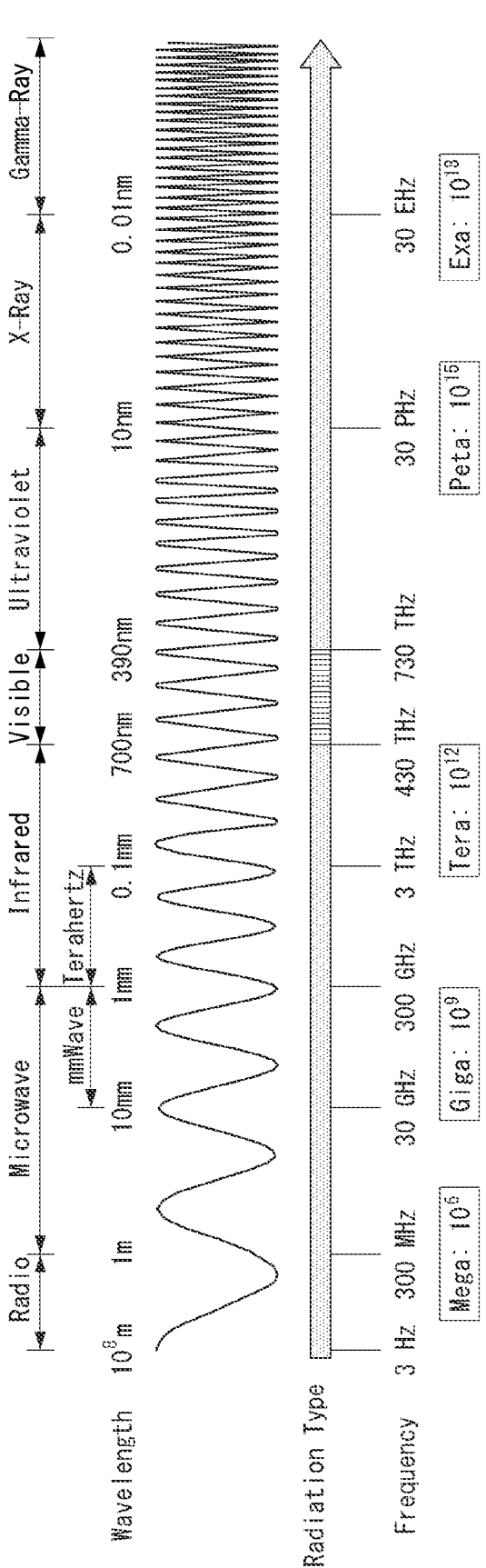

【FIG. 11】
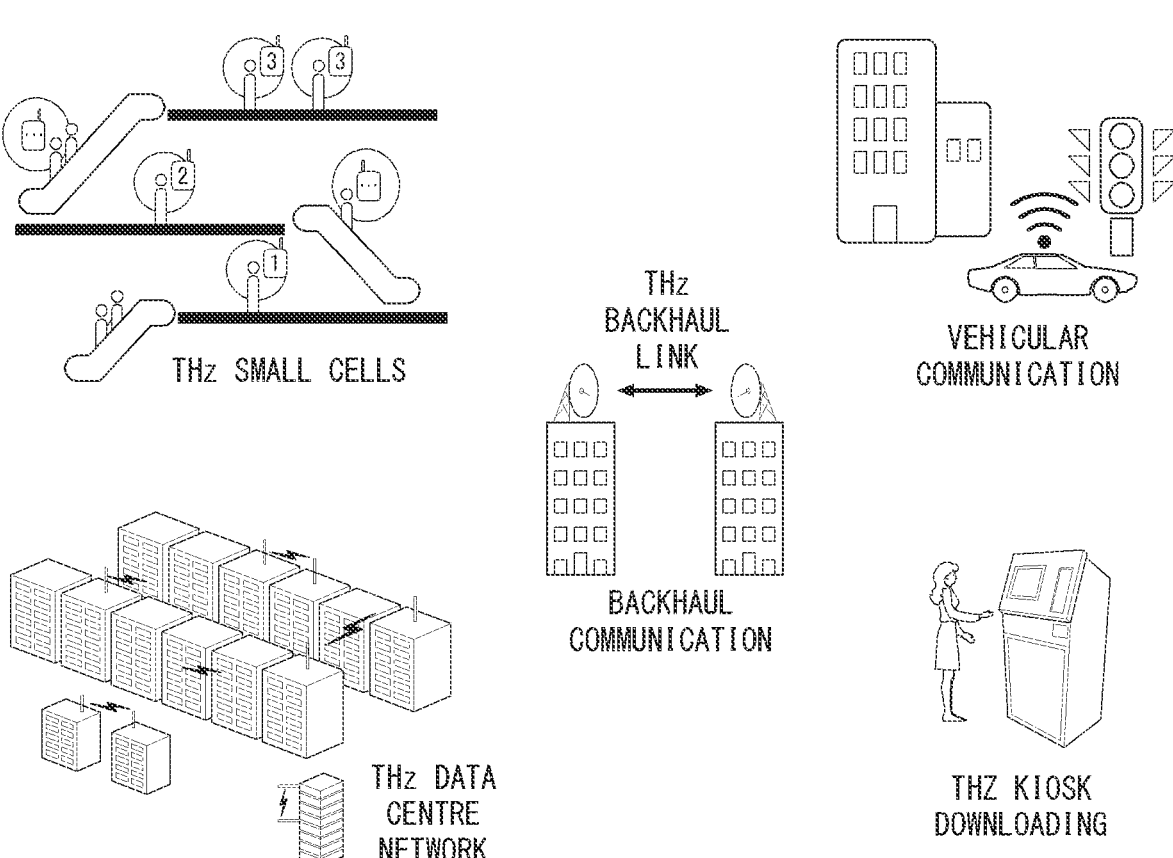

[FIG. 12]
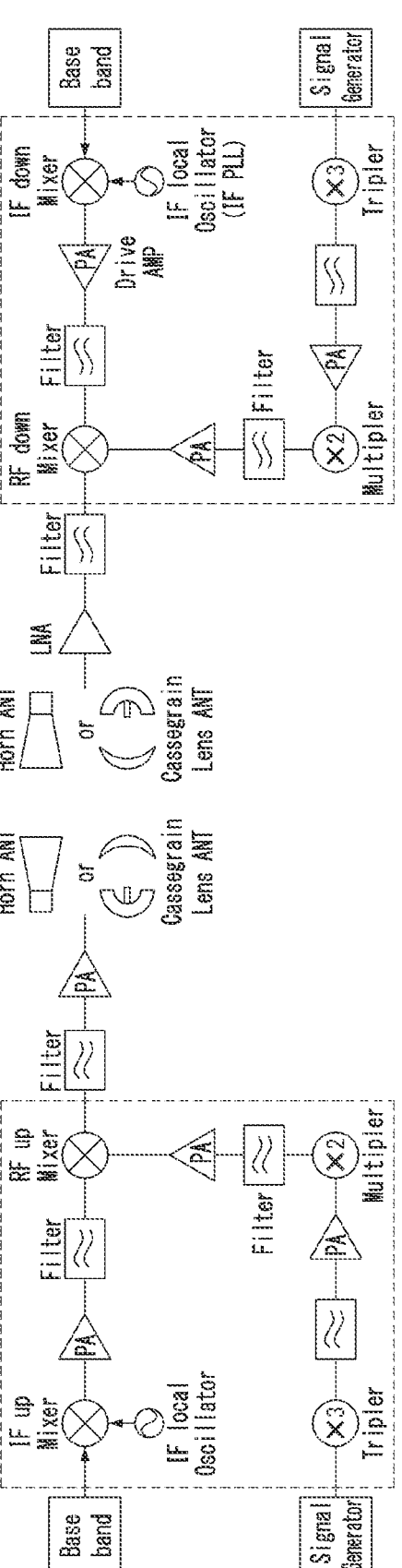

【FIG. 13】
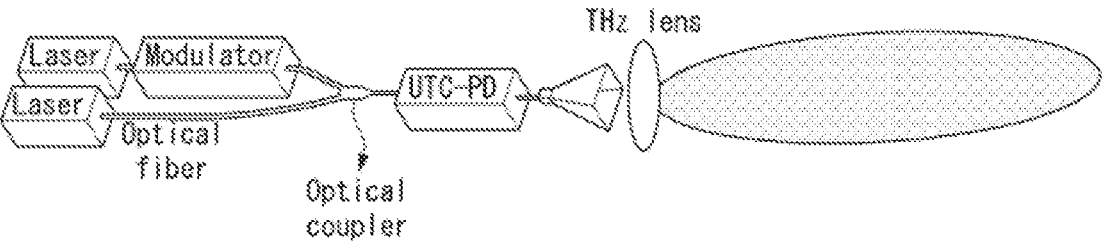

[FIG. 14]

[FIG. 15]
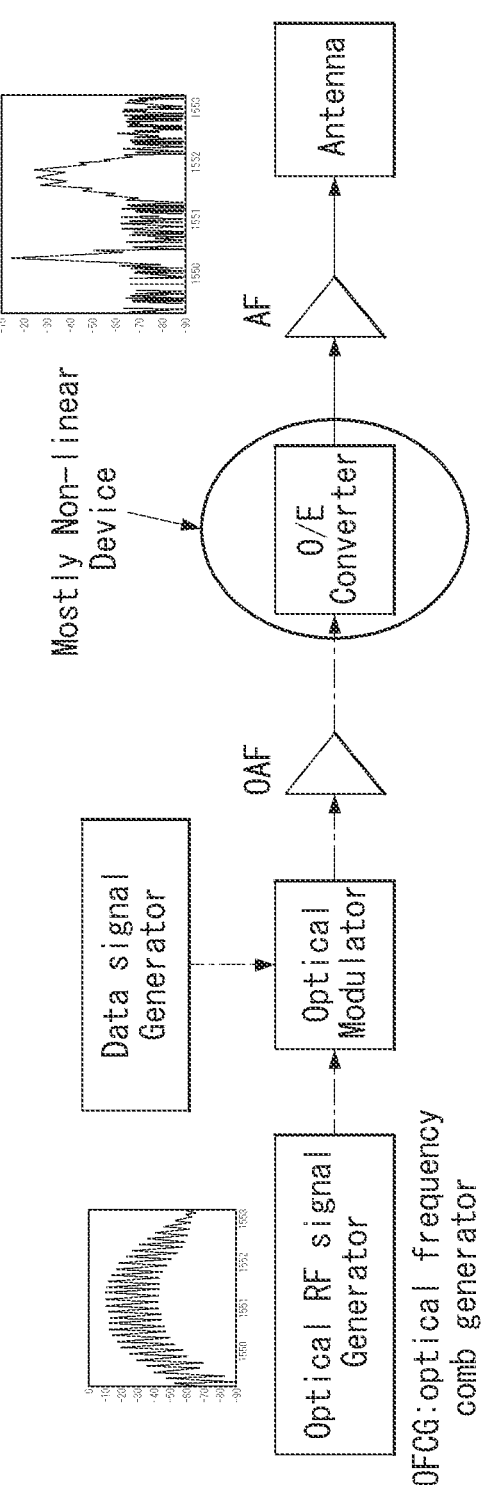

[FIG. 16]
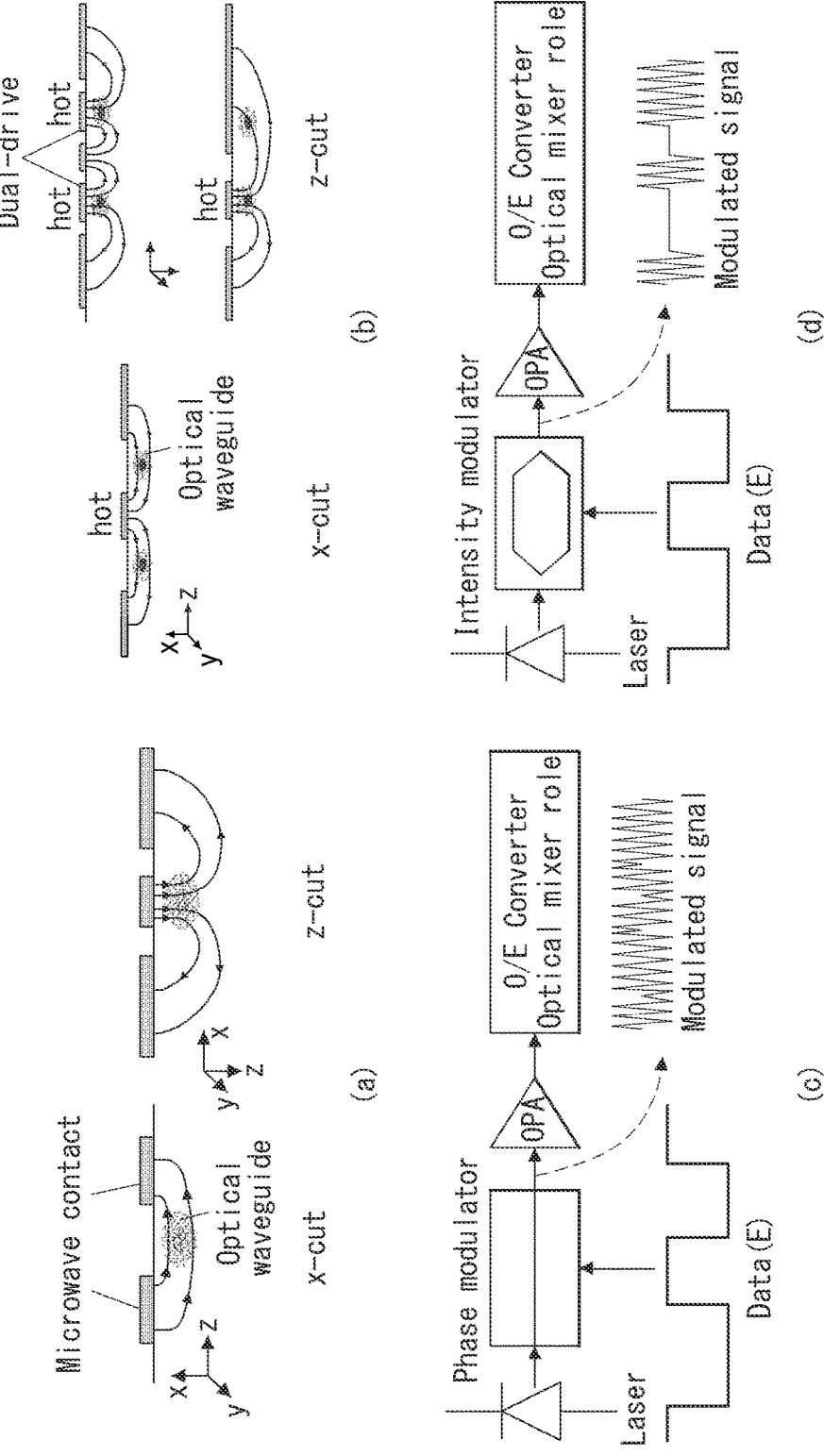

[FIG. 17]
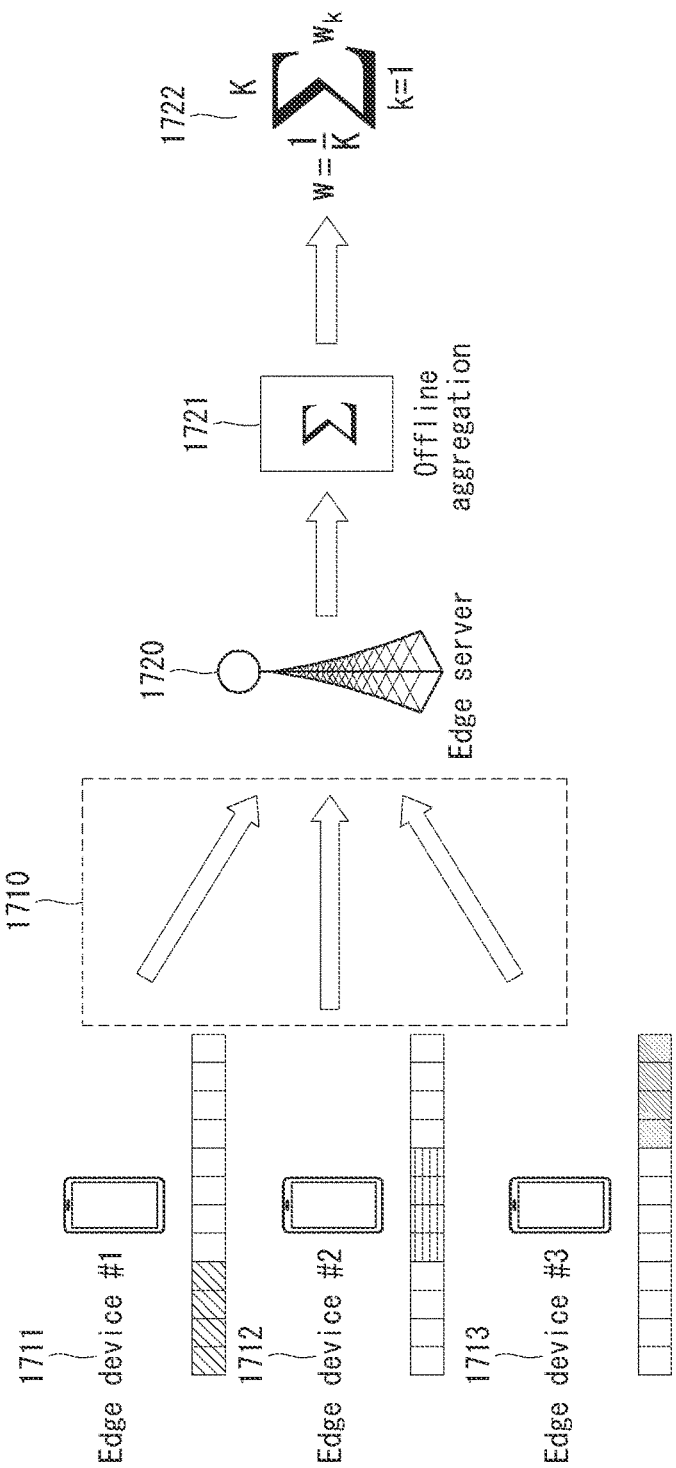

【FIG. 18】
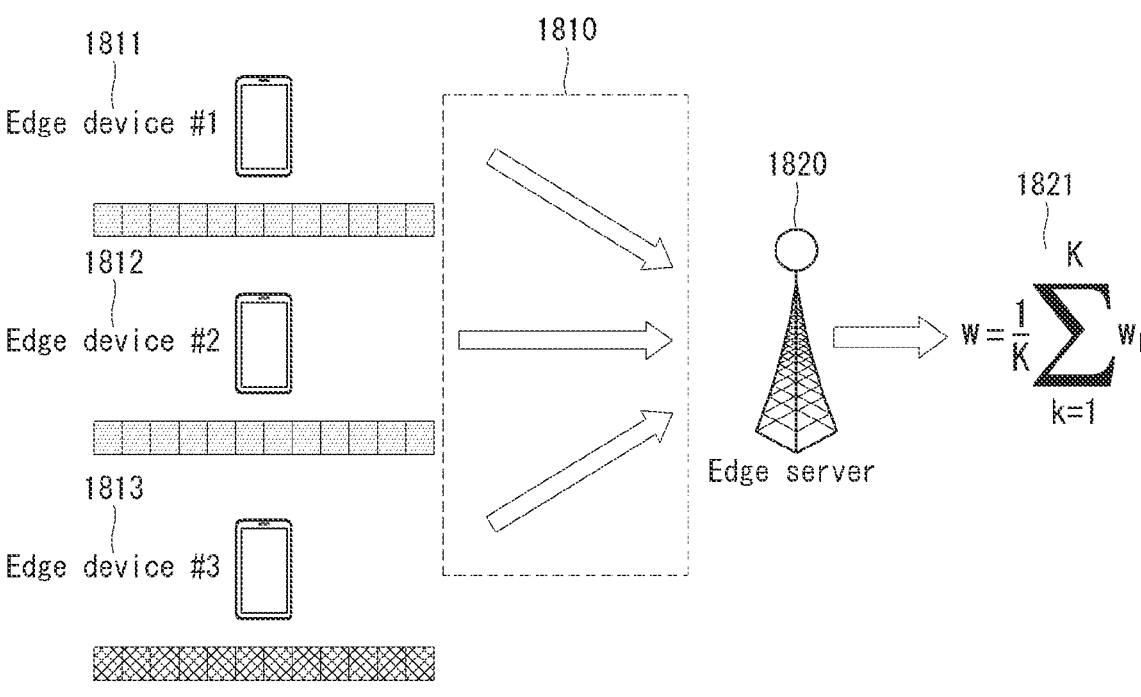

[FIG. 19]
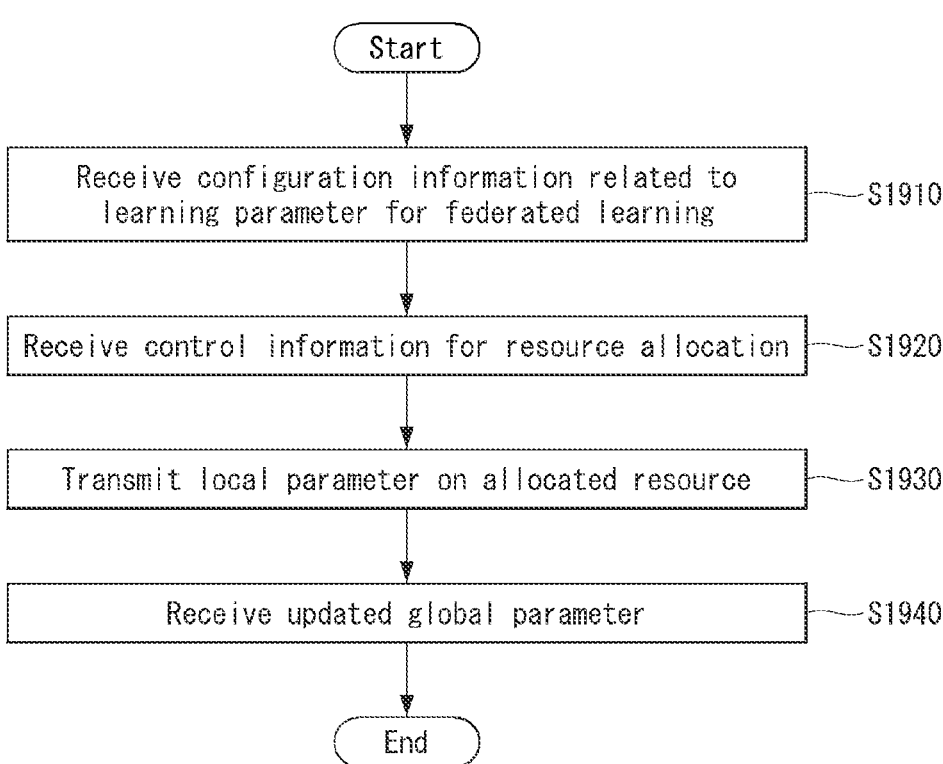
Start
Receive configuration information related to
learning parameter for federated learning —S1910
Receive control information for resource allocation —S1920
Transmit local parameter on allocated resource —S1930
Receive updated global parameter —S1940
End 【FIG. 20】
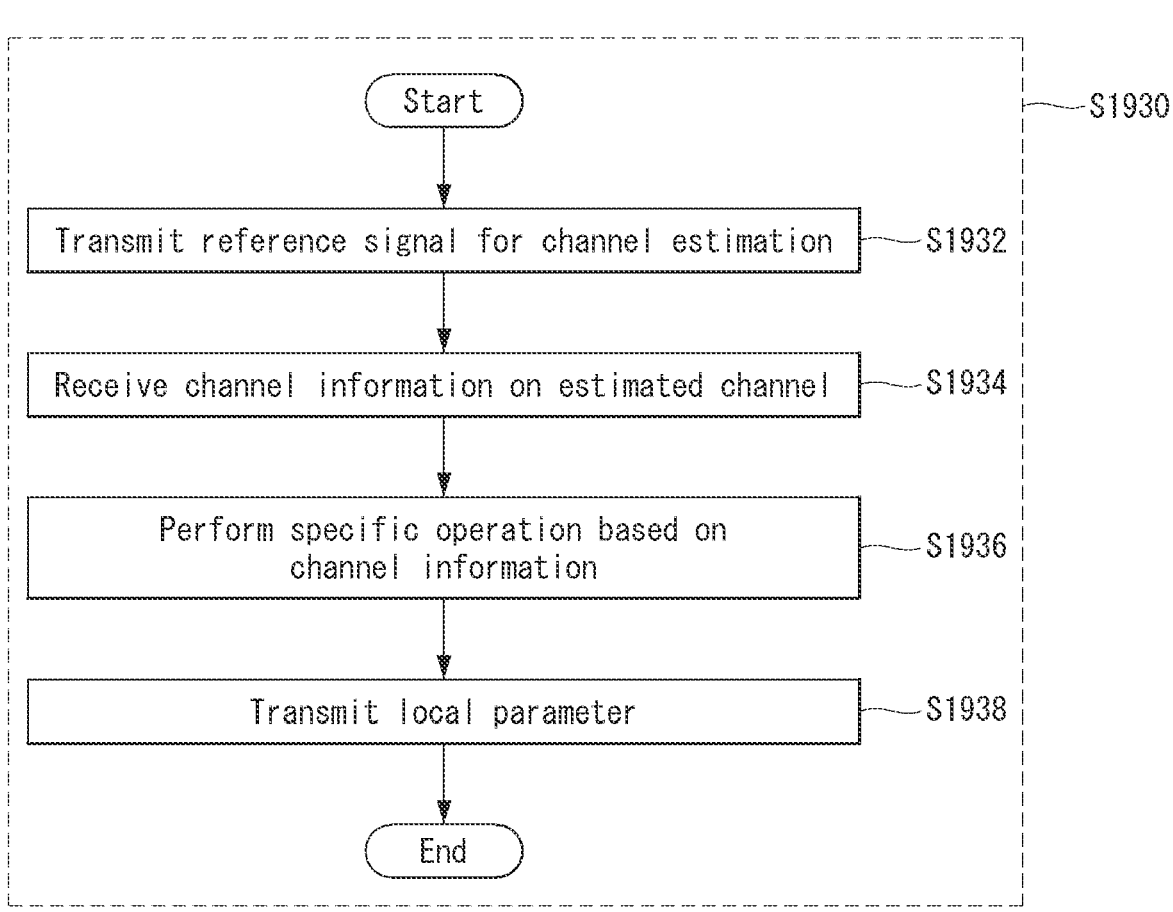

【FIG. 21】
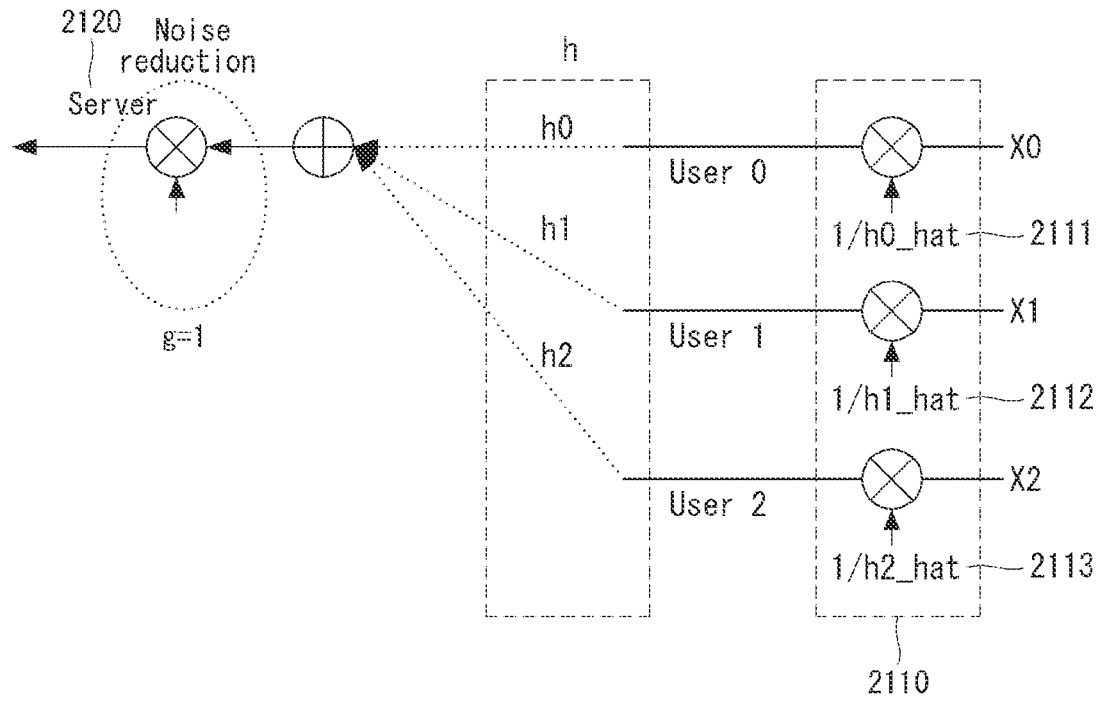

【FIG. 22】
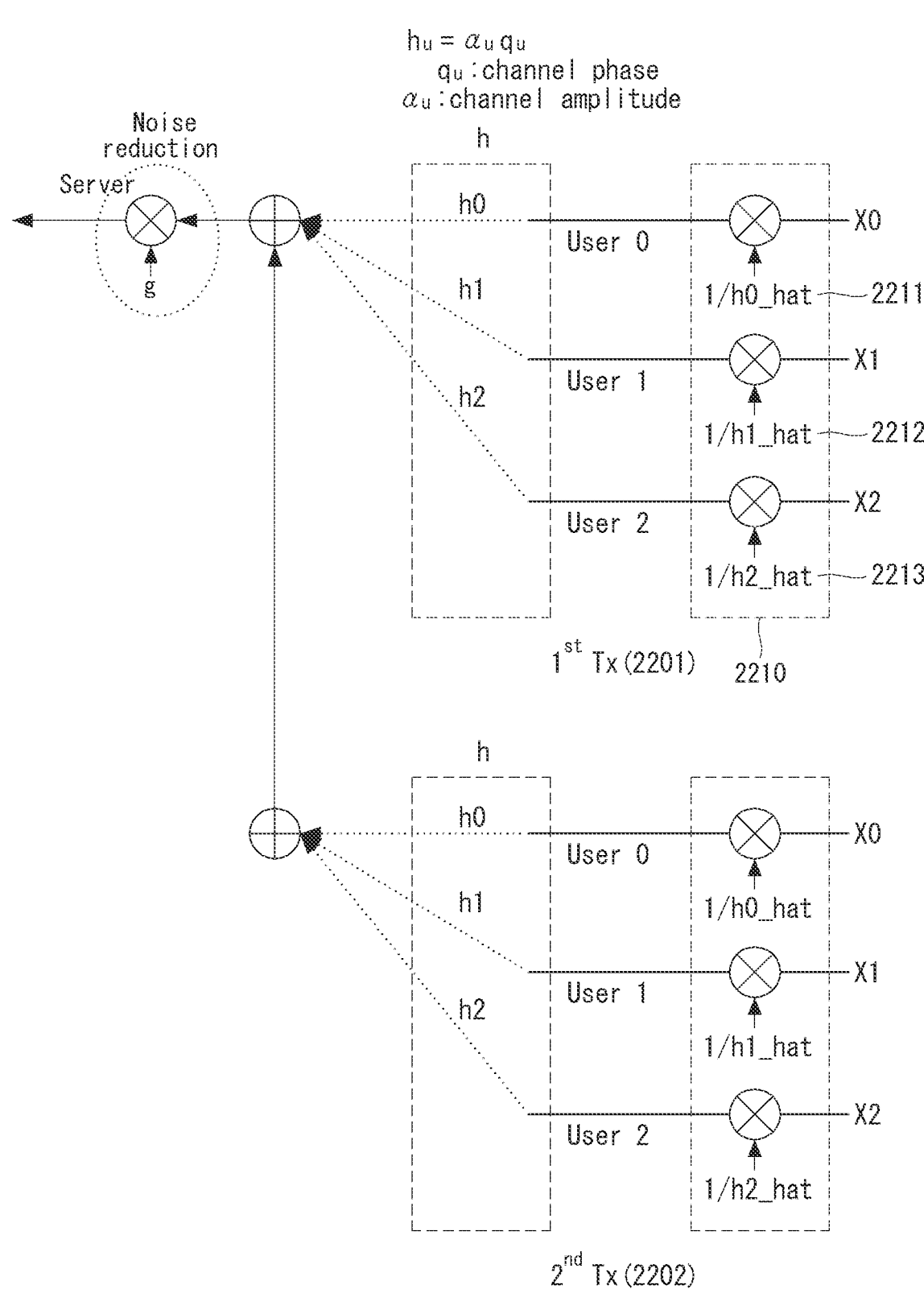

【FIG. 23】
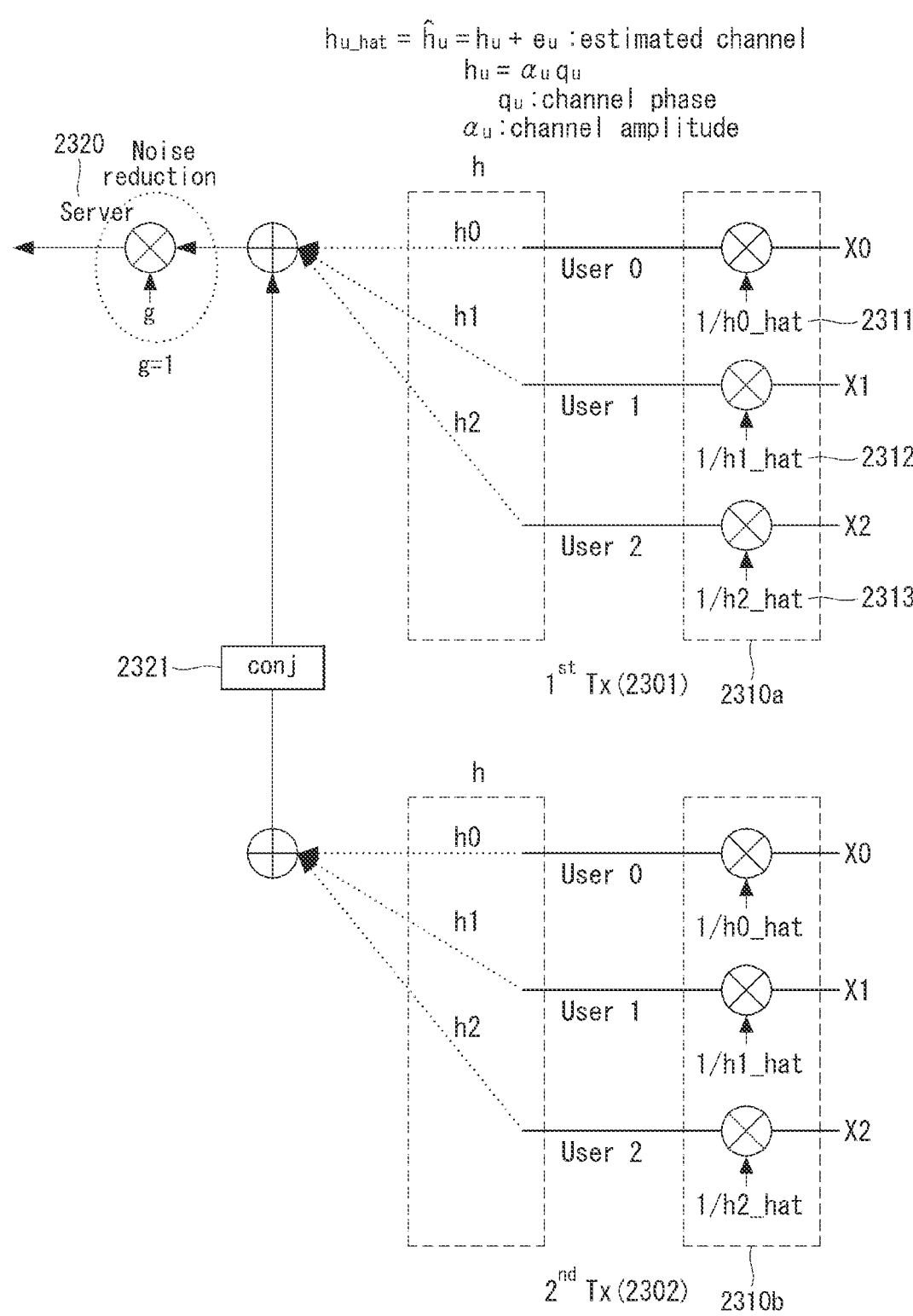

【FIG. 24】
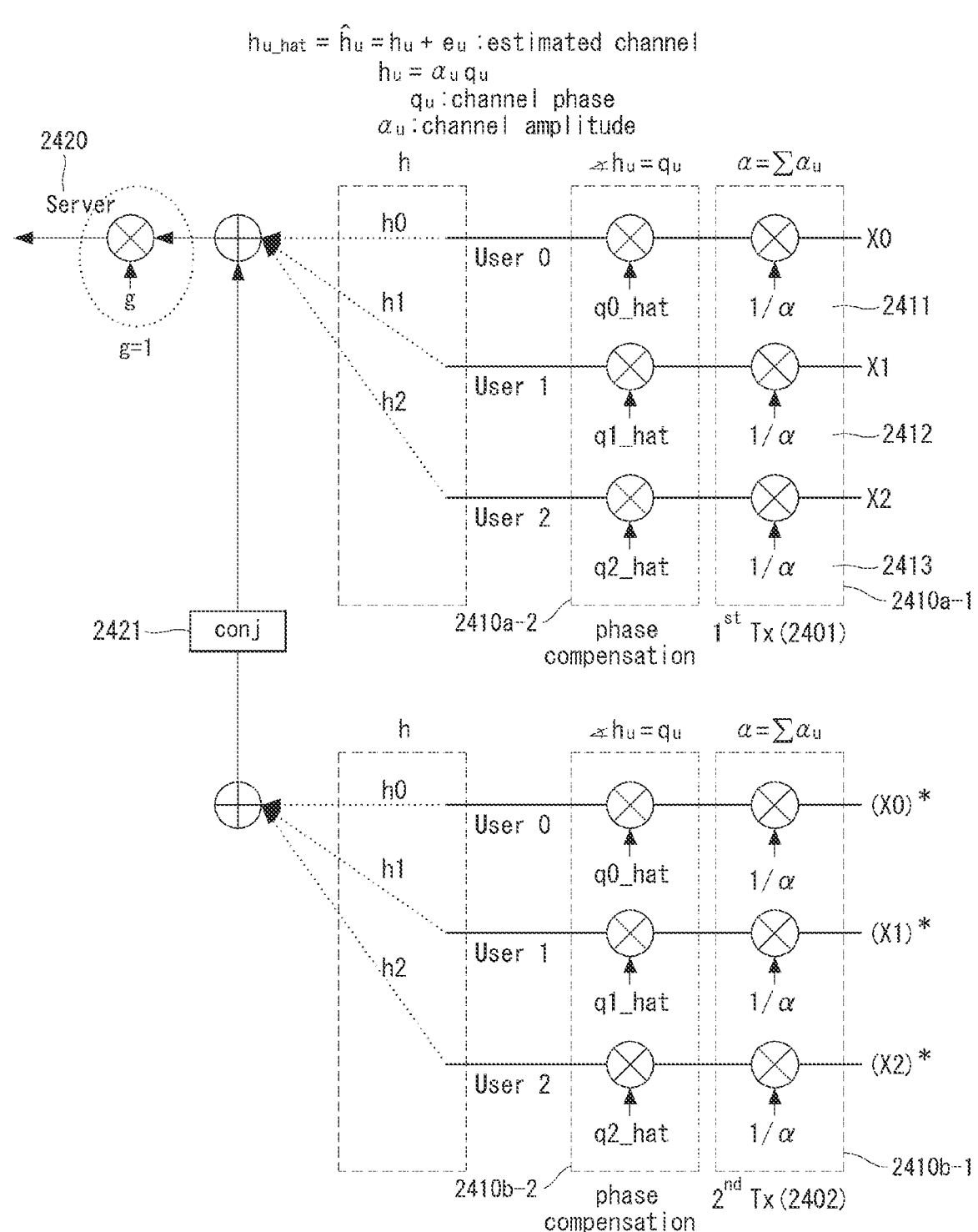

【FIG. 25】
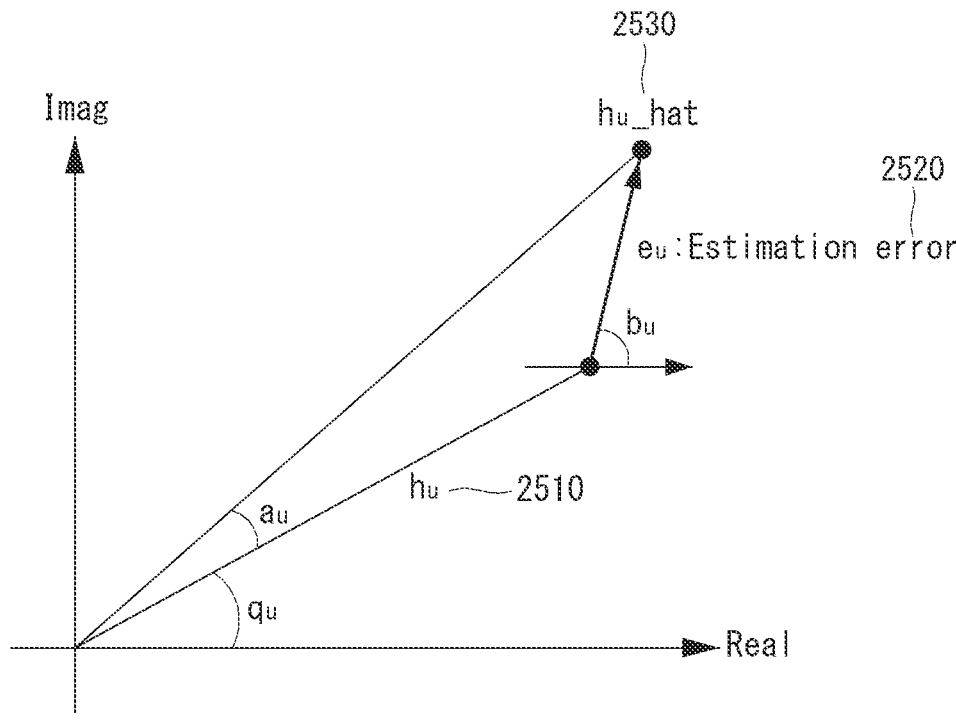

【FIG. 26】
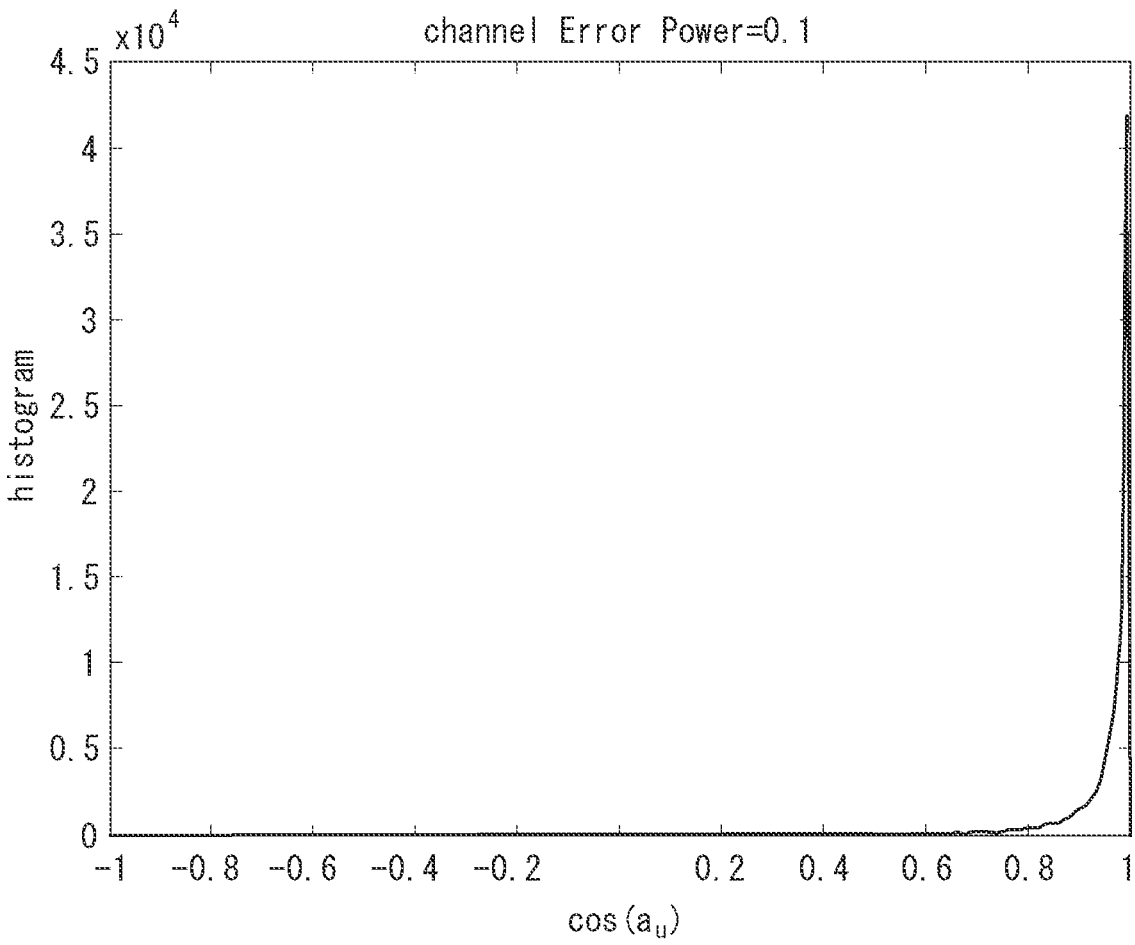

【FIG. 27】
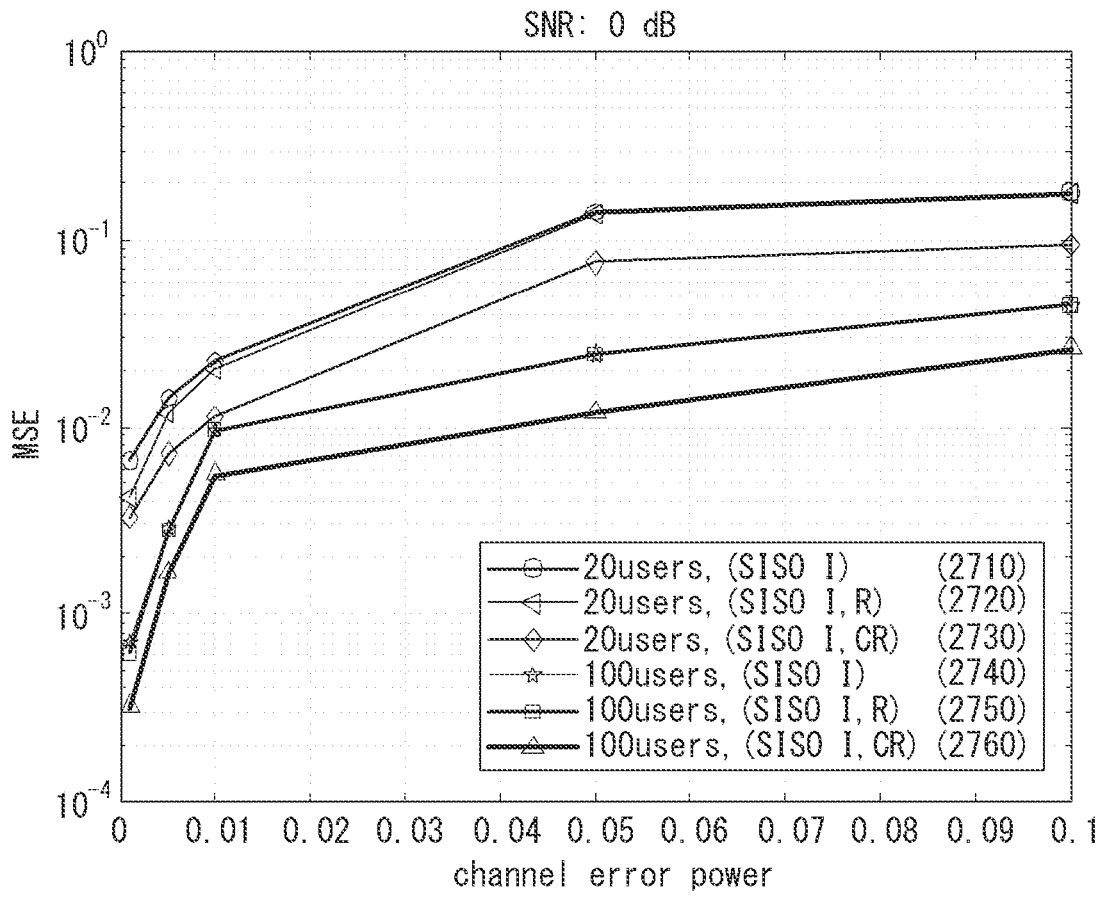

【FIG. 28】
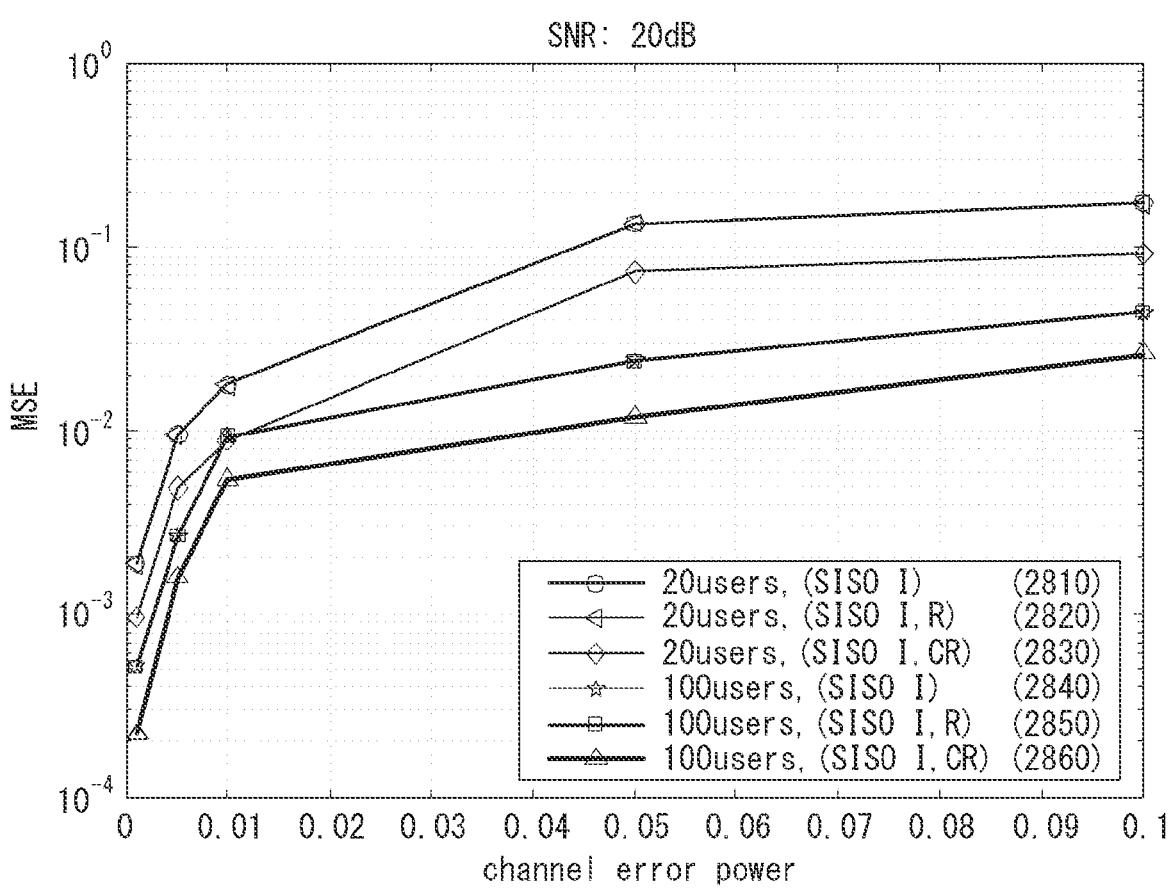

【FIG. 29】
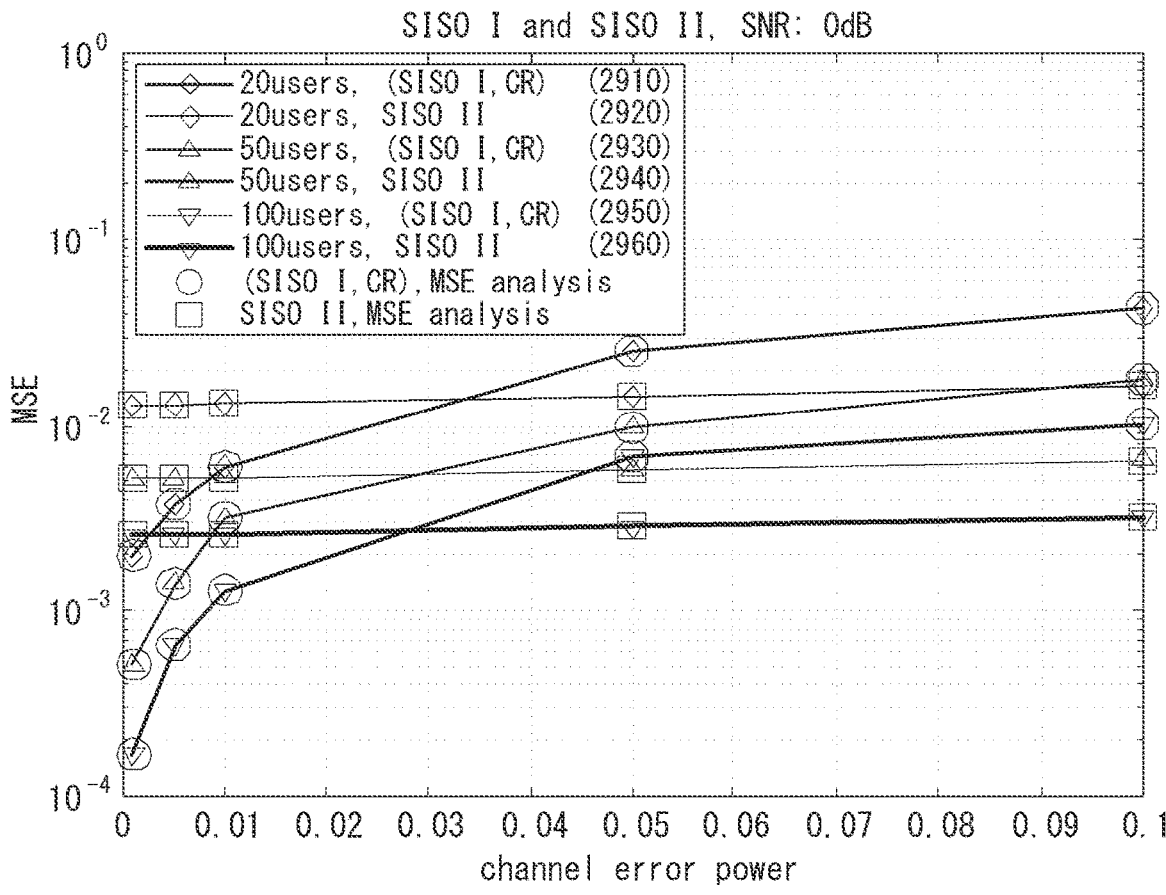

【FIG. 30】
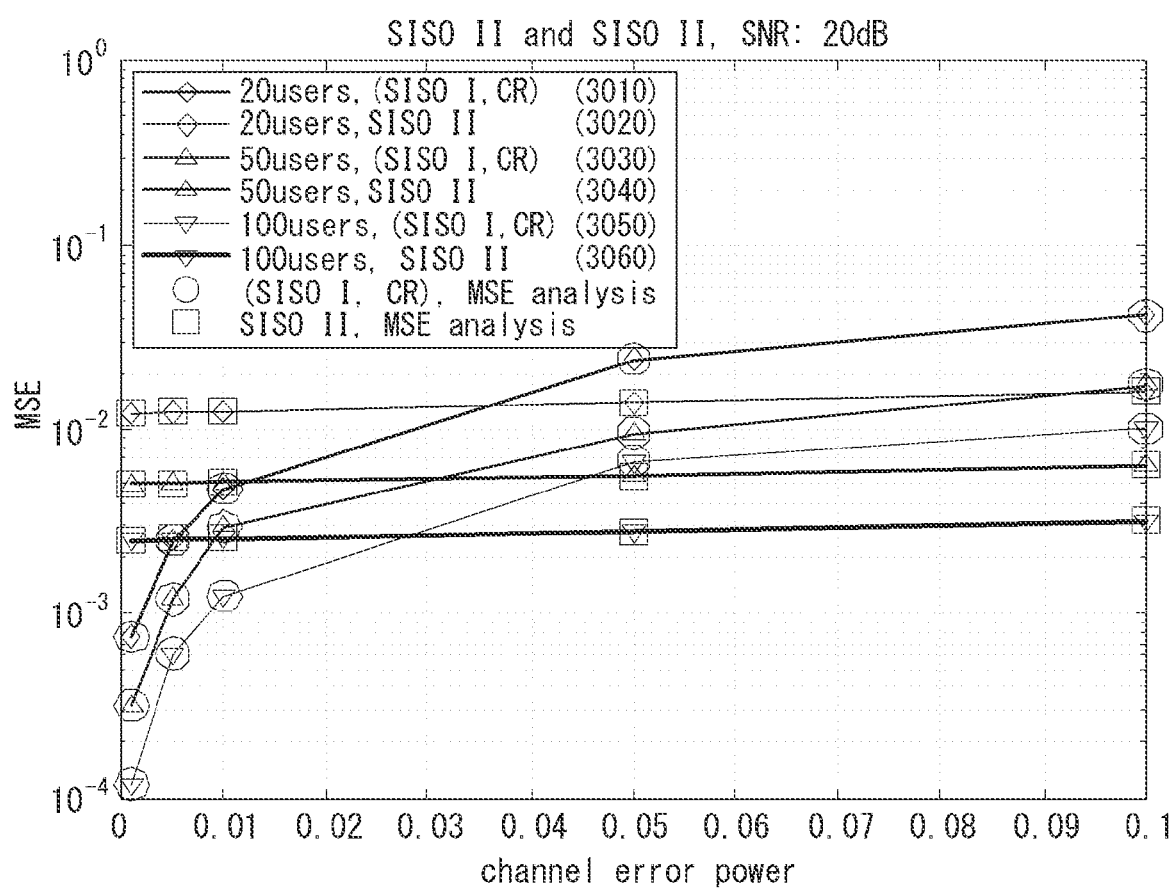

【FIG. 31】
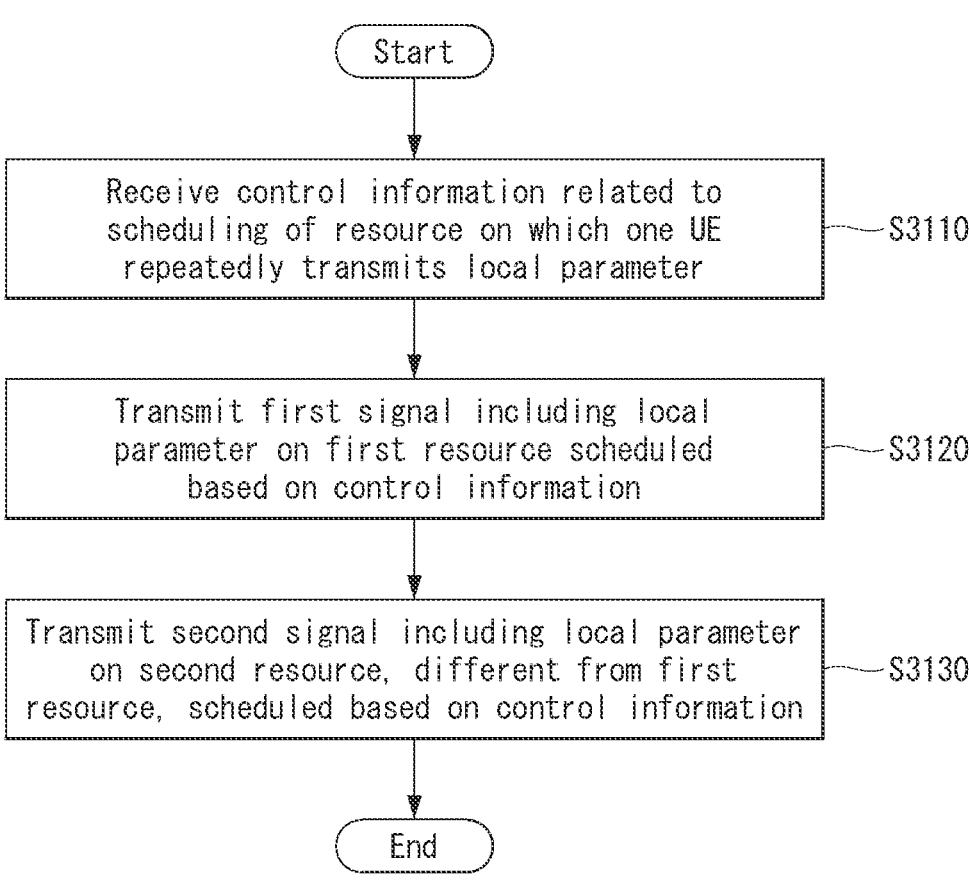

【FIG. 32】
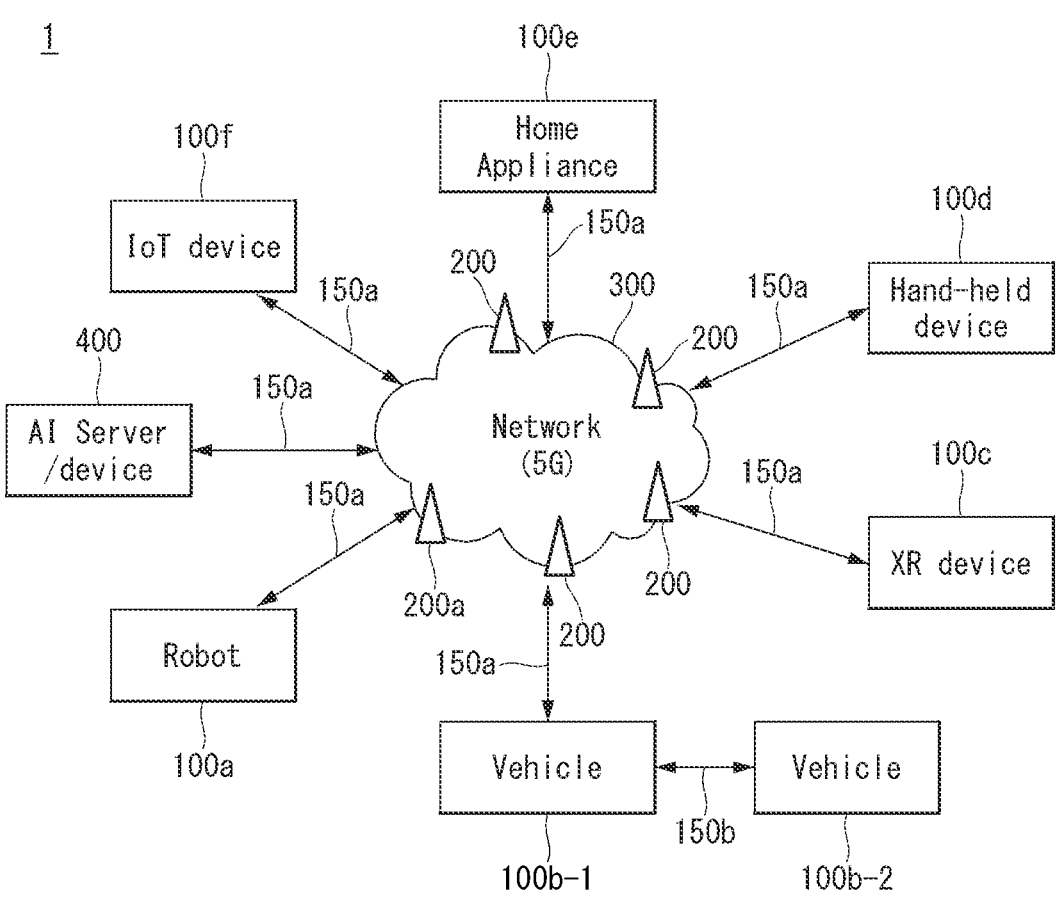
【FIG. 33】
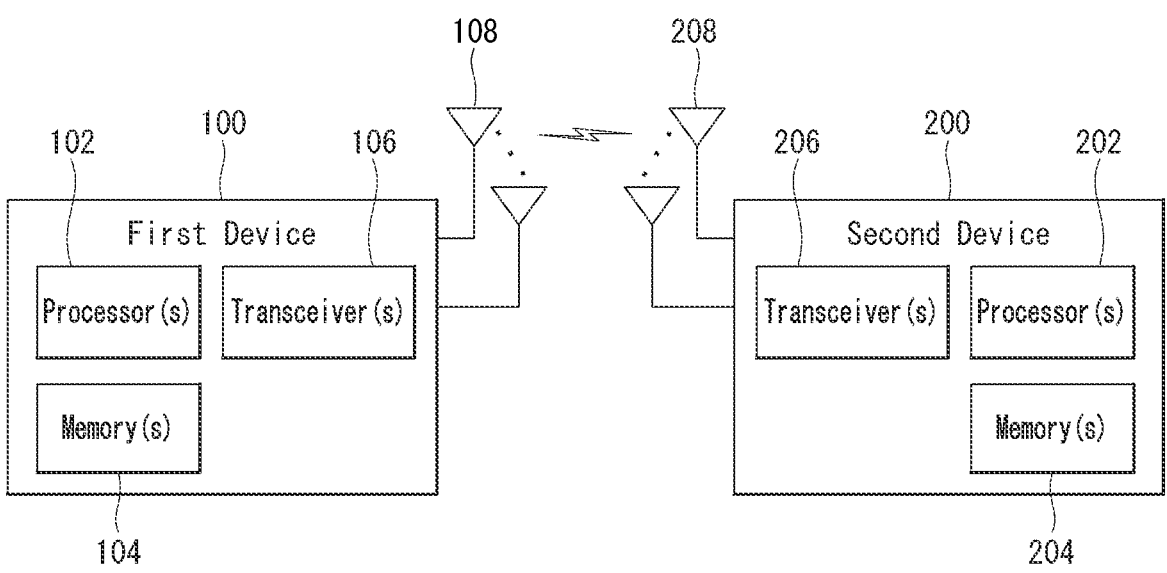

【FIG. 34】
1000(102/106, 202/206)
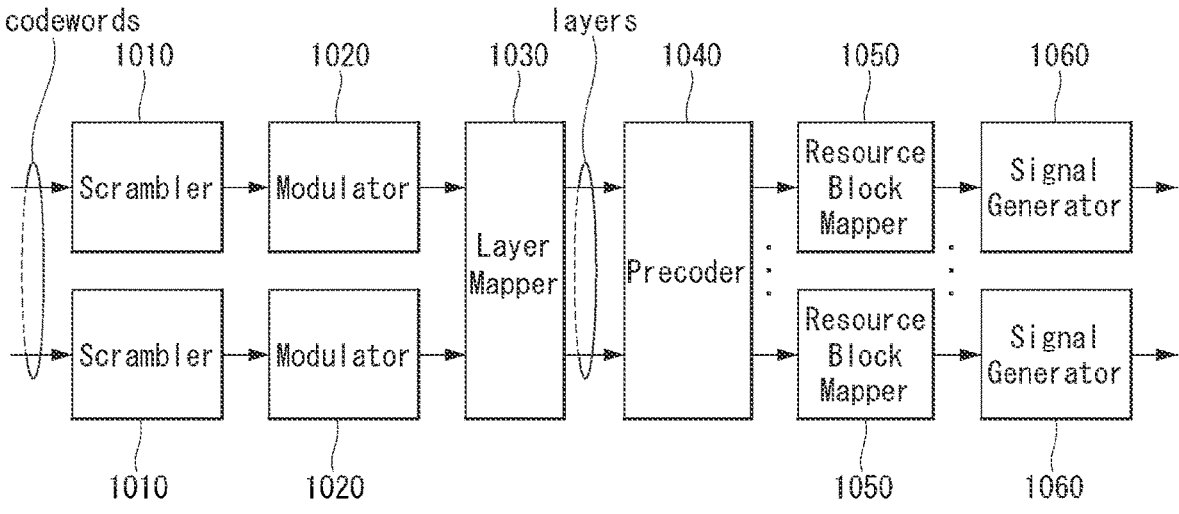
【FIG. 35】
Device(100,200)
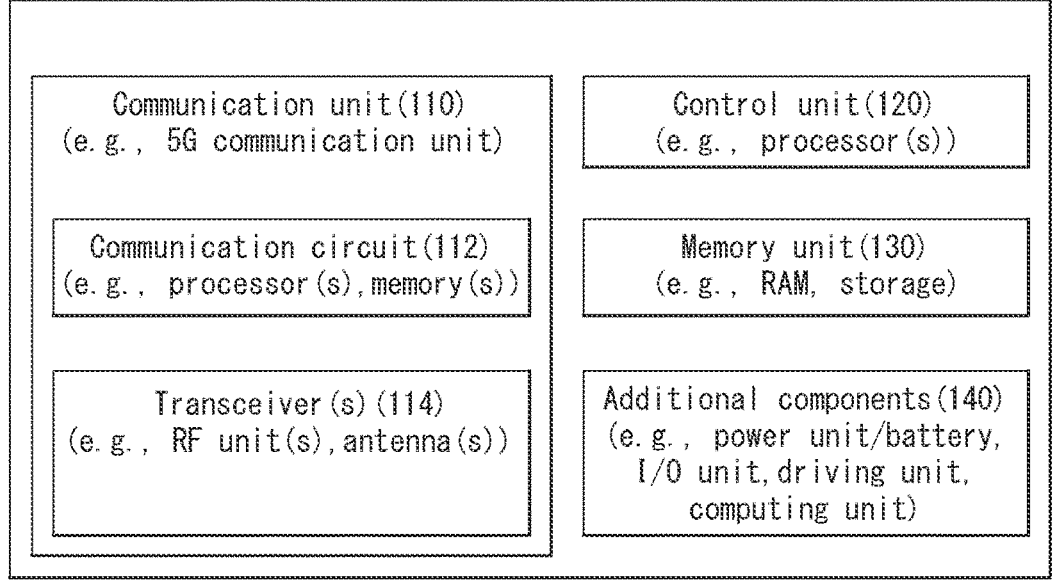

【FIG. 36】
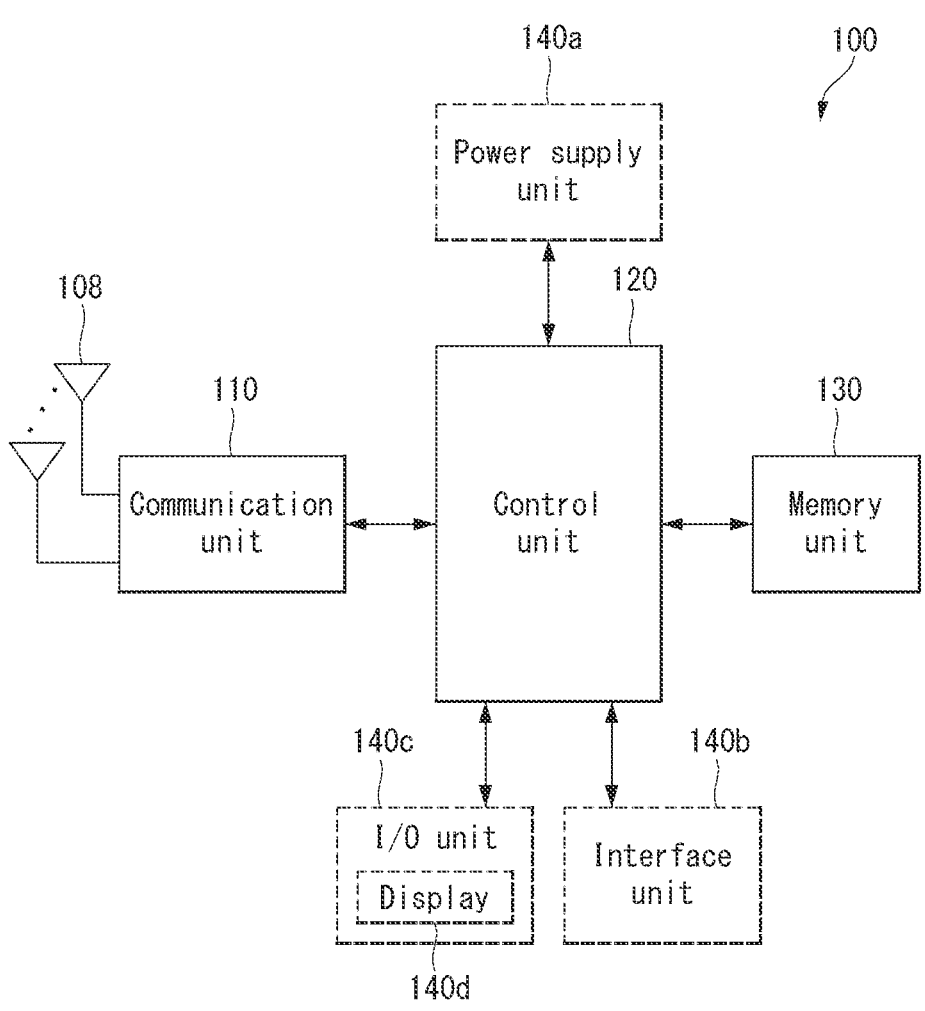

【FIG. 37】
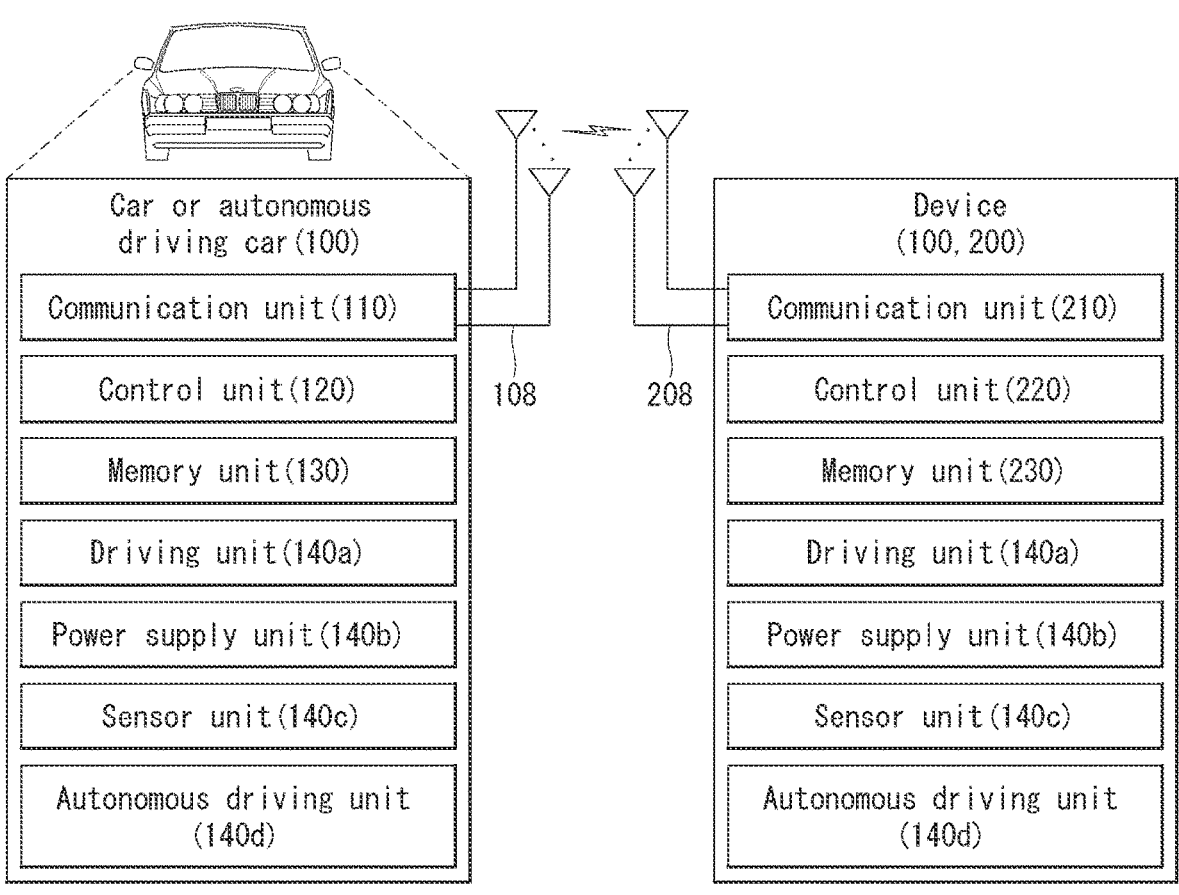

【FIG. 38】
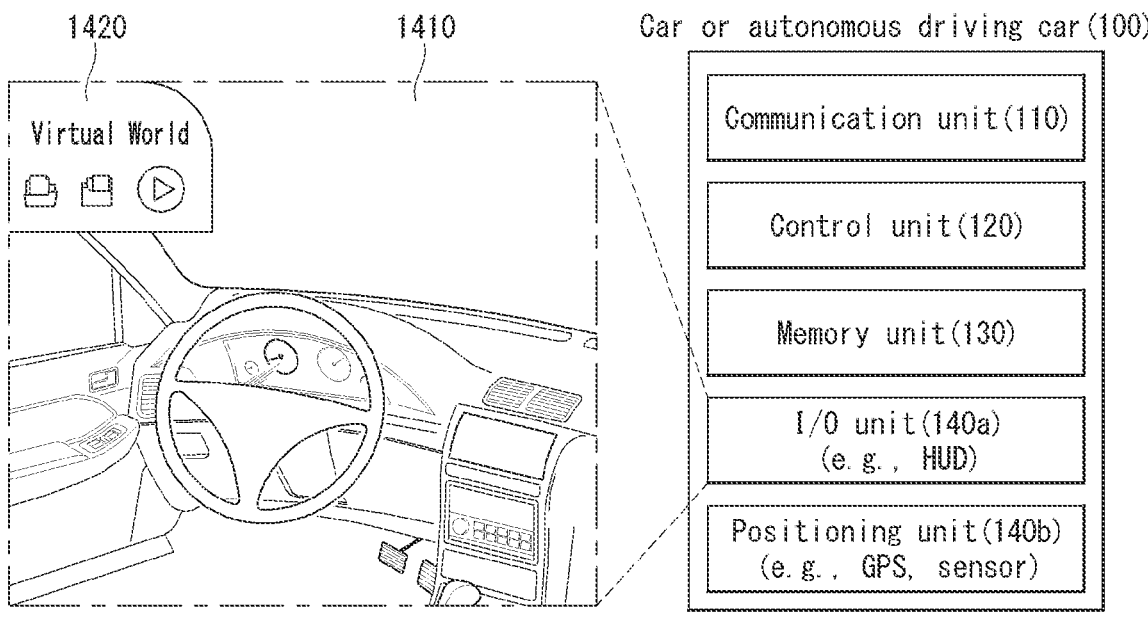
【FIG. 39】
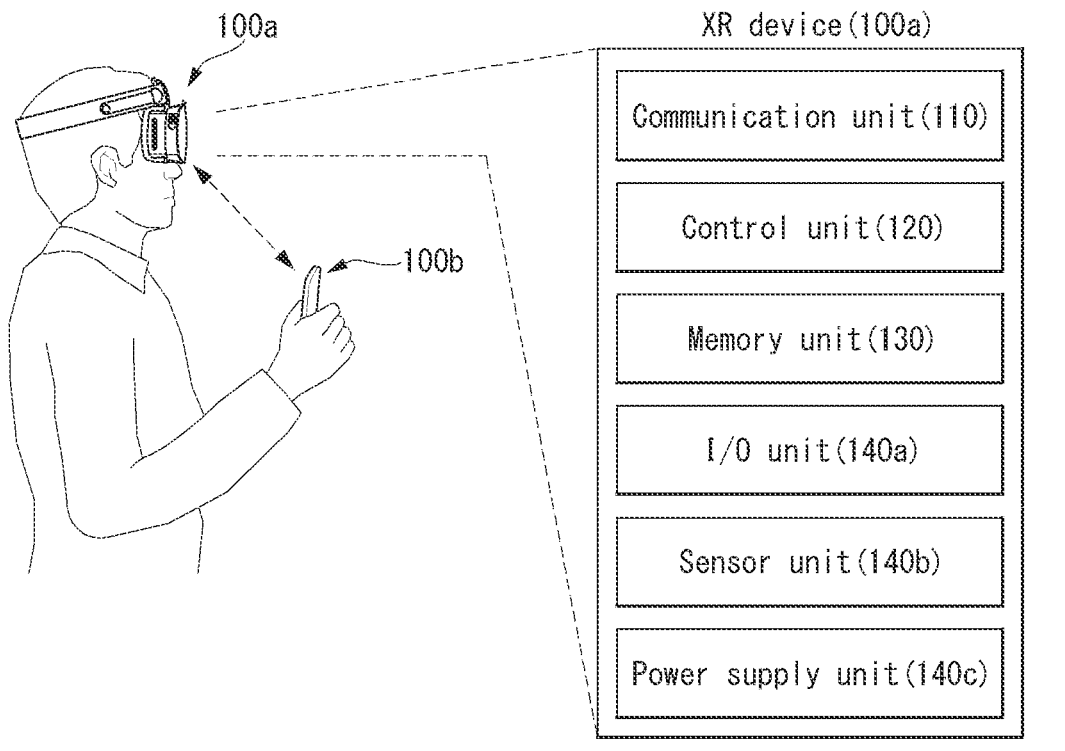

【FIG. 40】
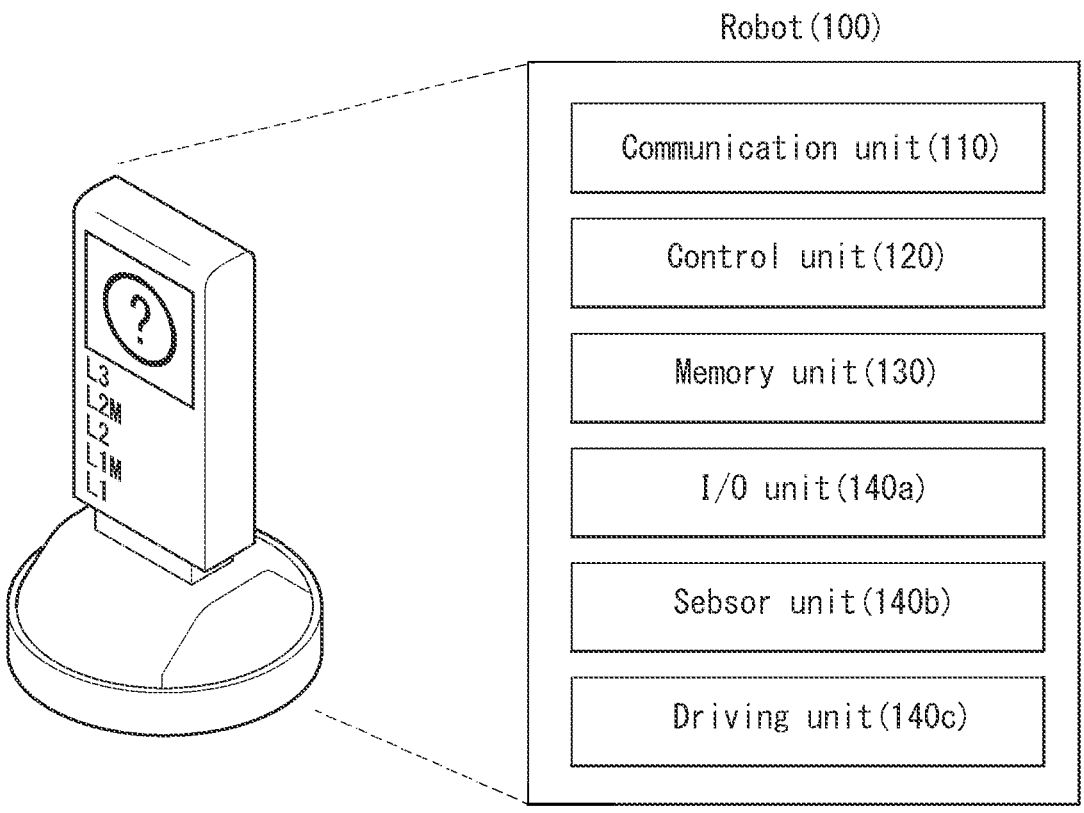
【FIG. 41】
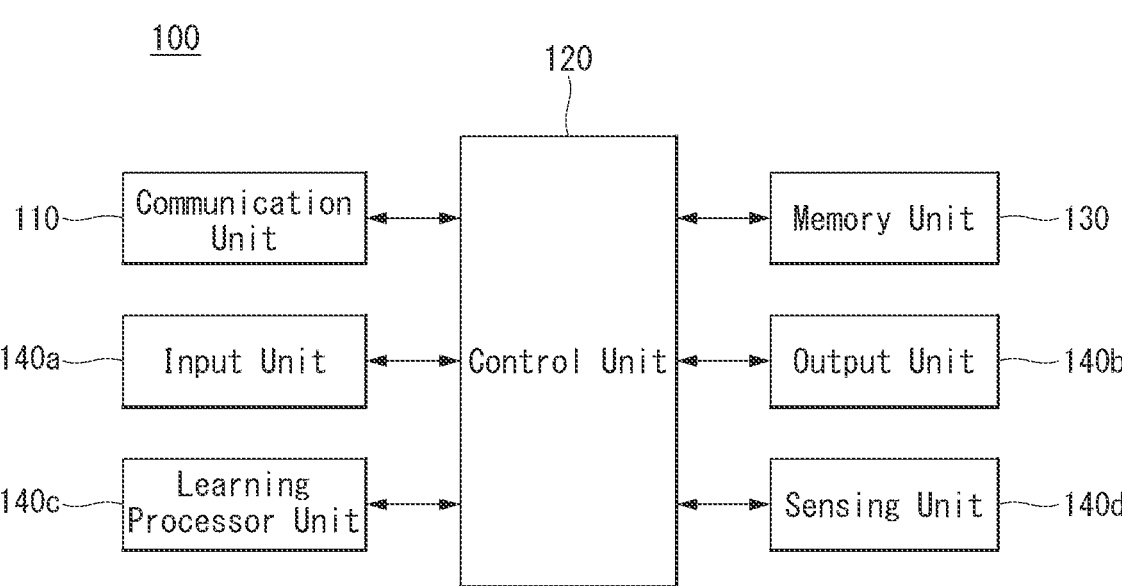

METHOD AND DEVICE FOR PERFORMING FEDERATED LEARNING IN WIRELESS COMMUNICATION SYSTEM

CROSS-REFERENCE TO RELATED APPLICATIONS

This application is a National Stage application under 35 U.S.C. § 371 of International Application No. PCT/KR2021/006359, filed on May 21, 2021. The disclosure of the prior application is incorporated by reference in its entirety.

TECHNICAL FIELD

The present disclosure relates to a method of performing federated learning, and more particularly to a method of performing, by a plurality of user equipments (UEs), federated learning in a wireless communication system and a device therefor.

BACKGROUND ART

Wireless communication systems have been widely deployed to provide various types of communication services such as voice or data. In general, the wireless communication system is a multiple access system capable of supporting communication with multiple users by sharing available system resources (bandwidth, transmission power, etc.). Examples of multiple access systems include a code division multiple access (CDMA) system, a frequency division multiple access (FDMA) system, a time division multiple access (TDMA) system, a space division multiple access (SDMA) system, an orthogonal frequency division multiple access (OFDMA) system, a single carrier frequency division multiple access (SC-FDMA) system, and an interleave division multiple access (IDMA) system.

DISCLOSURE

Technical Problem

An object of the present disclosure is to provide a method of performing, by a plurality of UEs, federated learning in a wireless communication system and a device therefor.

Another object of the present disclosure is to provide a method of performing federated learning by reducing an impact of power of a channel estimation error when a plurality of UEs performs the federated learning, and a device therefor.

Another object of the present disclosure is to provide a method of indicating a performing method of federated learning of a proper scheme based on a value of a channel estimation error when a plurality of UEs performs the federated learning, and a device therefor.

Another object of the present disclosure is to provide a method of defining an operation between a UE and a base station if a performing method of federated learning is not indicated when a plurality of UEs performs the federated learning, and a device therefor.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

The present disclosure provides a method of performing, by a plurality of user equipments (UEs), a federated learning in a wireless communication system.

More specifically, the present disclosure provides a method of performing, by a plurality of user equipments (UEs), a federated learning in a wireless communication system, the method performed by one UE of the plurality of UEs comprising receiving, from a base station (BS), control information related to a scheduling of a resource on which the one UE repeatedly transmits a local parameter of the one UE, wherein a global parameter for the federated learning is updated based on respective local parameters of the plurality of UEs; transmitting, to the BS, a first signal including the local parameter of the one UE on a first resource scheduled based on the control information; and transmitting, to the BS, a second signal including the local parameter of the one UE on a second resource that is scheduled based on the control information and is different from the first resource, wherein the first signal and the second signal are transmitted based on the first signal and the second signal being in a complex conjugate relationship.

The method may further comprise, before the first signal and the second signal are transmitted, performing a specific operation for removing an impact of a channel on each of the first signal and the second signal.

A method of the specific operation may be one of (i) a first method of compensating, based on an amplitude and a phase of an estimated channel for a channel between the one UE and the BS, the channel and (ii) a second method of compensating, based on an average amplitude of estimated channels for channels between the plurality of UEs and the BS and a phase of the estimated channels, the channel.

The method may further comprise receiving, from the BS, specific operation information for the method of the specific operation.

Based on a ratio of a magnitude of a channel estimation error power, which is a power of channel estimation errors which are errors between channels between the plurality of UEs and the BS and estimated channels for the channels, to a magnitude of a total power of transmission signals of the plurality of UEs, the method of the specific operation represented by the specific operation information may be determined as one of the first method and the second method.

Based on the ratio of the magnitude of the channel estimation error power to the magnitude of the total power being equal to or less than a specific value, the specific operation information may represent the first method. Based on the ratio of the magnitude of the channel estimation error power to the magnitude of the total power being greater than the specific value, the specific operation information may represent the second method.

The method may further comprise, based on the method of the specific operation represented by the specific operation information being the first method, receiving, from the BS, information on the amplitude and a value of the phase of the estimated channel. Based on the specific operation determined as the first method, the channel between the one UE and the BS may be compensated with the amplitude and the value of the phase of the estimated channel included in the information.

The method may further comprise, based on the method of the specific operation represented by the specific operation information being the second method, receiving, from the BS, information on a value of the phase of the estimated channel.

Based on the method of the specific operation represented by the specific operation information being the second method, an amplitude of the channel between the one UE and the BS may be compensated at the one UE or the BS.

The method may further comprise, based on the amplitude of the channel being compensated at the one UE, receiving, from the BS, information on a value of the average amplitude of the estimated channels. Based on the specific operation determined as the second method, the channel between the one UE and the BS may be compensated with the average amplitude and a value of the phase of the estimated channels.

The information on the value of the average amplitude of the estimated channels may be transmitted in a broadcast scheme.

The method may further comprise, based on the first signal and the second signal being transmitted after the one UE receives the specific operation information, determining the method of the specific operation performed on the first signal and the second signal based on the specific operation information. The specific operation may be performed on the first signal and the second signal based on the determined method of the specific operation.

The method may further comprise receiving, from the BS, information representing the method of the specific operation performed by the one UE before the one UE receives the specific operation information. The information may represent one of the first method and the second method, and based on the first signal and the second signal being transmitted before the one UE receives the specific operation information, the specific operation may be performed on the first signal and the second signal based on the information.

The method may further comprise transmitting, to the BS, a reference signal for a channel estimation of the BS for a specific channel on which a signal of the one UE is transmitted, and receiving, from the BS, channel information based on a result of the channel estimation of the BS based on the reference signal. The channel estimation error power may be determined based on the channel information.

The method may further comprise receiving, from the BS, a downlink signal including the updated global parameter.

The present disclosure provides one user equipment (UE) of a plurality of UEs performing a federated learning in a wireless communication system, the one UE comprising a transmitter configured to transmit a radio signal, a receiver configured to receive the radio signal, at least one processor, and at least one computer memory operably connectable to the at least one processor, wherein the at least one computer memory is configured to store instructions that allow the at least one processor to perform operations based on being executed by the at least one processor, wherein the operations comprise receiving, from a base station (BS), control information related to a scheduling of a resource on which the one UE repeatedly transmits a local parameter of the one UE, wherein a global parameter for the federated learning is updated based on respective local parameters of the plurality of UEs; transmitting, to the BS, a first signal including the local parameter of the one UE on a first resource scheduled based on the control information; and transmitting, to the BS, a second signal including the local parameter of the one UE on a second resource that is scheduled based on the control information and is different from the first resource, wherein the first signal and the second signal are transmitted based on the first signal and the second signal being in a complex conjugate relationship.

The present disclosure provides a method of performing, by a base station (BS), a federated learning together with a plurality of user equipments (UEs) in a wireless communication system, the method comprising transmitting, to the plurality of UEs, control information related to a scheduling of a resource on which the plurality of UEs repeatedly transmit a local parameter; receiving, from each of the plurality of UEs, a first signal including the local parameter on a first resource scheduled based on the control information; receiving, from each of the plurality of UEs, a second signal including the local parameter on a second resource that is scheduled based on the control information and is different from the first resource; and updating a global parameter for the federated learning based on the local parameters received from each of the plurality of UEs, wherein the first signal and the second signal are transmitted based on the first signal and the second signal being in a complex conjugate relationship.

The present disclosure provides a base station (BS) performing a federated learning together with a plurality of user equipments (UEs) in a wireless communication system, the BS comprising a transmitter configured to transmit a radio signal; a receiver configured to receive the radio signal; at least one processor; and at least one computer memory operably connectable to the at least one processor, wherein the at least one computer memory is configured to store instructions that allow the at least one processor to perform operations based on being executed by the at least one processor, wherein the operations comprise transmitting, to the plurality of UEs, control information related to a scheduling of a resource on which the plurality of UEs repeatedly transmit a local parameter; receiving, from each of the plurality of UEs, a first signal including the local parameter on a first resource scheduled based on the control information; receiving, from each of the plurality of UEs, a second signal including the local parameter on a second resource that is scheduled based on the control information and is different from the first resource; and updating a global parameter for the federated learning based on the local parameters received from each of the plurality of UEs, wherein the first signal and the second signal are transmitted based on the first signal and the second signal being in a complex conjugate relationship.

The present disclosure provides a non-transitory computer readable medium (CRM) storing one or more instructions, wherein the one or more instructions executable by one or more processors are configured to allow one user equipment (UE) of a plurality of UEs performing a federated learning in a wireless communication system to receive, from a base station (BS), control information related to a scheduling of a resource on which the one UE repeatedly transmits a local parameter of the one UE, wherein a global parameter for the federated learning is updated based on respective local parameters of the plurality of UEs; transmit, to the BS, a first signal including the local parameter of the one UE on a first resource scheduled based on the control information; and transmit, to the BS, a second signal including the local parameter of the one UE on a second resource that is scheduled based on the control information and is different from the first resource, wherein the first signal and the second signal are transmitted based on the first signal and the second signal being in a complex conjugate relationship.

The present disclosure provides a device comprising one or more memories; and one or more processors functionally connected to the one or more memories, wherein the one or more processors are configured to allow the device to receive, from a base station (BS), control information related to a scheduling of a resource on which the one UE repeatedly transmits a local parameter of the one UE, wherein a global parameter for the federated learning is updated based on respective local parameters of the plurality of UEs; transmit, to the BS, a first signal including the local parameter of the one UE on a first resource scheduled based on the control information, and transmit, to the BS, a second signal including the local parameter of the one UE on a second resource that is scheduled based on the control information and is different from the first resource, wherein the first signal and the second signal are transmitted based on the first signal and the second signal being in a complex conjugate relationship.

Advantageous Effects

The present disclosure has an effect in which a plurality of UEs can perform federated learning in a wireless communication system.

The present disclosure has an effect in which federated learning can be performed by reducing an impact of power of a channel estimation error when a plurality of UEs performs the federated learning.

The present disclosure has an effect in which a performing method of federated learning of a proper scheme can be indicated based on a value of a channel estimation error when a plurality of UEs performs the federated learning.

The present disclosure has an effect in which operation ambiguity between a UE and a base station can be resolved by defining an operation between the UE and the base station even if a performing method of federated learning is not indicated when a plurality of UEs performs the federated learning.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates physical channels and general signal transmission used in a 3GPP system.

FIG. 2 illustrates an example of a communication structure providable in a 6G system.

FIG. 3 illustrates an example of a structure of a perceptron.

FIG. 4 illustrates an example of a structure of a multilayer perceptron.

FIG. 5 illustrates an example of a deep neural network.

FIG. 6 illustrates an example of a convolutional neural network.

FIG. 7 illustrates an example of a filter operation in a convolutional neural network.

FIG. 8 illustrates an example of a neural network structure in which a circular loop exists.

FIG. 9 illustrates an example of an operation structure of a recurrent neural network.

FIG. 10 illustrates an example of an electromagnetic spectrum.

FIG. 11 illustrates an example of THz communication application.

FIG. 12 illustrates an example of an electronic device-based THz wireless communication transceiver.

FIG. 13 illustrates an example of a method of generating an optical device-based THz signal.

Figure 14:
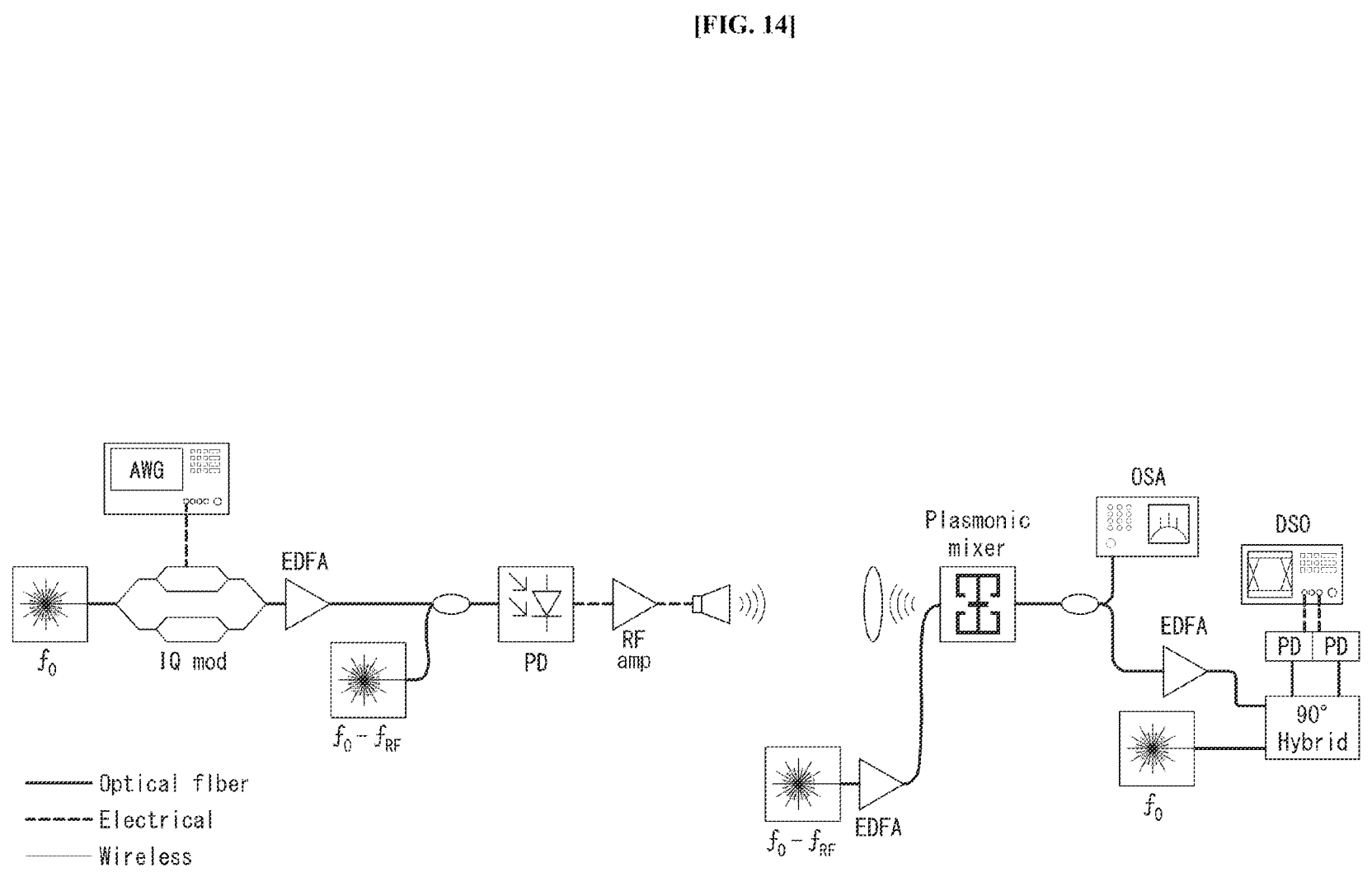

FIG. 14 illustrates an example of an optical device-based THz wireless communication transceiver.

FIG. 15 illustrates a structure of a photonic source based transmitter.

FIG. 16 illustrates a structure of an optical modulator.

FIG. 17 illustrates an example of federated learning performed between a plurality of devices and a server.

FIG. 18 illustrates another example of federated learning performed between a plurality of devices and a server.

FIG. 19 is a flow chart illustrating an example of an operation of performing federated learning from a perspective of one UE of a plurality of UEs performing the federated learning.

FIG. 20 is a flow chart illustrating an example of performing a local parameter transmission operation from a perspective of one UE of a plurality of UEs performing federated learning.

FIG. 21 illustrates an example where a UE performs federated learning by applying channel inversion pre-equalization and transmitting a signal.

FIG. 22 illustrates an example where a UE performs federated learning based on channel inversion pre-equalization and repetition transmission.

FIG. 23 illustrates an example where a UE performs federated learning based on channel inversion pre-equalization and conjugate repetition transmission.

FIG. 24 illustrates an example where a UE performs pre-equalization based on a phase value and a channel amplitude average value of an individual channel and performs federated learning through conjugate repetition transmission.

FIG. 25 illustrates an example of a channel and a channel estimation error.

FIG. 26 illustrates performance impact sensitivity depending on changes in a channel estimation error.

FIGS. 27 and 28 illustrate results of performance comparison of a channel inversion pre-equalization and single transmission method, a channel inversion pre-equalization and repetition transmission method, and a channel inversion pre-equalization and conjugate repetition transmission method.

FIGS. 29 and 30 illustrate results of performance comparison of a channel inversion pre-equalization and conjugate repetition transmission method and a channel compensation and conjugate repetition transmission method based on a phase value and a channel amplitude average value for each channel.

FIG. 31 is a flow chart illustrating an example of a method of performing federated learning in a wireless communication system described in the present disclosure.

FIG. 32 illustrates a communication system applied to the present disclosure.

FIG. 33 illustrates a wireless device applicable to the present disclosure.

FIG. 34 illustrates a signal processing circuit for a transmission signal.

FIG. 35 illustrates another example of a wireless device applied to the present disclosure.

FIG. 36 illustrates a hand-held device applied to the present disclosure.

FIG. 37 illustrates a vehicle or an autonomous vehicle applied to the present disclosure.

FIG. 38 illustrates a vehicle applied to the present disclosure.

FIG. 39 illustrates an XR device applied to the present disclosure.

FIG. 40 illustrates a robot applied to the present disclosure.

FIG. 41 illustrates an AI device applied to the present disclosure.

MODE FOR INVENTION

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro. 3GPP 6G may be an evolved version of 3GPP NR.

For clarity in the description, the following description will mostly focus on 3GPP communication system (e.g. LTE-A or 5G NR). However, technical features according to an embodiment of the present disclosure will not be limited only to this. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR/6G may be collectively referred to as the 3GPP system. For terms and techniques not specifically described among terms and techniques used in the present disclosure, reference may be made to a wireless communication standard document published before the present disclosure is filed. For example, the following document may be referred to.

3GPP LTE
   36.211: Physical channels and modulation
   36.212: Multiplexing and channel coding
   36.213: Physical layer procedures
   36.300: Overall description
   36.331: Radio Resource Control (RRC)
3GPP NR
   38.211: Physical channels and modulation
   38.212: Multiplexing and channel coding
   38.213: Physical layer procedures for control
   38.214: Physical layer procedures for data
   38.300: NR and NG-RAN Overall Description
   38.331: Radio Resource Control (RRC) protocol specification Physical Channel and Frame Structure
Physical Channel and General Signal Transmission FIG. 1 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S701). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S12).

When there is no radio resource first accessing the eNB or for signal transmission, the UE may perform a Random Access Procedure (RACH) to the eNB (S13 to S16). To this end, the UE may transmit a specific sequence to a preamble through a Physical Random Access Channel (PRACH) (S13 and S15) and receive a response message (Random Access Response (RAR) message) for the preamble through the PDCCH and a corresponding PDSCH. In the case of a contention based RACH, a Contention Resolution Procedure may be additionally performed (S16).

The UE that performs the above procedure may then perform PDCCH/PDSCH reception (S17) and Physical Uplink Shared Channel (PUSCH)/Physical Uplink Control Channel (PUCCH) transmission (S18) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

The control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., via the PUSCH and/or PUCCH.

Structure of Unlink and Downlink Channels
Downlink Channel Structure

A base station transmits a related signal to a UE via a downlink channel to be described later, and the UE receives the related signal from the base station via the downlink channel to be described later.

(1) Physical Downlink Shared Channel (PDSCH)

A PDSCH carries downlink data (e.g., DL-shared channel transport block, DL-SCH TB) and is applied with a modulation method such as quadrature phase shift keying (QPSK), 16 quadrature amplitude modulation (QAM), 64 QAM, and 256 QAM. A codeword is generated by encoding TB. The PDSCH may carry multiple codewords. Scrambling and modulation mapping are performed for each codeword, and modulation symbols generated from each codeword are mapped to one or more layers (layer mapping). Each layer is mapped to a resource together with a demodulation reference signal (DMRS) to generate an OFDM symbol signal, and is transmitted through a corresponding antenna port.

(2) Physical Downlink Control Channel (PDCCH)

A PDCCH carries downlink control information (DCI) and is applied with a QPSK modulation method, etc. One PDCCH consists of 1, 2, 4, 8, or 16 control channel elements (CCEs) based on an aggregation level (AL). One CCE consists of 6 resource element groups (REGs). One REG is defined by one OFDM symbol and one (P)RB.

The UE performs decoding (aka, blind decoding) on a set of PDCCH candidates to acquire DCI transmitted via the PDCCH. The set of PDCCH candidates decoded by the UE is defined as a PDCCH search space set. The search space set may be a common search space or a UE-specific search space. The UE may acquire DCI by monitoring PDCCH candidates in one or more search space sets configured by MIB or higher layer signaling.

Uplink Channel Structure

A UE transmits a related signal to a base station via an uplink channel to be described later, and the base station receives the related signal from the UE via the uplink channel to be described later.

(1) Physical Uplink Shared Channel (PUSCH)

A PUSCH carries uplink data (e.g., UL-shared channel transport block, UL-SCH TB) and/or uplink control information (UCI) and is transmitted based on a CP-OFDM (Cyclic Prefix-Orthogonal Frequency Division Multiplexing) waveform, DFT-s-OFDM (Discrete Fourier Transform-spread-Orthogonal Frequency Division Multiplexing) waveform, or the like. When the PUSCH is transmitted based on the DFT-s-OFDM waveform, the UE transmits the PUSCH by applying a transform precoding. For example, if the transform precoding is not possible (e.g., transform precoding is disabled), the UE may transmit the PUSCH based on the CP-OFDM waveform, and if the transform precoding is possible (e.g., transform precoding is enabled), the UE may transmit the PUSCH based on the CP-OFDM waveform or the DFT-s-OFDM waveform. The PUSCH transmission may be dynamically scheduled by an UL grant within DCI, or may be semi-statically scheduled based on high layer (e.g., RRC) signaling (and/or layer 1 (L1) signaling (e.g., PDCCH)) (configured grant). The PUSCH transmission may be performed based on a codebook or a non-codebook.

(2) Physical Uplink Control Channel (PUCCH)

A PUCCH carries uplink control information, HARQ-ACK, and/or scheduling request (SR), and may be divided into multiple PUCCHs based on a PUCCH transmission length.

6G System General

A 6G (wireless communication) system has purposes such as (i) a very high data rate per device, (ii) a very large number of connected devices. (iii) global connectivity, (iv) a very low latency, (v) a reduction in energy consumption of battery-free IoT devices, (vi) ultra-reliable connectivity, and (vii) connected intelligence with machine learning capability. The vision of the 6G system may include four aspects such as intelligent connectivity, deep connectivity, holographic connectivity, and ubiquitous connectivity. The 6G system may satisfy the requirements shown in Table 1 below. That is, Table 1 shows an example of the requirements of the 6G system.

TABLE 1

| Per device peak data rate | 1 Tbps |
|---|---|
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion, and enhanced data security.

Figure 2:
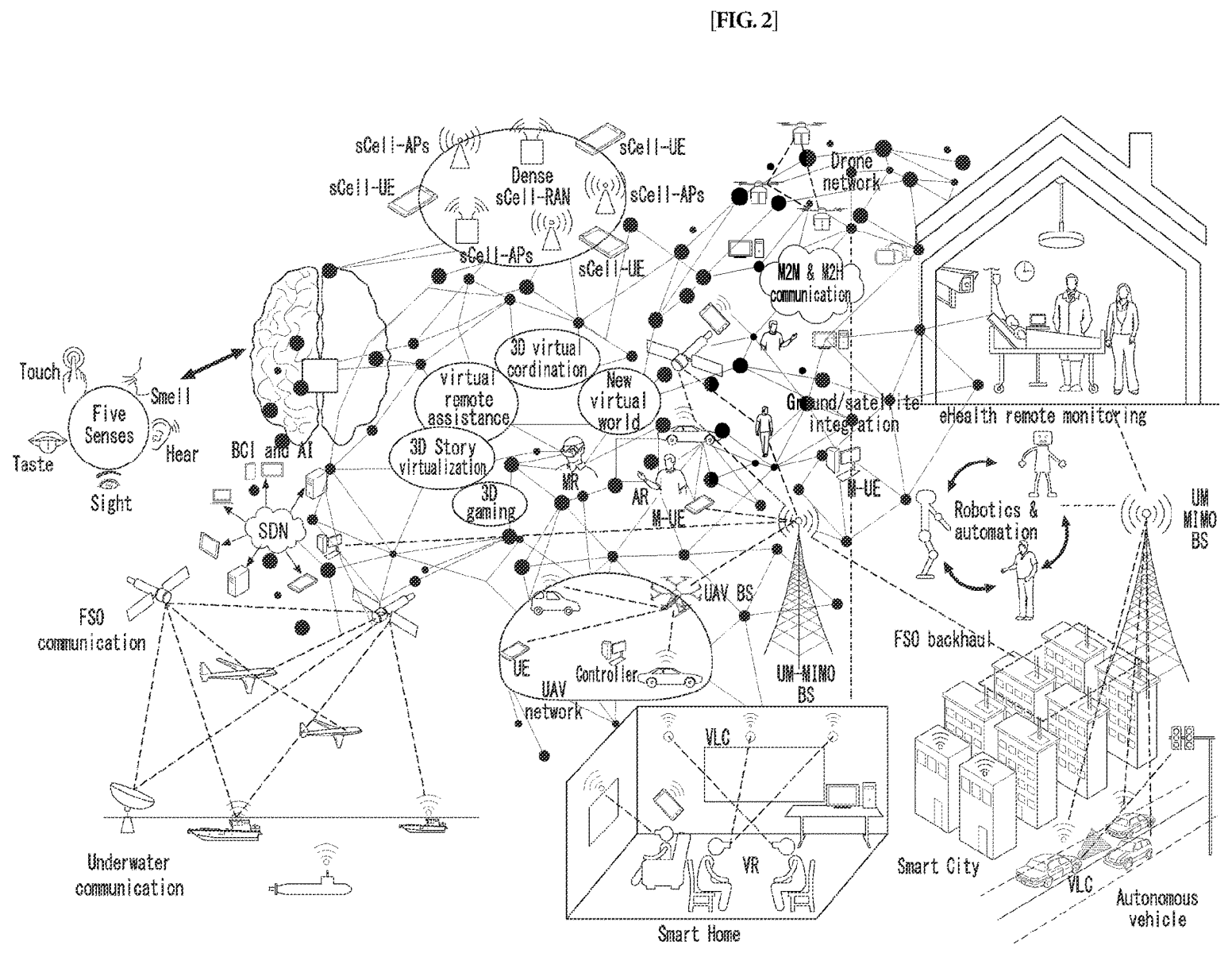

FIG. 2 illustrates an example of a communication structure providable in a 6G system.

The 6G system is expected to have 50 times greater simultaneous wireless communication connectivity than a 5G wireless communication system. URLLC, which is the key feature of 5G, will become more important technology by providing an end-to-end latency less than 1 ms in 6G communication. The 6G system may have much better volumetric spectrum efficiency unlike frequently used domain spectrum efficiency. The 6G system can provide advanced battery technology for energy harvesting and very long battery life, and thus mobile devices may not need to be separately charged in the 6G system. In 6G, new network characteristics may be as follows.

Satellites integrated network; To provide a global mobile group. 6G will be integrated with satellite. Integration of terrestrial, satellite and public networks into one wireless communication system is critical for 6G.

Connected intelligence; Unlike the wireless communication systems of previous generations, 6G is innovative and may update wireless evolution from "connected things" to "connected intelligence". AI may be applied in each step (or each signal processing procedure to be described later) of a communication procedure.

Seamless integration of wireless information and energy transfer; A 6G wireless network may transfer power to charge batteries of devices such as smartphones and sensors. Therefore, wireless information and energy transfer (WIET) will be integrated.

Ubiquitous super 3D connectivity; Access to networks and core network functions of drone and very low earth orbit satellite will establish super 3D connectivity in 6G ubiquitous.

In the new network characteristics of 6G described above, several general requirements may be as follows.

Small cell networks: The idea of a small cell network has been introduced to improve received signal quality as a result of throughput, energy efficiency, and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network consisting of heterogeneous networks improves overall QoS and reduces costs.

High-capacity backhaul: Backhaul connectivity is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability. Further, billions of devices can be shared on a shared physical infrastructure.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging.

AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

A deep learning based AI algorithm requires a lot of training data in order to optimize training parameters. However, due to limitations in acquiring data in a specific channel environment as the training data, a lot of training data is used offline. Static training for the training data in the specific channel environment may cause a contradiction between the diversity and dynamic characteristics of a radio channel.

Currently, the deep learning mainly targets real signals. However, signals of the physical layer of wireless communication are complex signals. For matching of the characteristics of a wireless communication signal, studies on a neural network for detecting a complex domain signal are further required.

Hereinafter, machine learning is described in more detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

An artificial neural network is an example of connecting several perceptrons.

Referring to FIG. 3, when an input vector x=(x1, x2, . . . , xd) is input, each component is multiplied by a weight (32, W2, . . . , Wd), and all the results are summed. After that, the entire process of applying an activation function σ(·) is called a perceptron. The huge artificial neural network structure may extend the simplified perceptron structure illustrated in FIG. 3 to apply the input vector to different multidimensional perceptrons. For convenience of explanation, an input value or an output value is referred to as a node.

The perceptron structure illustrated in FIG. 3 may be described as consisting of a total of three layers based on the input value and the output value. FIG. 4 illustrates an artificial neural network in which the number of (d+1) dimensional perceptrons between a first layer and a second layer is H, and the number of (H+1) dimensional perceptrons between the second layer and a third layer is K, by way of example. FIG. 4 illustrates an example of a structure of a multilayer perceptron.

A layer where the input vector is located is called an input layer, a layer where a final output value is located is called an output layer, and all layers located between the input layer and the output layer are called a hidden layer. FIG. 4 illustrates three layers, by way of example. However, since the number of layers of the artificial neural network is counted excluding the input layer, it can be seen as a total of two layers. The artificial neural network is constructed by connecting the perceptrons of a basic block in two dimensions.

The above-described input layer, hidden layer, and output layer can be jointly applied in various artificial neural network structures, such as CNN and RNN to be described later, as well as the multilayer perceptron. The greater the number of hidden layers, the deeper the artificial neural network is, and a machine learning paradigm that uses the sufficiently deep artificial neural network as a learning model is called deep learning. In addition, the artificial neural network used for deep learning is called a deep neural network (DNN).

The deep neural network illustrated in FIG. 5 is a multilayer perceptron consisting of eight hidden layers+eight output layers. The multilayer perceptron structure is expressed as a fully connected neural network. In the fully connected neural network, a connection relationship does not exist between nodes located at the same layer, and a connection relationship exists only between nodes located at adjacent layers. The DNN has a fully connected neural network structure and is composed of a combination of multiple hidden layers and activation functions, so it can be usefully applied to understand correlation characteristics between input and output. The correlation characteristic may mean a joint probability of input and output. FIG. 5 illustrates an example of a deep neural network.

Based on how the plurality of perceptrons are connected to each other, various artificial neural network structures different from the above-described DNN can be formed.

In the DNN, nodes located inside one layer are arranged in a one-dimensional longitudinal direction. However, in FIG. 6, it may be assumed that w nodes horizontally and h nodes vertically are arranged in two dimensions (convolutional neural network structure of FIG. 6). In this case, since in a connection process leading from one input node to the hidden layer, a weight is given for each connection, a total of h×w weights needs to be considered. Since there are h×w nodes in the input layer, a total of h2w2 weights are required between two adjacent layers.

FIG. 6 illustrates example of a structure of a convolutional neural network

The convolutional neural network of FIG. 6 has a problem in that the number of weights increases exponentially according to the number of connections, so instead of considering the connection of all modes between adjacent layers, it is assumed that a filter having a small size exists. Thus, as shown in FIG. 7, weighted sum and activation function calculations are performed on a portion where the filters overlap.

One filter has a weight corresponding to the number as much as the size, and learning of the weight may be performed so that a certain feature on an image can be extracted and output as a factor. In FIG. 7, a filter having a size of 3×3 is applied to the upper leftmost 3×3 area of the input layer, and an output value obtained by performing a weighted sum and activation function operation for a corresponding node is stored in z22.

While scanning the input layer, the filter performs weighted summation and activation function calculation while moving horizontally and vertically by a predetermined interval, and places the output value at the position of the current filter. This method of operation is similar to the convolution operation on images in the field of computer vision, so a deep neural network with this structure is called a convolutional neural network (CNN), and a hidden layer generated as a result of the convolution operation. Is referred to as a convolutional layer. In addition, a neural network in which a plurality of convolutional layers exists is referred to as a deep convolutional neural network (DCNN).

FIG. 7 illustrates an example of a filter operation in a convolutional neural network.

In the convolutional layer, the number of weights may be reduced by calculating a weighted sum by including only nodes located in a region covered by the filter in the node where the current filter is located. Due to this, one filter can be used to focus on features for the local area. Accordingly, the CNN can be effectively applied to image data processing in which the physical distance in the 2D area is an important criterion. Meanwhile, in the CNN, a plurality of filters may be applied immediately before the convolution layer, and a plurality of output results may be generated through a convolution operation of each filter.

There may be data whose sequence characteristics are important according to data properties. Considering the length variability of the sequence data and the relationship between the sequence data, one element in the data sequence is input at each timestep, and the output vector (hidden vector) of the hidden layer output at a specific time point is input together with the next element in the sequence. The structure applied to the artificial neural network is called a recurrent neural network structure.

Referring to FIG. 8, a recurrent neural network (RNN) is a fully connected neural network with elements (x1(t), x2(t), . . . , xd(t)) of any line of sight t on a data sequence. In the process of inputting, the point t−1 immediately preceding is the weighted sum and activation function by inputting the hidden vectors (z1(t−1), z2(t−1), . . . , zH(t−1)) together. It is a structure to be applied. The reason for transferring the hidden vector to the next view in this way is that information in the input vector at the previous views is regarded as accumulated in the hidden vector of the current view.

FIG. 8 illustrates an example of a neural network structure in which a circular loop.

Referring to FIG. 8, the recurrent neural network operates in a predetermined order of time with respect to an input data sequence.

Hidden vectors (z1(1), z2(1), . . . , zH(1)) is input with the input vector (x1(2), x2(2), . . . , xd(2)) of the time point 2, and the vector (z1(2), z2(2), . . . , zH(2)) is determined. This process is repeatedly performed up to the time point 2, time point 3, . . . , time point T.

FIG. 9 illustrates an example of an operation structure of a recurrent neural network.

Meanwhile, when a plurality of hidden layers are disposed in a recurrent neural network, this is referred to as a deep recurrent neural network (DRNN). The recurrent neural network is designed to be usefully applied to sequence data (for example, natural language processing).

As a neural network core used as a learning method, in addition to DNN, CNN, and RNN, Restricted Boltzmann Machine (RBM), deep belief networks (DBN), and deep Q-networks Network), and can be applied to fields such as computer vision, speech recognition, natural language processing, and voice/signal processing.

Recently, attempts to integrate AI with a wireless communication system have appeared, but this has been concentrated in the field of wireless resource management and allocation in the application layer, network layer, in particular, deep learning. However, such research is gradually developing into the MAC layer and the physical layer, and in particular, attempts to combine deep learning with wireless transmission in the physical layer have appeared. The AI-based physical layer transmission refers to applying a signal processing and communication mechanism based on an AI driver, rather than a traditional communication framework in the fundamental signal processing and communication mechanism. For example, deep learning-based channel coding and decoding, deep learning-based signal estimation and detection, deep learning-based MIMO mechanism, AI-based resource scheduling and allocation, and the like, nay be included.

Terahertz (THz) Communication

A data transfer rate can be increased by increasing the bandwidth. This can be performed by using sub-TH communication as a wide bandwidth and applying advanced massive MIMO technology. THz waves, which are known as sub-millimeter radiation, generally indicate a frequency band between 0.1 THz and 10 THz with the corresponding wavelengths in the range of 0.03 mm-3 mm. A band range of 100 GHz to 300 GHz (sub THz band) is regarded as a main part of the THz band for cellular communication. When the sub-THz band is added to the mmWave band, the 6G cellular communication capacity increases. 300 GHz-3 THz among the defined THz band is in a far infrared (IR) frequency band. Although the 300 GHz-3 THz band is part of the optical band, it is at the border of the optical band and is immediately after the RF band. Therefore, this 300 GHz-3 THz band shows similarity with RF. FIG. 10 illustrates an example of an electromagnetic spectrum.

The main characteristics of THz communication include (i) a bandwidth widely available to support a very high data transfer rate and (ii) a high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Through this, an advanced adaptive arrangement technology capable of overcoming a range limitation can be used.

Optical Wireless Technology

Optical wireless communication (OWC) technologies are envisioned for 6G communication in addition to RF based communications for all possible device-to-access networks. These networks access network-to-backhaul/fronthaul network connectivity. The OWC technologies have already been used since 4G communication systems, but will be used more widely to meet the demands of the 6G communication system. The OWC technologies, such as light fidelity, visible light communication, optical camera communication, and FSO communication based on the optical band, are already well-known technologies. Communications based on wireless optical technologies can provide very high data rates, low latencies, and secure communications. LiDAR, which is also based on the optical band, is a promising technology for very high-resolution 3D mapping in 6G communications.

FSO Backhaul Network

Characteristics of a transmitter and a receiver of the FSO system are similar to characteristics of an optical fiber network. Therefore, data transmission of the FSO system similar to that of the optical fiber system. Accordingly. FSO can be a good technology for providing backhaul connectivity in the 6G system along with the optical fiber network. If FSO is used, very long-distance communication is possible even at a distance of 10,000 km or more. FSO supports massive backhaul connectivity for remote and non-remote areas such as sea, space, underwater, and isolated islands. FSO also supports cellular BS connectivity.

Massive MIMO Technology

One of core technologies for improving spectral efficiency is to apply MIMO technology. When the MIMO technology is improved, the spectral efficiency is also improved. Therefore, massive MIMO technology will be important in the 6G system. Since the MIMO technology uses multiple paths, multiplexing technology and beam generation and management technology suitable for the THz band should be significantly considered so that data signals can be transmitted through one or more paths.

Block Chain

A block chain will be an important technology for managing large amounts of data in future communication systems. The block chain is a form of distributed ledger technology, and the distributed ledger is a database distributed across numerous nodes or computing devices. Each node duplicates and stores the same copy of the ledger. The block chain is managed by a P2P network. This may exist without being managed by a centralized institution or server. Block chain data is collected together and is organized into blocks. The blocks are connected to each other and protected using encryption. The block chain completely complements large-scale IoT through improved interoperability, security, privacy, stability, and scalability. Accordingly, the block chain technology provides several functions such as interoperability between devices, high-capacity data traceability, autonomous interaction of different IoT systems, and large-scale connection stability of 6G communication systems.

3D Networking

The 6G system integrates the ground and air networks to support communications for users in the vertical extension. The 3D BSs will be provided by low-orbit satellites and UAVs. The addition of new dimensions in terms of height and the associated degrees of freedom makes 3D connectivity significantly different from traditional 2D networks.

Quantum Communication

Unsupervised reinforcement learning in networks is promising in the context of 6G networks. Supervised learning approaches will not be practical for labeling large amounts of data generated in 6G. Unsupervised learning does not require labeling. Therefore, this technique can be used to create the representations of complex networks autonomously. By combining reinforcement learning and unsupervised learning, it is possible to operate the network truly autonomously.

Unmanned Aerial Vehicle

An unmanned aerial vehicle (UAV) or drone will be an important factor in 6G wireless communication. In most cases, a high-speed data wireless connection is provided using UAV technology. A BS entity is installed in the UAV to provide cellular connectivity. The UAVs have specific features, which are not found in fixed BS infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC, and mMTC. The UAV can also support a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and different communication technologies is very important in 6G systems. As a result, the user can move seamlessly from one network to another network without the need for making any manual configurations in the device. The best network is automatically selected from the available communication technology. This will break the limits of the concept of cells in wireless communications. Currently, the user's movement from one cell to another cell causes too many handovers in dense networks, and also causes handover failures, handover delays, data losses, and the ping-pong effect. The 6G cell-free communications will overcome all these and provide better QoS. Cell-free communication will be achieved through multi-connectivity and multi-tier hybrid techniques and by different and heterogeneous radios in the devices.

Integration of Wireless Information and Energy Transfer (WIET)

WIET uses the same field and wave as a wireless communication system. In particular, a sensor and a smartphone w-ill be charged using wireless power transfer during 3p communication. WIET is a promising technology for extending the life of battery charging wireless systems. Therefore, devices without battery will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connectivity such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Holo-gram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Larae Intelligent Surface (LIS)

In the THz band signal, since the straightness is strong, there may be many shaded areas due to obstacles. By installing the LIS near these shaded areas, LIS technology, that expands a communication area, enhances communication stability, and enables additional optional services, becomes important. The LIS is an artificial surface made of electromagnetic materials, and can change propagation of incoming and outgoing radio waves. The LIS can be viewed as an extension of massive MIMO, but is different from the massive MIMO in an array structure and an operating mechanism. Further, the LIS has an advantage such as low power consumption, because this operates as a reconfigurable reflector with passive elements, that is, signals are only passively reflected without using active RF chains. In addition, since each of the passive reflectors of the LIS has to independently adjust the phase shift of an incident signal, this may be advantageous for wireless communication channels. By properly adjusting the phase shift through an LIS controller, the reflected signal can be collected at a target receiver to boost the received signal power.

Terahertz (THz) Wireless Communication General

FIG. 10 illustrates an example of an electromagnetic spectrum.

THz wireless communication uses wireless communication using a THz wave having a frequency of approximately 0.1 to 10 THz (1 THz=1012 Hz) and may refer to THz band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays, has a shorter wavelength than the RF/millimeter wave to have high straightness, and is capable of beam convergence. In addition, the photon energy of the THz wave is only a few meV and thus is harmless to the human body. A frequency band which is expected to be used for THz wireless communication may be D-band (110 GHz to 170 GHz) or H-band (220 GHz to 325 GHz) band with a low propagation loss due to molecular absorption in air. Standardization discussion on THz wireless communication is being discussed mainly in IEEE 802.15 THz working group in addition to 3GPP, and standard documents issued by a task group of IEEE 802.15 (e.g., TG3d, TG3e) can specify and supplement the description of the present disclosure. The THz wireless communication may be applied to wireless cognition, sensing, imaging, wireless communication, THz navigation, etc. FIG. 11 illustrates an example of a THz communication application.

As illustrated in FIG. 11, a THz wireless communication scenario may be classified into a macro network, a micro network, and a nanoscale network. In the macro network, THz wireless communication may be applied to vehicle-to-vehicle connectivity and backhaul/fronthaul connectivity. In the micro network, THz wireless communication may be applied to near-field communication such as indoor small cells, fixed point-to-point or multi-point connection such as wireless connection in a data center, and kiosk downloading.

Table 2 below shows an example of technology which can be used in the THz wave.

TABLE 2

| Transceivers Device | Available immature: UTC-PD, RTD and SBD |
|---|---|
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

THz wireless communication can be classified based on a method for generating and receiving THz. The method of generating THz can be classified as an optical device or an electronic device-based technology. FIG. 12 illustrates an example of an electronic device-based THz wireless communication transceiver.

The method of generating THz using an electronic device includes a method using a semiconductor device such as a resonant tunneling diode (RTD), a method using a local oscillator and a multiplier, a monolithic microwave integrated circuit (MMIC) method using a compound semiconductor high electron mobility transistor (HEMT) based integrated circuit, a method using a Si-CMOS based integrated circuit, and the like. In FIG. 12, a multiplier (e.g., doubler, tripler) is applied to increase the frequency, and radiation is performed by an antenna via a subharmonic mixer. Since the THz band forms a high frequency, the multiplier is essential. Here, the multiplier is a circuit that allows the frequency to have an output frequency which is N times an input frequency, and the multiplier matches a desired harmonic frequency and filters out all the remaining frequencies. In addition, beamforming may be implemented by applying an array antenna or the like to the antenna of FIG. 12. In FIG. 12, IF denotes an intermediate frequency, a tripler and a multiplier denote a multiplier, PA denotes a power amplifier, LNA denotes a low noise amplifier, and PLL denotes a phase-locked loop.

FIG. 13 illustrates an example of a method of generating an optical device-based THz signal. FIG. 14 illustrates an example of an optical device-based THz wireless communication transceiver.

The optical device-based THz wireless communication technology refers to a method of generating and modulating a THz signal using an optical device. The optical device-based THz signal generation technology refers to a technology that generates an ultrahigh-speed optical signal using a laser and an optical modulator and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the optical device-based THz signal, as illustrated in FIG. 13, a laser diode, a broadband optical modulator, and an ultrahigh-speed photodetector are required. In FIG. 13, light signals of two lasers having different wavelengths are combined to generate a THz signal corresponding to difference in a wavelength between the lasers. In FIG. 13, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 14, an erbium-doped fiber amplifier (EDFA) denotes an optical fiber amplifier to which erbium is added, a photo detector (PD) denotes a semiconductor device capable of converting an optical signal into an electrical signal, and OSA denotes an optical sub assembly in which various optical communication functions (e.g., photoelectnc conversion, electrophotic conversion, etc.) are modularized as one component, and DSO denotes a digital storage oscilloscope.

A structure of a photoelectric converter is described with reference to FIGS. 15 and 16. FIG. 15 illustrates a structure of a photonic source-based transmitter. FIG. 16 illustrates a structure of an optical modulator.

Generally, an optical source of a laser may change a phase of a signal by passing through an optical wave guide. In this instance, data is carried by changing electrical characteristics through a microwave contact, or the like. Thus, an optical modulator output is formed in the form of a modulated waveform. A photoelectric modulator (O/E converter) may generate THz pulses based on an optical rectification operation by a nonlinear crystal, a photoelectric conversion (O/E conversion) by a photoconductive antenna, and emission from a bunch of relativistic electrons. The THz pulse generated in the above manner may have a length of a unit from femto second to pico second. The photoelectric converter (O/E converter) performs down-conversion using non-linearity of the device.

Considering THz spectrum usage, multiple contiguous GHz bands are likely to be used as fixed or mobile service usage for the terahertz system. According to outdoor scenario criteria, an available bandwidth may be classified based on oxygen attenuation 10^2 dB/km in the spectrum of up to 1 THz. Hence, a framework in which the available bandwidth consists of several band chunks may be considered. As an example of the framework, if the length of the THz pulse for one carrier is set to 50 ps, the bandwidth (BW) is about 20 GHz.

The effective down-conversion from the infrared (IR) band to the THz band depends on how to utilize the nonlinearity of the photoelectric converter (O/E converter). That is, for down-conversion into a desired THz band, design of the photoelectric converter (O/E converter) having the most ideal non-linearity to move to the corresponding THz band is required. If a photoelectric converter (O/E converter) which is not suitable for a target frequency band is used, there is a high possibility that an error occurs with respect to an amplitude and a phase of the corresponding pulse.

In a single carrier system, a THz transmission/reception system may be implemented using one photoelectric converter. In a multi-carrier system, as many photoelectric converters as the number of carriers may be required, which may vary depending on the channel sr; environment. Particularly, in a multi-carrier system using multiple broadbands according to the plan related to the above-described spectrum usage, the phenomenon will be prominent. In this regard, a frame structure for the multi-carrier system may be considered. A down-frequency-converted signal based on the photoelectric converter may be transmitted in a specific resource area (e.g., a specific frame). The frequency domain of the specific resource area may include a plurality of chunks. Each chunk may consist of at least one component carrier (CC).

Federated Learning

Federated learning, one of the techniques of distributed machine learning, is where each of a plurality of devices that are the subject of learning shares a local model parameter with a server, and the server updates a global parameter by collecting the local model parameters of each of the various devices. The local model parameter may include parameters such as weight or gradient of a local model, and it is obvious that the local model parameter can be expressed in various ways within the range where the local model parameter can be interpreted as identical/similar to a local parameter, a regional parameter, etc. When the federated learning technique is applied to 5G communication or 6G communication, etc., the device may be a user equipment (UE), and the server may be a base station (BS). Hereinafter, the UE/device and the server/BS may be used interchangeably for convenience of explanation.

In the above process, since the respective devices do not share raw data with the server, communication overhead in the data transmission process can be reduced and personal information of the device (user) can be protected.

FIG. 17 illustrates an example of federated learning performed between a plurality of devices and a server.

More specifically, FIG. 17 illustrates an orthogonal division access-based federated learning operation process.

Devices 1711, 1712, and 1713 transmit their local parameters to a server 1720 on resources allocated to the respective devices 1711, 1712, and 1713, in 1710. In this instance, before transmitting the local parameters of the devices 1711, 1712, and 1713, the devices 1711, 1712, and 1713 may first receive configuration information on learning parameters for federated learning from the server 1720. The configuration information on the learning parameters for federated learning may include parameters such as weight or gradient of a local model, and the learning parameters included in the local parameters transmitted by the devices 1711, 1712, and 1713 may be determined based on the configuration information. After receiving the configuration information, the devices 1711, 1712, and 1713 may receive control information for resource allocation for transmission of the local parameters. The devices 1711, 1712, and 1713 may respectively transmit the local parameters on resources allocated based on the control information.

Afterwards, the server 1720 performs offline aggregations 1721 and 1722 on the local parameters respectively received from the devices 1711, 1712, and 1713.

Generally, the server 1720 averages all the local parameters received from the devices 1711, 1712, and 1713 participating in the federated learning to derive a global parameter and transmits again the derived global parameter to each of the devices 1711, 1712, and 1713. However, in the orthogonal division access-based federated learning operation process under the limited resources, there may be a problem in that the time required to update the global parameter is delayed (increased) as the number of devices participating in learning increases.

FIG. 18 illustrates another example of federated learning performed between a plurality of devices and a server.

More specifically, FIG. 18 illustrates an over-the-air (OTA) computation-based federated learning operation process. The OTA computation may be simply referred to as AirComp.

An AirComp based federated learning method is a method in which all devices participating in federated learning each transmit a local parameter on the same resource. Based on the AirComp based federated learning, the problem, described in FIG. 17, in that the time required to update the global parameter is delayed as the number of devices participating in learning can be solved.

In FIG. 18, devices 1811, 1812, and 1813 transmit their local parameters to a server 1820 on resources equally allocated to them, in 1810. In this instance, before transmitting the local parameters of the devices 1811, 1812, and 1813, the operations (configuration information reception and control information reception) performed before transmitting the local parameters as described in FIG. 17 may be equally performed in FIG. 18.

The local parameters transmitted by the devices 1811, 1812, and 1813 are transmitted based on an analog waveform, and the server 1820 may obtain a sum of the local parameters based on the superposition property of the local parameters, 1821. Afterwards, the server 1820 averages all the local parameters to derive a global parameter and transmits again the derived global parameter to each of the devices 1811, 1812, and 1813.

In the AirComp based federated learning, since the devices participating in the federated learning each transmit the local parameter on the same resource, latency is not significantly affected by the number of devices participating in the learning. Tat is, even if the number of devices participating in the federated learning increases, the time required to update the global parameter is not greatly changed, compared to when a small number of devices participates in the federated learning.

The operations described in FIGS. 17 and 18 may be summarized as illustrated in FIG. 19. FIG. 19 is a flow chart illustrating an example of an operation of performing federated learning from a perspective of one UE of a plurality of UEs performing the federated learning.

First, one UE of a plurality of UEs performing federated learning may receive configuration information related to a learning parameter for the federated learning from a base station serving as a server in the federated learning, in S1910. The configuration information may include parameters such as weight or gradient of a local model related to the federated learning.

Next, the one UE may receive, from the base station, control information related to scheduling of resource for transmission of a local parameter used for updating a global parameter, in S1920. In this instance, if the federated learning is AirComp based federated learning, the resources allocated by the control information may be shared among the plurality of UEs participating in the federated learning.

Afterwards, the one UE may transmit its local parameter on the allocated resource based on the control information, in S1930. Here, transmitting the local parameter may be understood as transmitting a signal for the local parameter.

Next, the one UE may receive, from the base station, the updated global parameter through the base station based on the local parameters of the plurality of UEs, in S1940.

In the AirComp based federated learning, a signal transmitted to the base station on a wireless channel by the UE participating in the learning may pass through the wireless channel and may be affected by the channel. In this instance, the local parameters received from the server may have signal distortion due to an influence of the wireless channel. Therefore, due to the influence of distortion of the received signal, it is difficult for the base station to accurately obtain the average of information (weight or gradient) on the local parameters included in the received signal. Thus, a specific operation to remove the influence of the wireless channel on the signal transmitted by the UE need to be performed in advance before transmitting the signal for the local parameters.

When the operation is performed to remove the influence of the wireless channel on the signal, the step S1920 of FIG. 19 may be sub-divided as illustrated in FIG. 20.

FIG. 20 is a flow chart illustrating an example of performing a local parameter transmission operation from a perspective of one UE of a plurality of UEs performing federated learning.

With reference to FIG. 20, a detailed operation for local parameter transmission of one UE of a plurality of UEs performing federated learning and a specific operation to remove an influence of a wireless channel on a signal are described in detail below.

First, the one UE may transmit a reference signal for channel estimation to the base station, in S1932. A sounding reference signal, a demodulation reference signal (DM-RS), a phase tracking reference signal (PT-RS), etc. used in 5G communication systems may be used for transmission of the reference signal.

Next, the one UE may receive, from the base station, channel information on an estimated channel based on the reference signal, in S1934. The channel information may include a channel amplitude of the estimated channel, a phase of the estimated channel, etc. The estimated channel is a channel between the one UE and the base station estimated by the base station based on the reference signal.

Afterwards, the one UE may perform a specific operation of previously removing an influence of the channel between the one UE and the base station on the signal transmitted by the one UE based on the channel information, in S1936. The specific operation refers to an operation of compensating the signal with the channel amplitude and/or phase of the estimated channel included in the channel information. More specifically, compensating the signal may mean performing an operation to divide the signal by the channel amplitude and/or phase of the estimated channel.

The specific operation may be a pre-equalizer or zero-forcing (ZF) beamforming. More specifically, the pre-equalizer may be performed when devices participating in the federated learning transmit signals based on a single antenna, and the ZF beamforming may be performed when devices participating in the federated learning transmit signals based on multiple antennas. The pre-equalizer may be referred to as pre-equalization, and may be expressed in various ways within the scope of the same/similar interpretation.

Method of Mitigating Channel Estimation Error During Operation to Remove Influence of Channel on Transmission Signal When a UE performs a specific operation, such as a pre-equalizer and ZF beamforming, for removing an influence of channel, there may occur an error (channel estimation error) between (i) an actual wireless channel and (ii) an estimated channel based on a reference signal of the UE between a base station and the UE, and the channel estimation error causes performance degradation in the AirComp based federated learning. To efficiently perform the Air-Comp based federated learning, a method is needed to mitigate the performance degradation due to the channel estimation error when performing the specific operation. The present disclosure describes a method of mitigating performance degradation due to a channel estimation error when a UE performing federated learning performs a specific operation in the AirComp based federated learning.

Hereinafter, the present disclosure is described focusing on an operation based on the pre-equalizer being performed in an SISO environment, for convenience of explanation, but this is merely for convenience of explanation, and methods described in the present disclosure are not limited thereto.

The method of mitigating the performance degradation due to the channel estimation error when the UE performs the pre-equalizer may be described by being divided into two methods. That is, the two methods proposed in the present disclosure include 1) a method of performing a channel inversion pre-equalizer and transmitting a repeatedly transmitted signal through conjugate repetition (SISO I, CR) [proposal 1], and 2) a method of performing a pre-equalizer compensating only a phase component and transmitting a repeatedly transmitted signal through conjugate repetition (SISO II) [proposal 2]. In addition, the present disclosure proposes a method of selectively applying the proposal 1 and the proposal 2 based on performance characteristics of the proposal 1 and the proposal 2 [proposal 3].

Before describing the proposals proposed in the present disclosure, rules for expression ways, such as equation, used to explain the proposals are defined. Characters expressed by x, x, X and $\mathbb{X}$ denote a scalar, a vector, a matrix, and a set in order, respectively. Further, x[i] denotes an i-th entry of vector x, and $[x[i]]_{i=m}$=[x[m], x[m+1], . . . , x[n]]. |x| denotes an absolute value of x, and |x| denotes cardinality of a set of x. Further, $(x)_+$=[max $(x_i,0)]_{i=1}^{|x|}$ $and$ $(x)_-$=[min $(x_i,0)]_{i=1}^{|x|}$. Finally, real(x) and imag(x) denote a real part and an imaginary part of x.

Channel Inversion Pre-Equalization and Single Transmission Method (SISO I)

This method relates to a method of performing federated learning based on a method of transmitting a signal only once (single transmission) while performing a channel inversion pre-equalization method, for helping the understanding of the proposal 1 and the proposal 2 proposed in the present disclosure.

A UE performs channel inversion pre-equalization using an uplink channel estimated by a base station (server) and transmits a local parameter to the base station.

FIG. 21 illustrates an example where a UE performs federated learning by applying channel inversion pre-equalization and transmitting a signal.

More specifically. FIG. 21 illustrates a concept diagram of an AirComp scheme of applying channel inversion pre-equalization and transmitting a signal (a signal for a local parameter) when there are three users, i.e., when three UEs perform federated learning.

In FIG. 21, each of three UEs 2111, 2112, and 2113 participating in federated learning transmits a reference signal for channel estimation to a base station 2120. Afterwards, the base station 2120 estimates respective channels between the base station 2120 and the three UEs 2111, 2112, and 2113 based on the reference signals received from the three UEs 2111, 2112, and 2113. The three UEs 2111, 2112, and 2113 respectively receive information on the estimated channels from the base station 2120. More specifically, the first UE 2111 receives, from the base station 2120, information on channel in which h0 that is the channel between the first UE 2111 and the base station 2120 is estimated. The second UE 2112 receives, from the base station 2120, information on channel in which h1 that is the channel between the second UE 2112 and the base station 2120 is estimated. The third UE 2113 receives, from the base station 2120, information on channel in which h2 that is the channel between the third UE 2113 and the base station 2120 is estimated. The information on the estimated channels may include information on amplitudes and phases of the estimated channels. In this instance, the respective estimated channels may be expressed as in Equation 1 below.

$$h_{u\_hat} = \hat{h}_u = h_u + e_u: \text{ estimated channel} \quad \text{[Equation 1]}$$

$$h_u = \alpha_u q_u$$

$q_u$: channel phase
$\alpha_u$: channel amplitude
$\hat{h}$ is an estimated channel coefficient, and 'e' is a channel estimation error. 'h' is an actual channel coefficient and is expressed as the product of a channel amplitude 'a' and a channel phase 'q'. Both the estimated channel coefficient and the actual channel coefficient may be expressed in the form of a+j*b, where a and b are a real number, and j is a complex number $\sqrt{-1}$. In the Equation 1, the subscript 'u' corresponds to each user participating in the federated learning. That is, variables of u=0 may be variables corresponding to the first UE 2111.

Before passing through the channel between the base station and the UE, a signal to which a channel inversion pre-equalization 2110 is applied may be expressed in the form of x/ĥ. That is, the channel inversion pre-equalization means performing an operation in which the UE divides a signal to be transmitted by an amplitude value and a phase value of the estimated channel before the signal transmission.

Afterwards, when the signal to which the pre-equalization is applied passes through the channel and then is received by the base station 2120, the received signal may be expressed as in Equation 2 below.

$$y_0 = \beta^T x + w_0 \quad \text{[Equation 2]}$$

$$\text{where } [\beta]_u = \frac{h_u}{\hat{h}_u} = 1 - \frac{e_u}{\hat{h}_u}.$$

More specifically, by multiplying the signal with the form of x/ĥ by the actual channel coefficient h, the signal received by the base station 2120 may be expressed in the form of (x/ĥ)*h. The signal with the form of (x/ĥ)*h passing through the channel may be summarized and expressed as in Equation 2.

Here, w is an additive white Gaussian noise (AWGN) noise. Further, β is a vector, and $[\beta]_u$ is a u-th element of β, where u denotes an index of the user. It can be seen from the Equation 2 that the received signal has a channel estimation error component of $$\frac{e_u}{\hat{h}_u}.$$

Channel Inversion Pre-Equalization+Repetition (SISO I, R)

This method relates to a method of performing federated learning based on a channel inversion pre-equalization and repetition transmission method, for helping the understanding of the proposal 1 and the proposal 2 proposed in the present disclosure.

A UE performs channel inversion pre-equalization on a signal for a local parameter, which is first transmitted, using an uplink channel estimated by a base station (server) and transmits the signal for the local parameter to the base station. Afterwards, the UE performs the channel inversion pre-equalization on the repeatedly transmitted signal using the estimated uplink channel and transmits the repeatedly transmitted signal, on which the channel inversion pre-equalization is performed, to the base station. In this instance, the first transmitted signal for the local parameter and the repeatedly transmitted signal may be transmitted on different resources. The present disclosure assumes that channels of different resources used for repetition transmission are the same or substantially the same.

FIG. 22 illustrates an example where a UE performs federated learning based on channel inversion pre-equalization and repetition transmission.

More specifically, FIG. 22 illustrates a concept diagram of an AirComp scheme of performing federated learning based on channel inversion pre-equalization and repetition transmission when there are three users, i.e., when three UEs perform federated learning.

In FIG. 22, 1st Tx(2101) and 2nd Tx(2102) denote signals repeatedly transmitted on different resources, respectively.

In FIG. 22, each of three UEs 2211, 2212, and 2213 participating in federated learning transmits a reference signal for channel estimation to a base station 2220. Afterwards, the base station 2220 estimates respective channels between the base station 2220 and the three UEs 2211, 2212, and 2213 based on the reference signals received from the three UEs 2211, 2212, and 2213. The three UEs 2211, 2212, and 2213 respectively receive information on the estimated channels from the base station 2220. More specifically, the first UE 2211 receives, from the base station 2220, information on channel in which h0 that is the channel between the first UE 2211 and the base station 2220 is estimated. The second UE 2212 receives, from the base station 2220, information on channel in which h1 that is the channel between the second UE 2212 and the base station 2220 is estimated. The third UE 2213 receives, from the base station 2220, information on channel in which h2 that is the channel between the third UE 2213 and the base station 2220 is estimated. In this instance, the contents described above with reference to the Equation 1 can be equally applied to the estimated channels.

Afterwards, when the signal to which the pre-equalization and repetition transmission is applied passes through the channel and then is received by the base station 2220, the received signal may be expressed as in Equation 3 below.

In FIG. 22, 1st Rx denotes a received signal for the 1st Tx(2101), and 2nd Rx denotes a received signal for the 2nd Tx(2102).

$$y_0 = \beta^T x + w_0: 1^{st} Rx \quad \text{[Equation 3]}$$

$$y_1 = \beta^T x + w_1: 2^{nd} Rx$$

$$y = y_0 + y_1 =$$

$$(\beta^T + \beta^T)x + w_0 + w_1 = 2\beta^T x + w_0 + w_1: \text{ Combined } Rx$$

$$\text{where } [\beta]_u = \frac{h_u}{\hat{h}_u} = 1 - \frac{e_u}{\hat{h}_u}.$$

A process in which the 1st Tx(2101) and the 2nd Tx(2102) are respectively defined as the 1st Rx and the 2nd Rx of the Equation 3 may be described by equally applying the contents described in the Equation 2.

Here, w is an additive white Gaussian noise (AWGN) noise. Further, $\beta$ is a vector, and $[\beta]_u$ is a u-th element of $\beta$. Further, h is a channel coefficient, $\hat{h}$ is an estimated channel coefficient, and e is a channel estimation error. In addition, u denotes an index of the user. That is, variables of u=0 may be variables corresponding to the first UE 2211.

When the UE repeatedly transmits the signal for the local parameter, a performance gain can be obtained for the AWNG noise. On the other hand, since channel estimation components experienced by the 1st Rx and the 2nd Rx are the same, no performance gain can be obtained for the channel estimation error.

Method of Performing Channel Compensation Using Channel Inversion Pre-Equalizer and Transmitting Signal Through Conjugate Repetition (SISO I, CR)—Proposal 1

This proposal relates to a method of performing federated learning based on a method in which a UE participating in federated learning performs channel inversion pre-equalization on a signal before signal transmission and performs conjugate repetition transmission of a signal for a local parameter. More specifically, the conjugate repetition transmission means that the UE repeatedly transmits the signal so that (i) a first transmitted signal and (ii) a signal transmitted after the first transmitted signal have a complex conjugate relationship. For example, when the UE repeatedly transmits the signal for the local parameter, if the first transmitted signal is a+j*b, the signal transmitted after the first transmitted signal may be a−j*b, where a and b are a real number, and j is a complex number $\sqrt{1}$.

The UE performs channel inversion pre-equalization on a signal for a local parameter, which is first transmitted, using an uplink channel estimated by a base station (server) and transmits the signal for the local parameter to the base station. Afterwards, the UE performs the channel inversion pre-equalization on a repeatedly transmitted signal using the estimated uplink channel and transmits, to the base station, the repeatedly transmitted signal on which the channel inversion pre-equalization is performed. In this instance, the first transmitted signal for the local parameter and the repeatedly transmitted signal have a complex conjugate relationship. Further, the first transmitted signal for the local parameter and the repeatedly transmitted signal may be transmitted on different resources. The present disclosure assumes that channels of different resources used for repetition transmission are the same or substantially the same.

FIG. 23 illustrates an example where a UE performs federated learning based on channel inversion pre-equalization and conjugate repetition transmission.

More specifically, FIG. 23 illustrates a concept diagram of an AirComp scheme when there are three users, i.e., when three UEs perform federated learning. Here, the AirComp based federated learning is performed based on channel inversion pre-equalization and conjugate repetition transmission. The present disclosure is described based on the three UEs participating in the federated learning for convenience of explanation, but methods described in the present disclosure are not limited thereto.

FIG. 23 illustrates three UEs 2311, 2312, and 2313 participating in the federated learning, but an operation performed between a first UE 2311 and a base station 2320 is mainly described for convenience of explanation.

In FIG. 23, 1st Tx(2301) and 2nd Tx(2302) denote signals repeatedly transmitted on different resources, respectively.

First, the first UE 2311 transmits a reference signal for channel estimation to the base station 2320. Afterwards, the base station 2320 estimates a channel between the base station 2320 and the first UE 2311 based on the received reference signal. The first UE 2311 receives information on the estimated channel from the base station 2320. More specifically, the first UE 2311 receives, from the base station 2320, information on channel in which h0 that is the channel between the first UE 2311 and the base station 2320 is estimated. The information on the estimated channel may include information on an amplitude and a phase of the estimated channel. In this instance, the contents described above with reference to the Equation 1 can be equally applied to the estimated channels in FIG. 23.

Afterwards, the first UE 2311 performs channel inversion pre-equalization on a signal X0 for a local parameter, in 2310a. The first UE 2311 transmits, to the base station 2320, the signal X0 for the local parameter on which the channel inversion pre-equalization is performed (applied), and the signal X0 passes through the channel between the first UE 2311 and the base station 2320 and is received by the base station 2320. The above-described operation related to the 1st Tx(2301) performed between the first UE 2311 and the base station 2320 may be equally/similarly performed between the second UE 2312 and the third UE 2313 and the base station 2320.

In FIG. 23, based on the operations performed between the first to third UEs 2311, 2312, and 2313 and the base station 2320 in relation to the 1st Tx(2301), a received signal in the base station may be expressed as in Equation 4 below.

$$y_0 = \beta^T x + w_0 : 1st\ Rx \qquad \text{[Equation 4]}$$

In the Equation 4, a received signal y0 may have superposition form of the 1st Tx(2301) signals respectively transmitted by the first to third UEs 2311, 2312, and 2313.

Here, $$[\beta]_u = \frac{h_u}{\hat{h}_u} = 1 - \frac{e_u}{\hat{h}_u},$$

where $[\beta]_u$ is a u-th element of $\beta$, h is a channel coefficient, $\hat{h}$ is an estimated channel coefficient, and e is a channel estimation error. Further, x is a signal (data) for a local parameter of the first to third UEs 2311, 2312, and 2313, and w is an additive white Gaussian noise (AWGN) noise.

Again from a perspective of the first UE 2311, the first UE 2311 performs a complex conjugate operation on the same signal X0 as the signal transmitted from the 1st Tx(2301), and performs the channel inversion pre-equalization on (X0)* which is a complex conjugate signal, in 2310b. The first UE 2311 transmits, to the base station 2320, the complex conjugate signal (X0)* on which the channel inversion pre-equalization is performed (applied), and the signal X0 passes through the channel between the first UE 2311 and the base station 2320 and is received by the base station 2320. The above-described operation related to the 2nd Tx(2302) performed between the first UE 2311 and the base station 2320 may be equally/similarly performed between (i) the second UE 2312 and the third UE 2313 and (ii) the base station 2320.

In FIG. 23, based on the operations performed between the first to third UEs 2311, 2312, and 2313 and the base station 2320 in relation to the 2nd Tx(2302), a received signal in the base station may be expressed as in Equation 5 below.

$$y_1 = \beta^T x^* + w_1 : 2nd\ Rx \qquad \text{[Equation 5]}$$

In the Equation 5, a received signal y1 may have superposition form of the 2nd Tx(2302) signals respectively transmitted by the first to third UEs 2311, 2312, and 2313.

Here, $$[\beta]_u = \frac{h_u}{\hat{h}_u} = 1 - \frac{e_u}{\hat{h}_u},$$

where $[\beta]_u$ is a u-th element of $\rho$, h is a channel coefficient, $\hat{h}$ is an estimated channel coefficient, and e is a channel estimation error. Further, x is a signal for a local parameter of the first to third UEs 2311, 2312, and 2313, and w is an additive white Gaussian noise (AWGN) noise.

Afterwards, a complex conjugate operation on the received signal y1 of the Equation 5 is performed by the base station 2320, and (i) the received signal y0 of the Equation 4 and (ii) y1* on which the complex conjugate operation is performed are combined and may be expressed as in Equation 6 below.

$$y = y_0 + y_1^* = \qquad \text{[Equation 6]}$$
$$(\beta^T + \beta^H)x + w_0 + (w_1)^* = 2\tilde{\beta}x + w_0 + (w_1)^* : Combined\ Rx$$

Here, $$[\beta]_u = \frac{h_u}{\hat{h}_u} = 1 - \frac{e_u}{\hat{h}_u}, 2\tilde{\beta}^T[\beta^T + \beta^H] = 2\mathrm{Re}(\beta^T)\ \text{and}\ [\tilde{\beta}^T]_u = 1 - \mathrm{Re}\left\{\frac{e_u}{\hat{h}_u}\right\},$$

where $\beta$ is a vector, $[\beta]_u$ is a u-th element of $\beta$, h is a channel coefficient, $\hat{h}$ is an estimated channel coefficient, and e is a channel estimation error.

A global parameter for federated learning may be updated based on the combined received signal y of the Equation 6. The first to third UEs 2311, 2312, and 2313 may receive the updated global parameter from the base station 2320.

In the example of FIG. 23, a channel estimation component experienced by a 1st Rx signal that is the received signal of the base station corresponding to the 1st Tx(2301) is the same as a channel estimation component experienced by a 2nd Rx signal that is the received signal of the base station corresponding to the 2nd Tx(2302). However, according to the Equation 6, the base station 2320 performs again the complex conjugate operation on a 2nd Rx signal y1, corresponding to the 2nd Tx signal (2302), on which the complex conjugate operation is performed and transmitted, and combines the 1st Rx signal y0 and the complex conjugate 2nd Rx signal (y1*). Hence, a channel error impact experienced by the 1st Rx signal y0 and the 2nd Rx signal y1 varies. That is, a channel estimation error after the combining is performed by the base station includes only a real component $$\left(Re\left\{\frac{e_u}{\hat{h}_u}\right\}\right)$$

of a channel estimation error before the combining is performed. Accordingly, based on the conjugate repetition transmission operation, a performance gain against the AWGN noise and a performance gain against the channel estimation error can be obtained.

A Rx mean squared error (MSE), which is a performance indicator for the proposal 1, is expressed in as Equation 7 below.

$$MSE = \frac{1}{U^2}E[(\tilde{\beta}-1)^T(\tilde{\beta}-1)]\sigma_x^2 + \frac{\sigma_w^2}{2U^2} \qquad \text{[Equation 7]}$$
$$= \frac{1}{U^2}E[(\tilde{\beta}-1)^T(\tilde{\beta}-1)]\sigma_x^2 + \frac{\sigma_w^2}{2U^2}$$
$$= \frac{\sigma_x^2}{U^2}\sum_{u=0}^{U-1}E\left[\left|\mathrm{Re}\left(\frac{e_u}{\hat{h}_u}\right)\right|^2\right] + \frac{\sigma_w^2}{2U^2}$$

In the Equation 7, U, $\sigma_x^2$, and $\sigma_w^2$ denote the number of users (the number of UEs participating in federated learning), Tx power, and noise power, respectively. The MSE may increase as the power of the channel estimation error increases.

In other words, the MSE increases as the power of the channel estimation error increases. On the other hand, since the channel estimation error in this proposal based on the conjugate repetition transmission includes only a real part of a total channel estimation error, the federated learning method based on this proposal can have higher performance, compared to federated learning based on simple repetition transmission including both a real part and an imaginary part of a total channel estimation error.

Method of Performing Channel Compensation Using Phase Value and Channel Amplitude Average Value of Individual Channel and Transmitting Signal Through Conjugate Repetition (SISO II)—Proposal 2

This proposal relates to a method of performing federated learning based on a method in which a UE participating in federated learning performs pre-equalization on a phase value before signal transmission and then performs conjugate repetition transmission of a signal for a local parameter. In this proposal, channel amplitude compensation based on an average value of a plurality of channels between a plurality of UEs participating in federated learning and a base station may be performed by the UEs or performed by the base station. Here, the conjugate repetition transmission means that the UE repeatedly transmits the signal so that (i) a first transmitted signal and (ii) a signal transmitted after the first transmitted signal have a complex conjugate relationship. For example, when the UE repeatedly transmits the signal for the local parameter, if the first transmitted signal is a+j*b, the signal transmitted after the first transmitted signal may be a−j*b, where a and b are a real number, and j is a complex number $\sqrt{-1}$.

A UE performs pre-equalization only on a phase component of an estimated channel with respect to a signal for a local parameter, which is first transmitted, using an uplink channel estimated by a base station (server) and transmits, to the base station, the signal for the local parameter in which the pre-equalization is performed only on the phase component. If the UE performs pre-equalization on an amplitude component, the UE may additionally perform pre-equalization on a channel amplitude component using an average value of respective channel amplitudes of the plurality of UEs participating in federated learning. Afterwards, the UE performs the pre-equalization only on a phase component of an estimated channel with respect to a repeatedly transmitted signal using the estimated uplink channel and transmits, to the base station, the repeatedly transmitted signal in which the pre-equalization is performed only on the phase component. If the UE performs pre-equalization on an amplitude component, the UE may additionally perform pre-equalization on a channel amplitude component using the average value of the respective channel amplitudes of the plurality of UEs participating in federated learning. In this instance, the first transmitted signal for the local parameter and the repeatedly transmitted signal have a complex conjugate relationship. Further, the first transmitted signal for the local parameter and the repeatedly transmitted signal may be transmitted on different resources. The present disclosure assumes that channels of different resources used for repetition transmission are the same or substantially the same.

FIG. 24 illustrates an example where a UE performs pre-equalization based on a phase value and a channel amplitude average value of an individual channel and performs federated learning through conjugate repetition transmission.

More specifically, FIG. 24 illustrates a concept diagram of an AirComp based federated learning scheme when there are three users, i.e., when three UEs perform federated learning. Here, the AirComp based federated learning is performed based on pre-equalization and conjugate repetition transmission based on a phase value and a channel amplitude average value of an individual channel, and FIG. 24 illustrates an example where channel compensation based on the channel amplitude average value is performed by the UE. The present disclosure is described based on the three UEs participating in the federated learning for convenience of explanation, but methods described in the present disclosure are not limited thereto.

FIG. 24 illustrates three UEs 2411, 2412, and 2413 participating in the federated learning, but an operation performed between a first UE 2411 and a base station 2420 is mainly described for convenience of explanation.

In FIG. 24, 1st Tx(2401) and 2nd Tx(2402) denote signals repeatedly transmitted on different resources, respectively.

First, the first UE 2411 transmits a reference signal for channel estimation to the base station 2420. Afterwards, the base station 2420 estimates a channel between the base station 2420 and the first UE 2411 based on the received reference signal. The first UE 2411 receives information on the estimated channel from the base station 2420. More specifically, the first UE 2411 receives, from the base station 2420, information related to channel in which h0 that is the channel between the first UE 2411 and the base station 2420 is estimated. Since FIG. 24 relates to the example where the channel compensation based on the channel amplitude average value is performed by the UE, information related to the estimated channel may include (i) information on an average value of amplitudes of respective channels between the base station 2420 and the UEs 2411, 2412, and 2413 and (ii) information on a phase value of the channel in which the channel h0 between the first UE 2411 and the base station 2420 is estimated. On the other hand, if the channel compensation based on the channel amplitude average value is performed by the base station, the information related to the estimated channel may include only information on the phase value of the channel in which the channel h0 between the first UE 2411 and the base station 2420 is estimated. In this instance, the contents described above with reference to the Equation 1 can be equally applied to the estimated channels in FIG. 24.

Afterwards, the first UE 2411 performs pre-equalization on a signal X0 for a local parameter based on (i) an average value (a) of the amplitudes of the respective channels between the base station 2420 and the UEs 2411, 2412, and 2413 and (ii) the phase value of the channel in which the channel h0 between the first UE 2411 and the base station 2420 is estimated, in 2410a-1 and 2410a-2. For example, if an amplitude of the estimated channel between the first UE 2411 and the base station 2420 is a1, an amplitude of the estimated channel between the second UE 2412 and the base station 2420 is a2, and an amplitude of the estimated channel between the third UE 2413 and the base station 2420 is a3, the average value (a) of the amplitudes of the channels between the base station 2420 and the first to third UEs 2411, 2412, and 2413 may be (a1+a2+a3)/3.

The first UE 2411 transmits, to the base station 2420, the signal X0 for the local parameter on which the pre-equalization is performed, and the signal X0 passes through the channel between the first UE 2411 and the base station 2420 and is received by the base station 2420.

The above-described operation related to the 1st Tx(2301) performed between the first UE 2411 and the base station 2420 may be equally/similarly performed between the second UE 2412 and the third UE 2413 and the base station 2420. In FIG. 24, based on the operations performed between the first to third UEs 2411, 2412, and 2413 and the base station 2420 in relation to the 1st Tx(2401), a received signal in the base station may be expressed as in Equation 8 below.

$$y_0 = \beta^T x + w_0 \colon 1st\ Rx \qquad \text{[Equation 8]}$$

In the Equation 8, a received signal y0 may have superposition form of the 1st Tx(2401) signals respectively transmitted by the first to third UEs 2411, 2412, and 2413. $\not\leftarrow$ Here, $[\beta]_u = h_u(\hat{q}_u)^*/\hat{\alpha} = |h_u|e^{j\alpha_u}/\hat{\alpha}$, $\hat{\alpha} = E\{|\hat{h}_u|\}$, $\hat{q}_u = \measuredangle\hat{h}_u$, $q_u(\hat{q}_u) = e^{j\alpha_u}$, and $[\beta^T]_u = |h_u|\cos(a_u)/\hat{\alpha}$, where $\beta$ is a vector, $[\beta]_u$ is a u-th element of $\beta$, h is a channel coefficient, $\hat{h}$ is an estimated channel coefficient, and e is a channel estimation error. Further, $\hat{\alpha}$ is an average value of amplitudes of channels between UEs participating in federated learning and a base station. Further, x is a signal (data) for a local parameter of the first to third UEs 2411, 2412, and 2413, and w is an additive white Gaussian noise (AWGN) noise.

Again from a perspective of the first UE 2411, the first UE 2411 performs a complex conjugate operation on the same signal X0 as the signal transmitted from the 1st Tx(2401), and performs the pre-equalization on (X0)*, which is a complex conjugate signal, based on (i) the average value of the amplitudes of the respective channels between the base station 2420 and the UEs 2411, 2412, and 2413 and (ii) the phase value of the channel in which the channel h0 between the first UE 2411 and the base station 2420 is estimated, in 2410b-1 and 2410b-2.

The first UE 2411 transmits, to the base station 2420, the complex conjugate signal (X0)* on which the pre-equalization is performed (applied), and the signal X0 passes through the channel between the first UE 2411 and the base station 2420 and is received by the base station 2420. The above-described operation related to the 2nd Tx(2402) performed between the first UE 2411 and the base station 2420 may be equally/similarly performed between (i) the second UE 2412 and the third UE 2413 and (ii) the base station 2420.

In FIG. 24, based on the operations performed between the first to third UEs 2411, 2412, and 2413 and the base station 2420 in relation to the 2nd Tx(2402), a received signal in the base station may be expressed as in Equation 9 below.

$$y_1 = \beta^T x^* + w_1 : 2nd\ Rx \qquad \text{[Equation 9]}$$

In the Equation 9, a received signal y1 may have super-position form of the 2nd Tx(2402) signals respectively transmitted by the first to third UEs 2411, 2412, and 2413.

Here, $[\beta]_u = h_u(\hat{q}_u)^*/\hat{\alpha} = h_u|e^{j\alpha_u}/\hat{\alpha}$, $\hat{\alpha} = E\{|\hat{h}_u|\}$, $\hat{q}_u = \measuredangle \hat{h}_u$, $q_u(\hat{q}_u) = e^{j\alpha_u}$, and $[\hat{\beta}^T]_u = |h_u|\cos(a_u)/\hat{\alpha}$, where $\beta$ is a vector, $[\beta]_u$ is a u-th element of $\beta$, h is a channel coefficient, $\hat{h}$ is an estimated channel coefficient, and e is a channel estimation error. Further, $\hat{\alpha}$ is an average value of amplitudes of channels between UEs participating in federated learning and a base station. Further, x is a signal for a local parameter of the first to third UEs 2411, 2412, and 2413, and w is an additive white Gaussian noise (AWGN) noise.

Afterwards, a complex conjugate operation on the received signal y1 of the Equation 9 is performed by the base station 2420, and (i) the received signal y0 of the Equation 8 and (ii) y1* on which the complex conjugate operation is performed are combined and may be expressed as in Equation 10 below.

$$y = y_0 + y_1^* = \qquad \text{[Equation 10]}$$

$$(\beta^T + \beta^H)x + w_0 + (w_1)^* = 2\tilde{\beta}x + w_0 + (w_1)^* : Combined\ Rx$$

Here, $[\beta]u = h_u(\hat{q}_u)^*/\hat{\alpha} = |h_u|e^{j\alpha_u}/\hat{\alpha}$, $\hat{\alpha} = E\{|\hat{h}_u|\}$, q=4h_u, $q_u(q_u) = e^{j\alpha_u}$, and $[\hat{\beta}^T]_u = |h_u|\cos(a_u)/\hat{\alpha}$, where $\beta$ is a vector, $[\beta]_u$ is a u-th element of $\beta$, h is a channel coefficient, $\hat{h}$ is an estimated channel coefficient, and e is a channel estimation error. Further, $\hat{\alpha}$ is an average value of amplitudes of channels between UEs participating in federated learning and a base station. Further, x is a signal for a local parameter of the first to third UEs 2411, 2412, and 2413, and w is an additive white Gaussian noise (AWGN) noise.

A global parameter for federated learning may be updated based on the combined received signal y of the Equation 10. The Equation 10 relates to an example where compensation of a channel amplitude component is performed at a UE (a transmission end). The first to third UEs 2411, 2412, and 2413 may receive the updated global parameter from the base station 2420.

In the example of FIG. 24, a channel estimation component experienced by a 1st Rx signal that is the received signal of the base station corresponding to the 1st Tx(2401) is the same as a channel estimation component experienced by a 2nd Rx signal that is the received signal of the base station corresponding to the 2nd Tx(2402). However, according to the Equation 10, the base station 2420 performs again the complex conjugate operation on a 2nd Rx signal y1, corresponding to the 2nd Tx signal (2402), on which the complex conjugate operation is performed and transmitted, and combines the 1st Rx signal y0 and the complex conjugate 2nd Rx signal (y1*). Hence, a channel error impact experienced by the 1st Rx signal y0 and the 2nd Rx signal y1 varies. Accordingly, based on the conjugate repetition transmission operation, a performance gain against the AWGN noise and a performance gain against the channel estimation error can be obtained.

A Rx mean squared error (MSE), which is a performance indicator for the proposal 2, is expressed in as Equation 11 below.

$$MSE = E\left[\frac{1}{U^2 E\{|\hat{h}_u|\}} \sum_{u=0}^{U-1} |E\{|\hat{h}_u|\} - |h_u|\cos(a_u)|^2\right] + \frac{\sigma_w^2}{2U^2} \qquad \text{[Equation 11]}$$

In the Equation 11, U, $\sigma_x^2$, and $\sigma_w^2$ denote the number of users (the number of UEs participating in federated learning), Tx power, and noise power, respectively. In the Equation 10, if a value of the number U of users is sufficiently large, a value of $E\{|\hat{h}_u|\}$ may be approximated to $E\{|h_u|\}$, and the Equation 11 may be expressed in as Equation 12 below.

$$MSE = E\left[\frac{1}{U^2\alpha}\sum_{u=0}^{U-1}|\alpha - |h_u|\cos(a_u)|^2\right] + \frac{\sigma_w^2}{2U^2} \qquad \text{[Equation 12]}$$

Here, $\alpha = E\{|h_u|\}$. It can be seen from the Equation 12, if the value of U is sufficiently large, an impact of the size of the channel estimation error disappears.

FIG. 25 illustrates an example of a channel and a channel estimation error.

More specifically, a graph illustrated in FIG. 25 shows a channel expressed in complex number form and a channel from which the channel is estimated. In the graph, an x-axis represents a real part of a channel value in the form of a complex number, and a y-axis represents an imaginary part of the channel value in the form of a complex number. In the graph, $h_u$ (2510) denotes a (actual) channel between a base station and a UE, $h_u$_hat (2530) denotes an estimated channel based on a reference signal at a base station, and $e_u$ (2520) denotes a channel estimation error.

In FIG. 25, $a_u$ denotes a phase difference between the estimated channel and the (actual), and $b_u$ denotes a phase of the channel estimation error. In this instance, $\cos(a_u)$ in the Equation 12 is expressed in as Equation 13 below.

$$\cos(a_u) = \frac{|h_u| + |e_u|\cos(b_u)}{\sqrt{|h_u|^2 + |e_u|^2 + 2|h_u||e_u|\cos(b_u)}} \qquad \text{[Equation 13]}$$

FIG. 26 illustrates performance impact sensitivity depending on changes in a channel estimation error.

More specifically, FIG. 26 illustrates a histogram of a value of cos $(a_u)$ when a ratio of power of a channel estimation error to a total channel power is 0.1 (10%). It can be seen from FIG. 26 that the values of cos $(a_u)$ are concentrated near '1'. From these results, it can be seen that cos $(a_u)$ is less sensitive to the channel estimation error. That is, in the proposal 2 (SISO II), when the UE performs only the pre-equalization on the phase component of the channel, there may be performance degradation accordingly. However, it can be seen that the overall performance is insensitive to changes in the channel estimation error.

Method of Selectively Applying Proposal 1 and Proposal 2-Proposal 3

When AirComp based federated learning is performed, the methods of the proposal 1 and the proposal 2 may be selectively applied based on characteristics of the above-described proposal 1 (SISO I, CR) and proposal 2 (SISO II). More specifically, when a ratio of power of a channel estimation error to a total power is equal to or less than a specific value, if the performance of the proposal 1 is better than the performance of the proposal 2, AirComp transmission is performed by applying the proposal 1. On the contrary, when the ratio of the power of the channel estimation error to the total power is equal to or greater than the specific value, if the performance of the proposal 2 is better than the performance of the proposal 1, the AirComp transmission is performed by applying the proposal 2. A performance comparison between the proposal 1 and the proposal 2 for selective application of the proposal 1 and the proposal 2 is described below based on FIGS. 29 and 30.

To selectively apply the methods of the proposal 1 and the proposal 2 upon the AirComp transmission, an operation performed between a UE participating in federated learning and a base station may follow the following order.

(Operation 1) A base station (server) first measures an uplink channel estimation error power of UEs (users) participating in federated learning.

The (operation 1) may be an operation that is preferably performed after the base station transmits information on estimated channels to the UEs participating in federated learning. That is, since a channel estimation error power occurs based on a value of the estimated channels at the base station, it may be interpreted that the base station transmits information on the estimated channels to the UEs and then measures the channel estimation error power of the UEs. In other words, the (operation 1) may be preferably performed after operation in which the UEs participating in federated learning transmit reference signals for channel estimation to the base station, the base station estimates each of channels between the base station and the UEs based on each of the received reference signals, and the UEs each receive information on the channels estimated by the base station.

In the (operation 1), the measurement of the uplink channel estimation error power of the base station may be individually performed on each of the UEs participating in federated learning. For example, when three UEs participate in federated learning, the base station performs the measurement of the channel estimation error power on each of the three UEs. As a result of the measurement of the channel estimation error power, the base station may calculate a channel estimation error power Pe1 for a first UE which is one of the three UEs, a channel estimation error power Pe2 for a second UE which is one of the three UEs. and a channel estimation error power Pe3 for a third UE which is one of the three UEs.

In the (operation 1), the base station may measure the uplink channel estimation error power based on a signal for a local parameter transmitted by each of the UEs. Further, a separate uplink signal for the measurement of the channel estimation error power in the base station may be defined. In this instance, the UEs may transmit, to the base station, a separate uplink signal for the measurement of the channel estimation error power in the base station, and the base station may measure the channel estimation error power based on the separate uplink signal.

(Operation 2-1) When a ratio of the channel estimation error power calculated based on the measured channel estimation error power is equal to or less than a specific value, the base station indicates the UEs participating in federated learning to operate in the method (SISO I, CR) of the proposal 1. The ratio of the channel estimation error power may be a ratio of a channel estimation error power of a plurality of UEs to a total power for channels of the plurality of UEs participating in federated learning.

For example, if three UEs participate in federated learning, a total power of a first UE, which is one of the three UEs, for a channel between the first UE and the base station may be P1, a total power of a second UE, which is one of the three UEs, for a channel between the second UE and the base station may be P2, and a total power of a third UE, which is one of the three UEs, for a channel between the third UE and the base station may be P3. Further, a channel estimation error power of the first UE may be Pe1, a channel estimation error power of the second UE may be Pe2, and a channel estimation error power of the third UE may be Pe3. In this instance, a ratio of the channel estimation error power of the first UE may be expressed as Pe1/P1, a ratio of the channel estimation error power of the second UE may be expressed as Pe2/P2, and a ratio of the channel estimation error power of the third UE may be expressed as Pe3/P3.

(Operation 2-2) On the contrary, when the ratio of the channel estimation error power calculated based on the measured channel estimation error power is equal to or greater than the specific value, the base station indicates the UEs participating in federated learning to operate in the method (SISO II) of the proposal 2.

In the (operation 2-1) and the (operation 2-2), an indication of the base station with respect to the operation method (pre-equalization method) of the UEs participating in federated learning may be individually performed on each of the UEs. More specifically, the base station may individually indicate the pre-equalization method to each of the UEs participating in federated learning based on the ratio of the channel estimation error power of each of the UEs participating in federated learning. For example, if three UEs participate in federated learning, a ratio of the channel estimation error power of a first UE which is one of the three UEs may be expressed as Pe1/P1, a ratio of the channel estimation error power of a second UE which is one of the three UEs may be expressed as Pe2/P2, and a ratio of the channel estimation error power of a third UE which is one of the three UEs may be expressed as Pe3/P3. In this instance, if the ratio Pe1/P1 of the channel estimation error power of the first UE and the ratio Pe2/P2 of the channel estimation error power of the second UE are equal to or less than a specific value, and the ratio Pe3/P3 of the channel estimation error power of the third UE is greater than the specific value, the first UE and the second UE may be indicated to operate in the method (SISO I, CR) of the proposal 1, and the third UE may be indicated to operate in the method (SISO II) of the proposal 2. Further, if the UEs operate in the method of the proposal 2 in this method, the pre-equalization based on an average value of the estimated channel amplitude may be performed at the UEs.

Further, in the (operation 2-1) and the (operation 2-2), an indication of the base station with respect to the operation method (pre-equalization method) of the UEs participating in federated learning may be uniformly performed on the UEs. More specifically, the base station may indicate the same pre-equalization method to the UEs participating in federated learning based on a ratio of a total channel estimation error power of the UEs participating in federated learning. For example, if three UEs participate in federated learning, a total power of a first UE, which is one of the three UEs, for a channel between the first UE and the base station may be P1, a total power of a second UE, which is one of the three UEs, for a channel between the second UE and the base station may be P2, and a total power of a third UE, which is one of the three UEs, for a channel between the third UE and the base station may be P3. Further, a channel estimation error power of the first UE may be Pe1, a channel estimation error power of the second UE may be Pe2, and a channel estimation error power of the third UE may be Pe3. In this instance, the base station may indicate the same pre-equalization method to the UEs participating in federated learning based on a ratio of the channel estimation error power of all the UEs participating in federated learning. In this case, the ratio of the channel estimation error power of all the UEs may be calculated as (Pe1+Pe2+Pe3)/(P1+P2−+ P3). If a value of (Pe1+Pe2+Pe3)/(P1+P2+P3) is equal to or less than a specific value, the UEs participating in federated learning may be indicated to operate in the method (SISO I, CR) of the proposal 1. On the other hand, if the value of (Pe1+Pe2+Pe3)/(P1+P2+P3) is greater than the specific value, the UEs participating in federated learning may be indicated to operate in the method (SISO II) of the proposal 2. Further, if the UEs operate in the method of the proposal 2 in this method, the pre-equalization based on an average value of the estimated channel amplitude may be performed at the base station.

In the (operation 2-1) and the (operation 2-2), in order to indicate the operation method (pre-equalization method) of the UEs, the base station may transmit, to the UEs, method information representing the operation method (pre-equalization method) of the UEs.

As an example of a transmission method of the method information, the method information may be dynamically indicated to the UEs. If the method information is dynamically indicated, the method information may be included in downlink control information scheduling resources for local parameter transmission of the UEs, together with scheduling information, and may be transmitted. More specifically, the method information may be included in the downlink control information in each resource scheduling of the base station, together with the scheduling information, and may be transmitted to the UEs, in order to ensure high performance. For example, if the base station performs scheduling for local parameter transmission of the UEs ten times, the method information may be transmitted to the UEs the same number of times (ten times) as the number of schedulings. Alternatively, to reduce signaling overhead for scheduling of the base station, the base station may measure the channel estimation error power at regular intervals, and the method information may be transmitted to the UEs only when the channel estimation error power is measured. For example, if the base station performs scheduling for local parameter transmission of the UEs ten times, the method information may be transmitted to the UEs only a predetermined number of times less than 10.

In addition, the method information may be included in the downlink control information in the form of a 1-bit long information field. More specifically, if a bit value of the method information represents '0', the UEs may operate in the method of the proposal 1, and if the bit value of the method information represents '1', the UEs may operate in the method of the proposal 2.

In the (operation 2-1) and the (operation 2-2), if the measured channel estimation error power is the same as a specific value, which operation to follow between the (operation 2-1) and the (operation 2-2) may be pre-defined between the base station and the UEs. For example, if the measured channel estimation error power is the same as the specific value, the (operation 2-1) may be performed. On the contrary, if the measured channel estimation error power is the same as the specific value, the (operation 2-2) may be performed.

In the (operation 2-1) and the (operation 2-2), (Operation 3-1) If the UEs operate in the method of the proposal 1, the base station transmits, to the respective UEs, an amplitude and a phase value of a channel to be used for pre-equalization.

As an example of the (operation 3-1), the channel amplitude and the phase value may be transmitted only when the UEs fail to receive information on an estimated channel based on a reference signal for channel estimation from the base station. Specifically, if the UEs receive the information on the estimated channel based on the reference signal for channel estimation from the base station, the UEs may not separately receive, from the base station, information on the channel amplitude and the phase value to be used for pre-equalization. That is, if the UEs perform the pre-equalization after the reception of the method information, the information on the channel amplitude and the phase value included in the information on the estimated channel may be used for the pre-equalization.

(Operation 3-2) If the UEs operate in the method of the proposal 2, the base station transmits, to the respective UEs, only a phase value to be used for pre-equalization.

As an example of the (operation 3-2), the phase value may be transmitted only when the UEs fail to receive information on an estimated channel based on a reference signal for channel estimation from the base station. Specifically, if the UEs receive the information on the estimated channel based on the reference signal for channel estimation from the base station, the UEs may not separately receive, from the base station, information on the phase value to be used for pre-equalization. That is, if the UEs perform the pre-equalization after the reception of the method information, the information on the phase value included in the information on the estimated channel may be used for the pre-equalization.

An operation of compensating the channel amplitude may be performed by the UEs or the base station. If the operation of compensating the channel amplitude is performed by the UEs, an average value of the amplitudes of the estimated channel may be transmitted to the UEs in a broadcast scheme. On the contrary, if the operation of compensating the channel amplitude is performed by the base station, the average value of the amplitudes of the estimated channel may not be transmitted to the UEs since the base station can calculate the average value of the amplitudes of the estimated channel.

In addition, the UEs participating in federated learning can perform the pre-equalization before reception of the method information representing the pre-equalization method, and there is a need to define the UE operation for this case.

More specifically, the UEs participating in federated learning transmit reference signals for channel estimation to the base station. Afterwards, the base station estimates each of channels between the base station and the UEs based on each of the received reference signals. The UEs each receive information on the channels estimated by the base station. Next, the UEs perform pre-equalization based on the received information on the channels and transmit the respective local parameters to the base station, and this operation may be before the UEs receive the method information on the pre-equalization method from the base station. As the UEs fail to receive the method information, ambiguity in the base station-UE operation may occur. To solve the ambiguity in the base station-UE operation, the present disclosure proposes that the base station pre-defines the operation method before the UEs receive the method information. More specifically, before the UEs participating in federated learning receive the method information, the base station may transmit, to the UEs, information on the operation method before the UEs receive the method information. The information may represent either the method of the proposal 1 or the method of the proposal 2. For example, if the UEs receive, from the base station, information on the operation method before receiving the method information, and the information represents the method of the proposal 1, the UEs may perform the federated learning based on the method of the proposal 1 when transmitting the local parameter before the reception of the method information. As another example, if the UEs receive, from the base station, information on the operation method before receiving the method information, and the information represents the method of the proposal 2, the UEs may perform the federated learning based on the method of the proposal 2 when transmitting the local parameter before the reception of the method information. The information may be configured to the UEs via higher signaling.

Performance Comparison

Hereinafter, performances of the methods described above are compared, and a result of the performance comparison is analyzed. A result of performance comparison of a method (SISO I) to which the proposals 1 and 2 are not applied, the method (SISO I, R) of the proposal 1, and the method (SISO I, CR) of the proposal 2 is first analyzed, and then a result of performance comparison of the method (SISO I, R) of the proposal 1 and the method (SISO I, CR) of the proposal 2 is analyzed.

Performance Comparison of (i) Channel Inversion Pre-Equalization and Single Transmission Method (SISO I). (ii) Channel Inversion Pre-Equalization and Repetition Transmission Method (SISO I, R) and (iii) Channel Inversion Pre-Equalization and Conjugate Repetition Transmission Method [Proposal 1] (SISO I, CR)

FIGS. 27 and 28 illustrate results of performance comparison of a channel inversion pre-equalization and single transmission method, a channel inversion pre-equalization and repetition transmission method, and a channel inversion pre-equalization and conjugate repetition transmission method.

FIG. 27 illustrates, in a situation where an SNR is 0 dB, a result of performance comparison of (i) a channel inversion pre-equalization and single transmission method (SISO I), (ii) a channel inversion pre-equalization and repetition transmission method (SISO I, R) and (iii) a channel inversion pre-equalization and conjugate repetition transmission method [proposal 1] (SISO I, CR).

In FIG. 27, reference numerals 2710, 2720, and 2730 respectively denote performances of (SISO I), (SISO I, R), and (SISO I, CR), as results of performance comparison when 20 users participate in federated learning. Further, reference numerals 2740, 2750, and 2760 respectively denote performances of (SISO I). (SISO I, R), and (SISO I, CR), as results of performance comparison when 100 users participate in federated learning.

FIG. 28 illustrates, in a situation where an SNR is 20 dB, a result of performance comparison of (i) a channel inversion pre-equalization and single transmission method (SISO I), (ii) a channel inversion pre-equalization and repetition transmission method (SISO I, R) and (iii) a channel inversion pre-equalization and conjugate repetition transmission method [proposal 1] (SISO I, CR).

In FIG. 28, reference numerals 2810, 2820, and 2830 respectively denote performances of (SISO I), (SISO I, R), and (SISO I, CR), as results of performance comparison when 20 users participate in federated learning. Further, reference numerals 2840, 2850, and 2860 respectively denote performances of (SISO I), (SISO I, R), and (SISO I, CR), as results of performance comparison when 100 users participate in federated learning.

In FIGS. 27 and 28, the x-axis represents a ratio of channel estimation error power to the total channel power, and the y-axis represents a size of an MSE.

It can be seen from FIGS. 27 and 28 that the overall performances when the SNR is 0 dB and 20 dB are similar to each other. This is due to a reduction in an impact of AWGN due to multi-user gain.

On the other hand, the performances represented by the reference numerals 2710 to 2760 of FIG. 27 and the reference numerals 2810 to 2860 of FIG. 28 may be greatly affected by the channel estimation error power. This is because the multi-user gain cannot be obtained due to the channel estimation error that exists for each of the users performing the federated learning.

It can be seen from the result of the reference numerals 2710, 2720, 2740, and 2750 of FIG. 27 and the result of the reference numerals 2810, 2820, 2840, and 2850 of FIG. 28 that the (SISO I) and the (SISO I, R) have almost the same performance. This is because the (SISO I, R) can obtain a gain against the AWGN noise compared to the (SISO I) through the repletion transmission, while the channel estimation error is equally maintained between them. A reason why the (SISO I) and the (SISO I, R) have the same performance although the (SISO I, R) can obtain the gain against the AWGN noise compared to the (SISO I) is that the impact of the AWGN noise is not significant due to the multi-user gain.

On the other hand, it can be seen from the reference numerals 2730 and 2760 of FIG. 27 and the reference numerals 2830 and 2860 of FIG. 28 that the (SISO I, CR)[proposal 1] obtains both a gain against the AWGN noise and a gain against the channel estimation error. However, because the impact of the AWGN noise is not significant due to the multi-user gain, the gain against the AWGN noise may be insignificant. It can be seen from FIGS. 27 and 28 that the MSE of the method (SISO I, CR) of the proposal 1 has further improved performance than the (SISO I) and the (SISO I, R) by about 3 dB based on the power of the same channel estimation error.

Performance Comparison of (i) Channel Inversion Pre-Equalization and Conjugate Repetition Transmission Method [Proposal 1] (SISO I, CR) and (ii) Channel Compensation and Conjugate Repetition Transmission Method [Proposal 2] (SISO II) Based on Phase Value and Channel Amplitude Average Value for Each Channel FIGS. 29 and 30 illustrate results of performance comparison of a channel inversion pre-equalization and conjugate repetition transmission method and a channel compensation and conjugate repetition transmission method based on a phase value and a channel amplitude average value for each channel.

FIG. 29 illustrates, in a situation where an SNR is 0 dB, a result of performance comparison of (i) a channel inversion pre-equalization and conjugate repetition transmission method [proposal 1] (SISO I, CR) and (ii) a channel compensation and conjugate repetition transmission method [proposal 2] (SISO II) based on a phase value and a channel amplitude average value for each channel.

In FIG. 29, reference numerals 2910 and 2920 respectively denote performances of (SISO I, CR) and (SISO II), as results of performance comparison when 20 users participate in federated learning. Further, reference numerals 2930 and 2940 respectively denote performances of (SISO I, CR) and (SISO II), as results of performance comparison when 50 users participate in federated learning. In addition, reference numerals 2950 and 2960 respectively denote performances of (SISO I, CR) and (SISO II), as results of performance comparison when 10 users participate in federated learning.

FIG. 30 illustrates, in a situation where an SNR is 20 dB, a result of performance comparison of (i) a channel inversion pre-equalization and conjugate repetition transmission method [proposal 1] (SISO I, CR) and (ii) a channel compensation and conjugate repetition transmission method [proposal 2] (SISO II) based on a phase value and a channel amplitude average value for each channel.

In FIG. 30, reference numerals 3010 and 3020 respectively denote performances of (SISO I, CR) and (SISO II), as results of performance comparison when 20 users participate in federated learning. Further, reference numerals 3030 and 3040 respectively denote performances of (SISO I, CR) and (SISO II), as results of performance comparison when 50 users participate in federated learning. In addition, reference numerals 3050 and 3060 respectively denote performances of (SISO I, CR) and (SISO II), as results of performance comparison when 100 users participate in federated learning.

In FIGS. 29 and 30, the (SISO II) relates to an example where the compensation for the channel amplitude is performed at a reception end (base station). In FIGS. 29 and 30, the x-axis represents a ratio of channel estimation error power to the total channel power, and the y-axis represents a size of an MSE.

It can be seen from FIGS. 29 and 30 that the overall performances when the SNR is 0 dB and 20 dB are similar to each other. This is due to a reduction in an impact of AWGN due to multi-user gain.

On the other hand, the performances represented by the reference numerals 2910 to 2960 of FIG. 29 and the reference numerals 3010 to 3060 of FIG. 30 may be greatly affected by the channel estimation error power. This is because the multi-user gain cannot be obtained due to the channel estimation error that exists for each of the users performing the federated learning.

In particular, referring to (i) the reference numerals 2910, 2930, and 2950 of FIG. 29 and (ii) the reference numerals 3010, 3030, and 3050 of FIG. 30, because the channel inversion pre-equalization is performed in the (SISO I, CR), the (SISO I, CR) can obtain the low MSE when the channel estimation error power is low, but the MSE greatly increases as the channel estimation error power increases.

On the other hand, referring to (i) the reference numerals 2920, 2940, and 2960 of FIG. 29 and (ii) the reference numerals 3020, 3040, and 3060 of FIG. 30, because the pre-equalization is performed only on a phase component of the channel at a transmission end (UE) in the (SISO II), the (SISO II) has a somewhat high MSE value even if the channel estimation error power is low, but is insensitive to changes in the channel estimation error power.

In FIGS. 29 and 30, when the channel estimation error power is about 0.03 (15.23 dB) with respect to the channel power. MSE curves of the (SISO I, CR) and the (SISO II) intersect each other. According to the results of FIGS. 29 and 30, a reference value of a ratio of the channel estimation error power to the channel power may be about 0.03 in order to selectively apply the (SISO I, CR) [proposal 1] and the (SISO II) [proposal 2]. The reference value may vary depending on a communication environment in which the federated learning is performed, and thus may be properly adjusted based on the communication environment. In FIGS. 29 and 30, the MSE analysis may be a value numerically calculated from the MSEs of the (SISO I, CR) and the (SISO II) described above.

Application Results of Performance Comparison of Method (SISO I, R) of Proposal 1 and Method (SISO I, CR) of Proposal 2 to Method of Proposal 3

If the results of performance comparison are applied to the proposal 3 described above, the proposal 3 may be performed as follows.

(Operation 1) A base station (server) first measures an uplink channel estimation error power of UEs (users) participating in federated learning.

(Operation 2-1) When the measured channel estimation error power is equal to or less than a specific value, the base station indicates the UEs participating in federated learning to operate in the method (SISO I, CR) of the proposal 1. Here, the specific value may be 0.03 dB.

(Operation 2-2) On the contrary, when the measured channel estimation error power is equal to or greater than the specific value, the base station indicates the UEs participating in federated learning to operate in the method (SISO II) of the proposal 2.

(Operation 3-1) If the UEs operate in the method of the proposal 1, the base station transmits, to the respective UEs, an amplitude and a phase value of a channel to be used for pre-equalization.

(Operation 3-2) If the UEs operate in the method of the proposal 2, the base station transmits, to the respective UEs, only a phase value to be used for pre-equalization.

FIG. 31 is a flow chart illustrating an example of a method of performing federated learning in a wireless communication system described in the present disclosure.

More specifically, in a method for a plurality of UEs to perform federated learning in a wireless communication system, one UE of the plurality of UEs receives, from a base station (BS), control information related to scheduling of a resource on which the one UE repeatedly transmits a local parameter of the one UE, in S3110.

Here, a global parameter for the federated learning is updated based on respective local parameters of the plurality of UEs.

Next, the one UE transmits, to the BS, a first signal including the local parameter of the one UE on a first resource scheduled based on the control information, in S3120.

Next, the one UE transmits, to the BS, a second signal including the local parameter of the one UE on a second resource, different from the first resource, scheduled based on the control information, in S3130.

In this instance, the first signal and the second signal are transmitted based on the first signal and the second signal being in a complex conjugate relationship.

Devices Used in Wireless Communication Systems

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 40 illustrates a communication

Referring to FIG. 40, a communication system 1 applied to the present disclosure includes wireless devices, base stations (BSs), and a network. Herein, the wireless devices represent devices performing communication using Radio Access Technology (RAT) (e.g., 5G new RAT (NR)) or long-term evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 33 illustrates wireless devices applicable to the present disclosure.

Referring to FIG. 33, a first wireless device 100 and a second wireless device 200 may transmit radio signals through a variety of RATs (e.g., LTE and NR). Herein, {the first wireless device 100 and the second wireless device 200} may correspond to (the wireless device 100x and the BS 200) and/or {the wireless device 100x and the wireless device 100x} of FIG. 32.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be inter-changeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flow-charts disclosed in this document. The one or more proces-sors 102 and 202 may generate messages, control informa-tion, data, or information according to the descriptions, functions, procedures, proposals, methods, and/or opera-tional flowcharts disclosed in this document. The one or more processors 102 and 202 may generate signals (e.g., baseband signals) including PDUs, SDUs, messages, control information, data, or information according to the descrip-tions, functions, procedures, proposals, methods, and/or operational flowcharts disclosed in this document and pro-vide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information accord-ing to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Applica-tion Specific Integrated Circuits (ASICs), one or more Digital Signal Processors (DSPs), one or more Digital Signal Processing Devices (DSPDs), one or more Program-mable Logic Devices (PLDs), or one or more Field Pro-grammable Gate Arrays (FPGAs) may be included in the one or more processors 102 and 202. The descriptions, functions, procedures, proposals, methods, and/or opera-tional flowcharts disclosed in this document may be imple-mented using firmware or software and the firmware or software may be configured to include the modules, proce-dures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs). Electrically Erasable Programmable Read-Only Memories (EPROMs), flash memories, hard drives, registers, cash memories, computer-readable storage media, and/or combi-nations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, men-tioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more proces-sors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, pro-posals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio sig-nals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 34 illustrates a signal process circuit for a transmis-sion signal.

Referring to FIG. 34, a signal processing circuit 1000 may include scramblers 1010, modulators 1020, a layer mapper 1030, a precoder 1040, resource mappers 1050, and signal generators 1060. An operation/function of FIG. 34 may be performed, without being limited to, the processors 102 and 202 and/or the transceivers 106 and 206 of FIG. 33. Hard-ware elements of FIG. 34 may be implemented by the processors 102 and 202 and/or the transceivers 106 and 206 of FIG. 33. For example, blocks 1010 to 1060 may be implemented by the processors 102 and 202 of FIG. 33. Alternatively, the blocks 1010 to 1050 may be implemented by the processors 102 and 202 of FIG. 33 and the block 1060 may be implemented by the transceivers 106 and 206 of FIG. 33.

Codewords may be converted into radio signals via the signal processing circuit 1000 of FIG. 34. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 34. For example, the wireless devices (e.g., 100 and 200 of FIG. 33) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 35 illustrates another example of a wireless device applied to the present disclosure. The wireless device may be implemented in various forms according to a use-case/service Referring to FIG. 35, wireless devices 100 and 200 may correspond to the wireless devices 100 and 200 of FIG. 33 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 33. For example, the transceiver(s) 114 may include the one or more transceivers 106 and 206 and/or the one or more antennas 108 and 208 of FIG. 33. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 32), the vehicles (100*b*-1 and 100*b*-2 of FIG. 32), the XR device (100*c* of FIG. 32), the hand-held device (100*d* of FIG. 32), the home appliance (100*e* of FIG. 32), the IoT device (100*f* of FIG. 32), a digital broadcast terminal, a hologram device, a public safety device, an MTC device, a medicine device, a fintech device (or a finance device), a security device, a climate/environment device, the AI server/device (400 of FIG. 32), the BSs (200 of FIG. 32), a network node, etc. The wireless device may be used in a mobile or fixed place according to a use-example/service.

In FIG. 35, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 35 will be described in detail with reference to the drawings.

FIG. 36 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 36, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 35, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 37 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 37, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 35, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

FIG. 38 illustrates a vehicle applied to the present disclosure. The vehicle may be implemented as a transport means, an aerial vehicle, a ship, etc.

Referring to FIG. 38, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 35.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The V/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a waring on the window in the vehicle through the I/O unit 140*a*. In addition, the control unit 120 may broadcast a waring message regarding driving abnormity to neighboring vehicles through the communication unit 110. According to situation, the control unit 120 may transmit the vehicle position information and the information about driving/vehicle abnormality to related organizations.

FIG. 39 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 39, an XR device 100*a* may include a communication unit 110, a control unit 120, a memory unit 130, an I/O unit 140*a*, a sensor unit 140*b*, and a power supply unit 140*c*. Herein, the blocks 110 to 130/140*a* to 140*c* correspond to the blocks 110 to 130/140 of FIG. 35, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

FIG. 32 illustrates a robot applied to the present disclosure. The robot may be categorized into an industrial robot, a medical robot, a household robot, a military robot, etc., according to a used purpose or field.

Referring to FIG. 32, a robot 100 may include a communication unit 110, a control unit 120, a memory unit 130, an I/O unit 140*a*, a sensor unit 140*b*, and a driving unit 140*c*. Herein, the blocks 110 to 130/140*a* to 140*c* correspond to the blocks 110 to 130/140 of FIG. 35, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

FIG. 41 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 41, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 35, respectively.

The communication unit 110 may transmit and receive wired/radio signals (e.g., sensor information, user input, learning models, or control signals) to and from external devices such as other AI devices (e.g., 100*x*, 200, or 400 of FIG. 32) or an AI server (e.g., 400 of FIG. 32) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140*c* or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140*c* or transmit the collected information to an external device such as an AI server (400 of FIG. 32). The collected history information may be used to update a learning model.

The memory unit 130 may store data for supporting various functions of the AI device 100. For example, the memory unit 130 may store data obtained from the input unit 140*a*, data obtained from the communication unit 110, output data of the learning processor unit 140*c*, and data obtained from the sensor unit 140. The memory unit 130 may store control information and/or software code needed to operate/drive the control unit 120.

The input unit 140*a* may acquire various types of data from the exterior of the AI device 100. For example, the input unit 140*a* may acquire learning data for model learning, and input data to which the learning model is to be applied. The input unit 140*a* may include a camera, a microphone, and/or a user input unit. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140*c* may learn a model consisting of artificial neural networks, using learning data. The learning processor unit 140*c* may perform AI processing together with the learning processor unit of the AI server (400 of FIG. 32). The learning processor unit 140*c* may process information received from an external device through the communication unit 110 and/or information stored in the memory unit 130. In addition, an output value of the learning processor unit 140*c* may be transmitted to the external device through the communication unit 110 and may be stored in the memory unit 130.

In the aforementioned embodiments, the elements and characteristics of the present disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

The present disclosure has been described focusing on examples applying to the 3GPP LTE/LTE-A and 5G systems, but can be applied to various wireless communication systems in addition to the 3GPP LTE/LTE-A and 5G systems.

The invention claimed is:

1. A method of performing, by a plurality of user equipments (UEs), a federated learning in a wireless communication system, the method performed by one UE of the plurality of UEs comprising:

receiving, from a base station (BS), control information related to a scheduling of a resource on which the one UE repeatedly transmits a local parameter of the one UE, wherein a global parameter for the federated learning is updated based on respective local parameters of the plurality of UEs;

transmitting, to the BS, a first signal including the local parameter of the one UE on a first resource scheduled based on the control information; and transmitting, to the BS, a second signal including the local parameter of the one UE on a second resource that is scheduled based on the control information and is different from the first resource, wherein the first signal and the second signal are transmitted based on the first signal and the second signal being in a complex conjugate relationship.

2. The method of claim 1, further comprising:

before the first signal and the second signal are transmitted, performing a specific operation for removing an impact of a channel on each of the first signal and the second signal.

3. The method of claim 2, wherein a method of the specific operation is one of (i) a first method of compensating, based on an amplitude and a phase of an estimated channel for a channel between the one UE and the BS, the channel and (ii) a second method of compensating, based on an average amplitude of estimated channels for channels between the plurality of UEs and the BS and a phase of the estimated channels, the channel.

4. The method of claim 3, further comprising:

receiving, from the BS, specific operation information for the method of the specific operation.

5. The method of claim 4, wherein, based on a ratio of a magnitude of a channel estimation error power, which is a power of channel estimation errors which are errors between channels between the plurality of UEs and the BS and estimated channels for the channels, to a magnitude of a total power of transmission signals of the plurality of UEs, the method of the specific operation represented by the specific operation information is determined as one of the first method and the second method.

6. The method of claim 5, wherein, based on the ratio of the magnitude of the channel estimation error power to the magnitude of the total power being equal to or less than a specific value, the specific operation information represents the first method, and wherein, based on the ratio of the magnitude of the channel estimation error power to the magnitude of the total power being greater than the specific value, the specific operation information represents the second method.

7. The method of claim 6, further comprising:

based on the method of the specific operation represented by the specific operation information being the first method, receiving, from the BS, information on the amplitude and a value of the phase of the estimated channel, wherein, based on the specific operation determined as the first method, the channel between the one UE and the BS is compensated with the amplitude and the value of the phase of the estimated channel included in the information.

8. The method of claim 6, further comprising:

based on the method of the specific operation represented by the specific operation information being the second method, receiving, from the BS, information on a value of the phase of the estimated channel.

9. The method of claim 8, wherein, based on the method of the specific operation represented by the specific operation information being the second method, an amplitude of the channel between the one UE and the BS is compensated at the one UE or the BS.

10. The method of claim 9, further comprising:

based on the amplitude of the channel being compensated at the one UE, receiving, from the BS, information on a value of the average amplitude of the estimated channels, wherein, based on the specific operation determined as the second method, the channel between the one UE and the BS is compensated with the average amplitude and a value of the phase of the estimated channels.

11. The method of claim 10, wherein the information on the value of the average amplitude of the estimated channels is transmitted in a broadcast scheme.

12. The method of claim 6, further comprising:

based on the first signal and the second signal being transmitted after the one UE receives the specific operation information, determining the method of the specific operation performed on the first signal and the second signal based on the specific operation information, wherein the specific operation is performed on the first signal and the second signal based on the determined method of the specific operation.

13. The method of claim 4, further comprising:

receiving, from the BS, information representing the method of the specific operation performed by the one UE before the one UE receives the specific operation information, wherein the information represents one of the first method and the second method, and wherein, based on the first signal and the second signal being transmitted before the one UE receives the specific operation information, the specific operation is performed on the first signal and the second signal based on the information.

14. The method of claim 5, further comprising:

transmitting, to the BS, a reference signal for a channel estimation of the BS for a specific channel on which a signal of the one UE is transmitted; and receiving, from the BS, channel information based on a result of the channel estimation of the BS based on the reference signal, wherein the channel estimation error power is determined based on the channel information.

15. The method of claim 1, further comprising:

receiving, from the BS, a downlink signal including the updated global parameter.

16. One user equipment (UE) of a plurality of UEs performing a federated learning in a wireless communication system, the one UE comprising:

a transmitter configured to transmit a radio signal;

a receiver configured to receive the radio signal;

at least one processor; and at least one computer memory operably connectable to the at least one processor, wherein the at least one computer memory is configured to store instructions that allow the at least one processor to perform operations based on being executed by the at least one processor, wherein the operations comprise:

receiving, from a base station (BS), control information related to a scheduling of a resource on which the one UE repeatedly transmits a local parameter of the one UE, wherein a global parameter for the federated learning is updated based on respective local parameters of the plurality of UEs;

transmitting, to the BS, a first signal including the local parameter of the one UE on a first resource scheduled based on the control information; and transmitting, to the BS, a second signal including the local parameter of the one UE on a second resource that is scheduled based on the control information and is different from the first resource, wherein the first signal and the second signal are transmitted based on the first signal and the second signal being in a complex conjugate relationship.

17. A method of performing, by a base station (BS), a federated learning together with a plurality of user equipments (UEs) in a wireless communication system, the method comprising:

transmitting, to the plurality of UEs, control information related to a scheduling of a resource on which the plurality of UEs repeatedly transmit a local parameter;

receiving, from each of the plurality of UEs, a first signal including the local parameter on a first resource scheduled based on the control information;

receiving, from each of the plurality of UEs, a second signal including the local parameter on a second resource that is scheduled based on the control information and is different from the first resource; and updating a global parameter for the federated learning based on the local parameters received from each of the plurality of UEs, wherein the first signal and the second signal are transmitted based on the first signal and the second signal being in a complex conjugate relationship.

\* \* \* \* \*